(12) United States Patent
Bechtel et al.

(10) Patent No.: US 9,230,183 B2
(45) Date of Patent: Jan. 5, 2016

(54) AUTOMATIC VEHICLE EQUIPMENT MONITORING, WARNING, AND CONTROL SYSTEM

(71) Applicant: Gentex Corporation, Zeeland, MI (US)

(72) Inventors: Jon H. Bechtel, Holland, MI (US); Jeremy C. Andrus, New York, NY (US); Gregory S. Bush, Grand Rapids, MI (US); David J. Wright, Grand Rapids, MI (US); Jim L. Schneider, Hudsonville, MI (US); Tom B. Sherman, Ada, MI (US)

(73) Assignee: GENTEX CORPORATION, Zeeland, MI (US)

( * ) Notice: Subject to any disclaimer, the term of this patent is extended or adjusted under 35 U.S.C. 154(b) by 227 days.

(21) Appl. No.: 13/897,662

(22) Filed: May 20, 2013

(65) Prior Publication Data

US 2013/0250113 A1    Sep. 26, 2013

Related U.S. Application Data

(62) Division of application No. 13/034,748, filed on Feb. 25, 2011, now Pat. No. 8,456,327.

(60) Provisional application No. 61/308,497, filed on Feb. 26, 2010, provisional application No. 61/356,843, filed on Jun. 21, 2010, provisional application No. 61/390,794, filed on Oct. 7, 2010, provisional application No. 61/413,797, filed on Nov. 15, 2010.

(51) Int. Cl.
*H04N 7/18*     (2006.01)
*G06K 9/20*     (2006.01)
(Continued)

(52) U.S. Cl.
CPC ............... *G06K 9/2018* (2013.01); *B60R 1/04* (2013.01); *G06K 9/00798* (2013.01);
(Continued)

(58) Field of Classification Search
CPC ...................................... G08G 1/166
USPC .......... 340/937, 435, 903; 348/148, 149, 348/208.4, 302, 294, 311, 308, 297; 250/214 R, 208.1; 382/106, 167, 162, 382/168
See application file for complete search history.

(56) References Cited

U.S. PATENT DOCUMENTS 4,630,105 A    12/1986 Knop
5,892,541 A    4/1999 Merrill
(Continued)

FOREIGN PATENT DOCUMENTS

JP    2000048183    2/2000
WO    WO0109717    2/2001

OTHER PUBLICATIONS

Sung-Hyung Yang & Kyoung-Rok Cho, High Dynamic Range CMOS Image Sensor with Conditional Reset, IEEE 2002 Custom Integrated Circuits Conf., pp. 265-268, Cheongju Chungbuk, Korea.

*Primary Examiner* — Brent Swarthout
(74) *Attorney, Agent, or Firm* — Price Heneveld LLP; Scott P. Ryan

(57) ABSTRACT

An automatic vehicle equipment control system and methods thereof are provided, the system includes at least one imager configured to acquire a continuous sequence of high dynamic range single frame images, a processor, a color spectral filter array including a plurality of color filters, at least a portion of which are different colors, and pixels of an imager pixel array being in optical communication with substantially one spectral color filter, and a lens, wherein the imager is configured to capture a non-saturated image of nearby oncoming headlamps and at least one of a diffuse lane marking and a distant tail lamp in one image frame of the continuous sequence of high dynamic range single frame images, and the system configured to detect at least one of said highway markings and said tail lamps, and quantify light from the oncoming headlamp from data in the one image frame.

19 Claims, 41 Drawing Sheets

(51) Int. Cl.
   B60R 1/04      (2006.01)
   G06K 9/00      (2006.01)
   G08G 1/16          (2006.01)
   B60R 1/12          (2006.01)
   B60W 30/12         (2006.01)
   B60W 30/14         (2006.01)

(52) U.S. Cl.
   CPC ............ G06K 9/00825 (2013.01); G06K 9/209
   (2013.01); *B60R 2001/1215* (2013.01); *B60R 2001/1223* (2013.01); *B60R 2001/1253* (2013.01); *B60R 2001/1284* (2013.01); *B60W 30/12* (2013.01); *B60W 30/14* (2013.01); *G08G 1/166* (2013.01)

(56) References Cited

U.S. PATENT DOCUMENTS

| | | |
|---|---|---|
| 6,175,383 B1 | 1/2001 | Yadid-Pecht |
| 6,429,594 B1 | 8/2002 | Stam et al. |
| 6,765,619 B1 | 7/2004 | Deng et al. |
| 6,774,988 B2 | 8/2004 | Stam et al. |
| 6,831,689 B2 | 12/2004 | Yadid-Pecht |
| 6,963,369 B1 | 11/2005 | Olding |
| 7,202,463 B1 | 4/2007 | Cox |
| 7,362,355 B1 | 4/2008 | Yang et al. |
| 7,408,136 B2 | 8/2008 | Bechtel et al. |
| 7,415,126 B2 | 8/2008 | Breed et al. |
| 7,565,006 B2 | 7/2009 | Stam et al. |
| 7,566,851 B2 | 7/2009 | Stein et al. |
| 7,567,291 B2 | 7/2009 | Bechtel et al. |
| 7,825,600 B2 | 11/2010 | Stam et al. |
| 7,859,565 B2 | 12/2010 | Schofield et al. |
| 7,876,926 B2 | 1/2011 | Schwartz et al. |
| 7,876,957 B2 | 1/2011 | Ovsiannikov et al. |
| 7,881,496 B2 | 2/2011 | Camilleri et al. |
| 7,881,497 B2 | 2/2011 | Ganguli et al. |
| 7,881,839 B2 | 2/2011 | Stam et al. |
| 7,881,848 B2 | 2/2011 | Hayakawa et al. |
| 7,885,766 B2 | 2/2011 | Sugimoto et al. |
| 7,889,887 B2 | 2/2011 | Azuma |
| 7,890,231 B2 | 2/2011 | Saito et al. |
| 7,898,182 B2 | 3/2011 | Futamura |
| 7,898,400 B2 | 3/2011 | Hadi et al. |
| 7,899,213 B2 | 3/2011 | Otsuka et al. |
| 7,903,841 B2 | 3/2011 | Smilansky |
| 7,903,843 B2 | 3/2011 | Sawaki et al. |
| 7,904,247 B2 | 3/2011 | Nakamori |
| 8,203,443 B2 | 6/2012 | Bos et al. |
| 8,222,588 B2 | 7/2012 | Schofield et al. |
| 8,456,327 B2 * | 6/2013 | Bechtel et al. ............... 340/937 |
| 2002/0067341 A1 * | 6/2002 | Kobayashi .................. 345/157 |
| 2003/0058346 A1 | 3/2003 | Bechtel et al. |
| 2005/0140907 A1 * | 6/2005 | Yun ........................... 349/144 |
| 2005/0174452 A1 | 8/2005 | Van Blerkom et al. |
| 2006/0011810 A1 | 1/2006 | Ando et al. |
| 2006/0139470 A1 | 6/2006 | McGowan |
| 2006/0181625 A1 * | 8/2006 | Han et al. ..................... 348/297 |
| 2006/0215882 A1 | 9/2006 | Ando et al. |
| 2007/0188441 A1 * | 8/2007 | Tanaka et al. ................ 345/102 |
| 2007/0257998 A1 | 11/2007 | Inoue |
| 2008/0055441 A1 * | 3/2008 | Altice ........................... 348/297 |
| 2008/0068520 A1 | 3/2008 | Minikey, Jr. et al. |
| 2008/0136953 A1 | 6/2008 | Barnea et al. |
| 2008/0192132 A1 | 8/2008 | Bechtel et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2010/0014707 A1 * | 1/2010 | Nakamori et al. ........... 382/103 |
| 2010/0026837 A1 * | 2/2010 | Koishi ......................... 348/225.1 |
| 2010/0187407 A1 | 7/2010 | Bechtel et al. |
| 2010/0188540 A1 | 7/2010 | Bechtel et al. |
| 2010/0302384 A1 | 12/2010 | Sawada et al. |
| 2010/0328644 A1 * | 12/2010 | Lu et al. ....................... 356/5.01 |
| 2011/0285849 A1 * | 11/2011 | Schofield et al. ............ 348/148 |

* cited by examiner

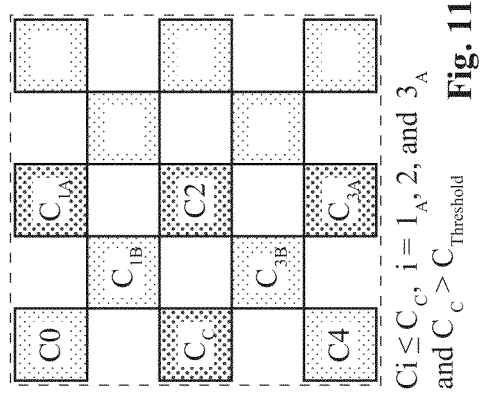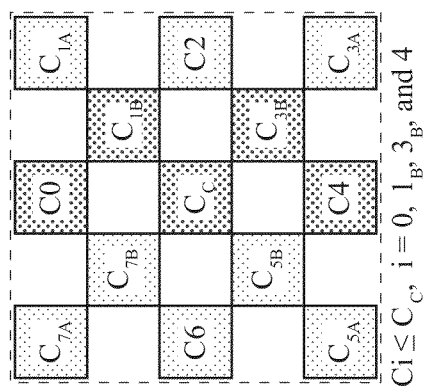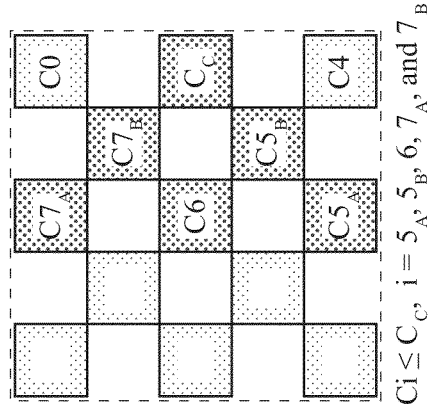
Fig. 11

1] $\text{Bmin} := 0.4 \qquad \text{Bmax} := 7.1 \qquad \text{Brange} := \text{Bmax} - \text{Bmin}$ 2] $\text{CF}(\text{BASE}, \text{Cr}) := 10^{[\text{BASE} \cdot (\text{Cr}-1)]}$ 3] $\text{bFactor}(\text{BASE}, \varepsilon) := \dfrac{(\text{BASE} - \text{Bmin} + \varepsilon)}{1 + \dfrac{(\text{Brange} + \varepsilon)}{\text{BASE} - \text{Bmin} + \varepsilon}} = \dfrac{(\text{BASE} - \text{Bmin} + \varepsilon)^2}{\text{BASE} - \text{Bmin} + 2\varepsilon + \text{Brange}}$ 4] $\text{bxCF\_n}(\text{BASE}, \text{Cr}, \varepsilon) := \dfrac{\text{bFactor}(\text{BASE}, \varepsilon) \cdot \text{CF}(\text{BASE}, \text{Cr})}{\text{bFactor}(\text{Bmax}, \varepsilon) \cdot \text{CF}(\text{Bmax}, \text{Cr})}$ 5] $\text{Num\_n}(\text{BASE}, \varepsilon) := \dfrac{(\text{BASE} - \text{Bmin} + \varepsilon)^2}{(\text{Bmax} - \text{Bmin} + \varepsilon)^2}$ 6] $\text{Denom\_n}(\text{BASE}, \varepsilon) := \dfrac{2(\varepsilon + \text{Brange})}{(\text{BASE} - \text{Bmin} + 2\varepsilon + \text{Brange})}$ 7] $\text{CrD}(\varepsilon) := \dfrac{\log(\text{Denom\_n}(\text{Bmax}, \varepsilon)) - \log(\text{Denom\_n}(\text{Bmin}, \varepsilon))}{\text{Brange}}$ 8] $10^{(\text{BASE} \cdot \text{CrD}(\varepsilon))} \cdot 10^{[\text{BASE} \cdot (\text{Cr}-1)]} = 10^{[\text{BASE} \cdot (\text{Cr} + \text{CrD}(\varepsilon) - 1)]}$ 9] $\text{bxCF\_n\_a}(\text{BASE}, \text{Cr}, \varepsilon) := \dfrac{\text{Num\_n}(\text{BASE}, \varepsilon) \cdot \text{CF}(\text{BASE}, \text{Cr} + \text{CrD}(\varepsilon))}{\text{CF}(\text{Bmax}, \text{Cr} + \text{CrD}(\varepsilon))}$

Fig. 33a

AUTOMATIC VEHICLE EQUIPMENT MONITORING, WARNING, AND CONTROL SYSTEM

CROSS-REFERENCE TO RELATED APPLICATION

This application is a divisional of U.S. patent application Ser. No. 13/034,748, now U.S. Pat. No. 8,456,327, filed Feb. 25, 2011, entitled "AUTOMATIC VEHICLE EQUIPMENT MONITORING WARNING, AND CONTROL SYSTEM," which claims priority under 35 U.S.C. §119(e) of U.S. Provisional Patent Application Ser. Nos. 61/308,497, filed on Feb. 26, 2010, 61/356,843, filed on Jun. 21, 2010, 61/390,794, filed on Oct. 7, 2010, and 61/413,797, filed on Nov. 15, 2010, all of which are hereby incorporated herein by reference in their entirety.

FIELD OF THE INVENTION

The present invention generally relates to an automatic vehicle control system and method thereof, and more particularly, an automatic vehicle control system configured to process high dynamic range images and method thereof.

BACKGROUND OF THE INVENTION

Generally, a vehicle can include an imager, and an image captured by the imager is used to control one or more components of the vehicle. Typically, the imagers are complementary metal-oxide-semiconductor (CMOS) or charge coupled device (CCD) imagers.

SUMMARY OF THE INVENTION

According to one aspect of the present invention, an automatic vehicle equipment control system is provided, and includes at least one imager configured to acquire a continuous sequence of high dynamic range single frame images, and the at least one imager includes a pixel array, and a processor in communication with the at least one imager, and configured to process the continuous sequence of high dynamic range images. The system further includes a color spectral filter array in optical communication with the at least one imager, the color spectral filter array including a plurality of color filters, at least a portion of which are different colors, and each pixel being in optical communication with substantially one spectral color filter, and a lens in optical communication with the at least one imager and the color spectral filter array, wherein the imager is configured to capture a non-saturated image of nearby oncoming headlamps and at least one of a diffuse lane marking and a distant tail lamp in one image frame of the continuous sequence of high dynamic range single frame images, and the automatic vehicle equipment control system configured to detect at least one of said highway markings and said tail lamps, and quantify light from the oncoming headlamp from data in the one image frame.

According to another aspect of the present invention, an automatic vehicle control system includes at least one imager configured to acquire a continuous sequence of high dynamic range single frame images, and the at least one imager having a pixel array, and a color spectral filter array in optical communication with the at least one imager, the color spectral filter array including a plurality of color filters, at least a portion of which are different colors, and pixels of the pixel array being in optical communication with substantially one said spectral color filter. The automatic vehicle control system further includes a lens in optical communication with the at least one imager and the color spectral filter array, and a processor in communication with the at least one imager, and configured to process the continuous sequence of high dynamic range images, wherein the processor is further configured to use color information for pixels of the pixel array to enhance yellow colored features in the high dynamic range images to detect yellow lane markers.

According to yet another aspect of the present invention, an automatic vehicle control system includes at least one imager configured to acquire a continuous sequence of high dynamic range single frame images, and the at least one imager having a pixel array, and a color spectral filter array in optical communication with the at least one imager, the color spectral filter array including a plurality of color filters, at least a portion of which are different colors, and pixels of the pixel array being in optical communication with substantially one said spectral color filter. The automatic vehicle control system further includes a lens in optical communication with the at least one imager and the color spectral filter array, and a processor in communication with the at least one imager, wherein the processor is configured to aggregate multiple bright sports into a single light source object in at least one image of the continuous sequence of high dynamic range images.

According to another aspect of the present invention, an automatic vehicle control system includes at least one imager configured to acquire a continuous sequence of high dynamic range single frame images, and the at least one imager having a pixel array, and a color spectral filter array in optical communication with the at least one imager, the color spectral filter array including a plurality of color filters, at least a portion of which are different colors, and pixels of the pixel array being in optical communication with substantially one said spectral color filter. The automatic vehicle control system further includes a lens in optical communication with the at least one imager and the color spectral filter array, and a processor in communication with the at least one imager, said processor being configured to detect an alternating current (AC) light source in the continuous sequence of high dynamic range images, wherein the at least one imager is configured to have a sampling image repetition period that is longer than a flicker cycle period of the AC light source.

According to yet another aspect of the present invention, a method of generating a lane departure warning includes the steps of populating a world coordinate system grid for incoming lane lines, scoring marker points, processing the scored marker points, determining a type of lane lines based upon the processed and scored marker points, computing a vehicle departure from the lane lines, and determining if a warning should be emitted.

According to another aspect of the present invention, a method of generating a control signal for vehicle headlamp control includes the steps of extracting a list of light objects, combining single-peak light sources into multi-peak light objects, connecting current light sources to light sources contained in previous images, and determining an appropriate state of a vehicle's headlamp.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein:

FIG. 3b is a rear perspective view of the rearview device of FIG. 3a;

FIG. 11 is a diagram of pixel arrangements, in accordance with one embodiment of the present invention;

FIG. 33a is a divisional replacement algorithm, in accordance with one embodiment of the present invention;

FIG. 33b is a chart illustrating the divisional replacement algorithm of FIG. 33a;

DETAILED DESCRIPTION

Figure 1:
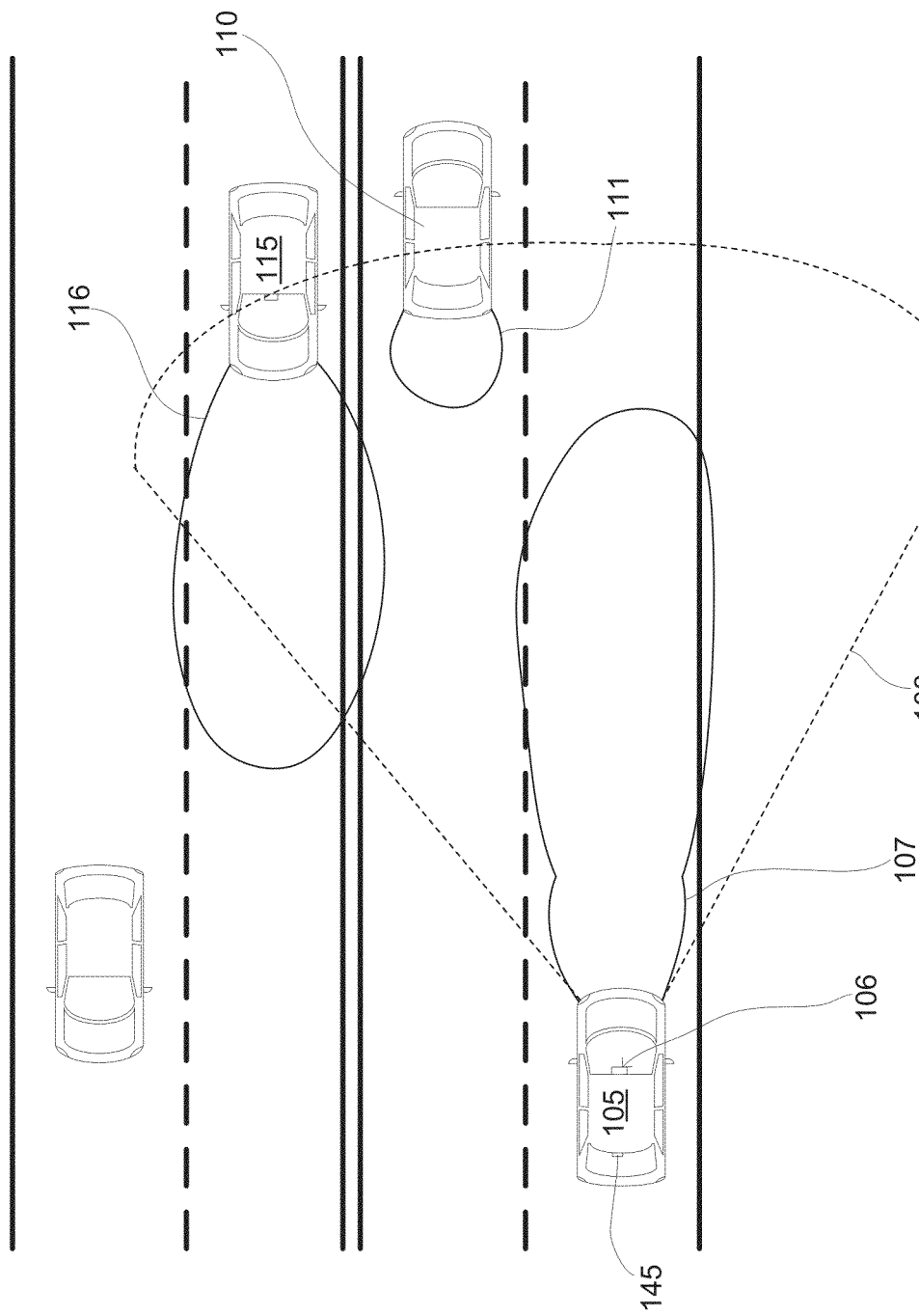
FIG. 1 is an environmental view of a controlled vehicle having an automatic vehicle equipment control system, in accordance with one embodiment of the present invention.

The present illustrated embodiments reside primarily in combinations of method steps and apparatus components related to an automatic vehicle equipment control system having at least one high dynamic range imager and methods thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring initially to FIG. 1, for illustrative purposes, an automatic vehicle equipment control system generally indicated at reference identifier 106 is shown to be installed within a controlled vehicle 105. Although the control system 106 is depicted to be integral with the interior rearview mirror assembly, it should be understood that the control system, or any of the individual components thereof, may be mounted in any suitable location within the interior, or on the exterior, of the controlled vehicle 105. The term "controlled vehicle" can be used herein with reference to a vehicle comprising an automatic vehicle exterior light control system, a lane departure warning system, other vehicle control systems described herein, the like, or a combination thereof, according to one embodiment. The control system 106 can include at least one imager (image sensor, imaging device, camera, etc.), wherein suitable locations for mounting the imager can be those locations that provide a substantially unobstructed view of the scene generally forward of the controlled vehicle 105 and allow for detection of headlights 116 of oncoming vehicles 115 and taillights 111 of leading vehicles 110 within a glare zone 108 associated with the controlled vehicle 105. As explained below, according to some embodiments, the control system 106 can vary an illumination pattern 107 (e.g., intensity, shape, etc.) of the controlled vehicle's 105 exterior lights so as to reduce glare for drivers of any vehicles in the glare zone 108.

Figure 2:
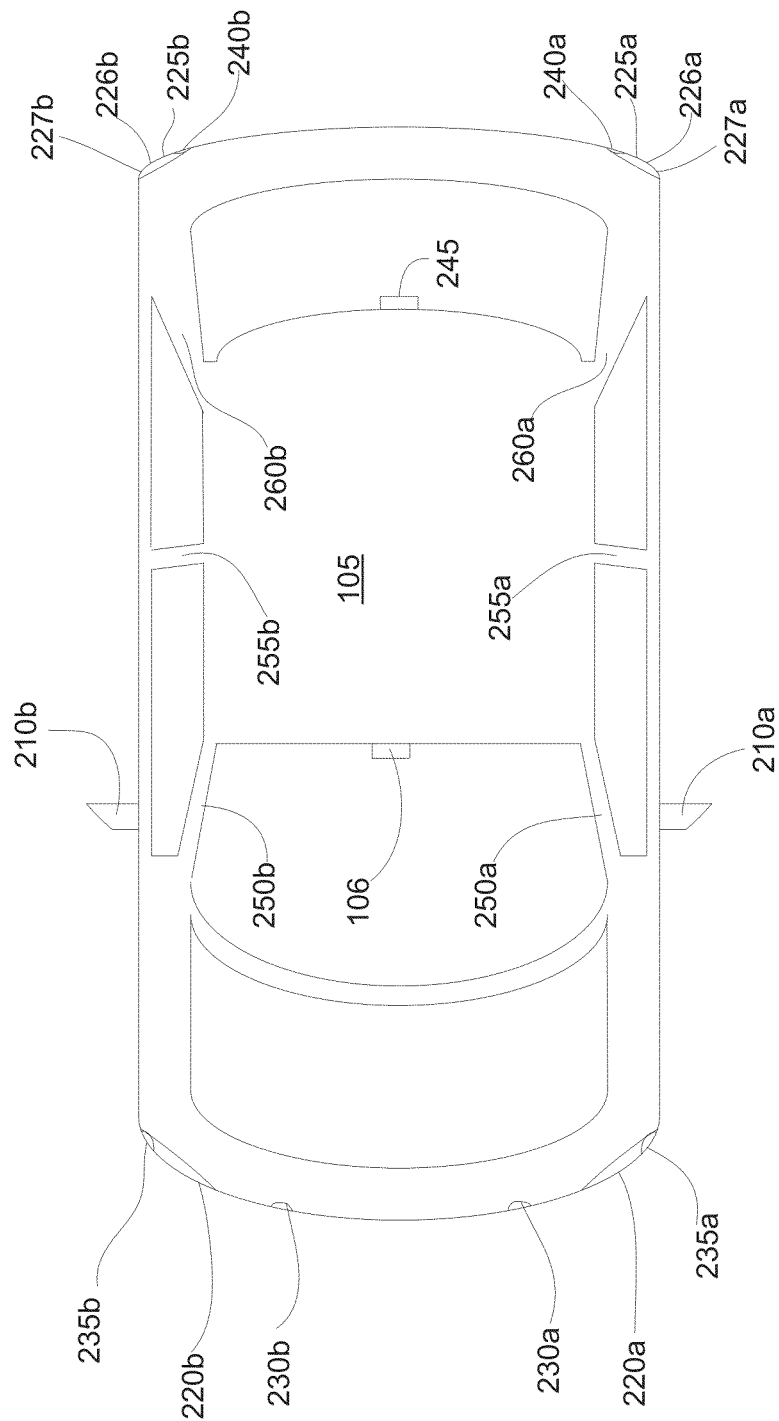
FIG. 2 is a schematic view of a controlled vehicle having an automatic vehicle equipment control system, in accordance with one embodiment of the present invention.

FIG. 2 depicts a controlled vehicle 105 comprising an interior rearview mirror assembly incorporating the automatic vehicle equipment control system 106 having a processing and control system (e.g., a processor, a controller, etc) and the imager. The processing and control system functions to send configuration data to the imager, receive image data from the imager, to process the images and to generate exterior light control signals. Detailed descriptions of such automatic vehicle equipment control systems are contained in commonly assigned U.S. Pat. Nos. 5,837,994, 5,990,469, 6,008,486, 6,130,448, 6,130,421, 6,049,171, 6,465,963, 6,403,942, 6,587,573, 6,611,610, 6,621,616, 6,631,316, 7,683,326, 6,774,988, 6,631,316, 6,587,573, 6,861,809, 6,895,684, and U.S. Patent Application Publication No. 2004/0201483; the disclosures of which are incorporated herein in their entireties by reference. The controlled vehicle 105 is also depicted to include a driver's side outside rearview mirror assembly 210a, a passenger's side outside rearview mirror assembly 210b, a center high mounted stop light (CHMSL) 245, A-pillars 250a, 250b, B-pillars 255a, 255b and C-pillars 260a, 260b; it should be understood that any of these locations may provide alternate locations for an imaging device, imaging devices, related processing, and/or, control components. It should be understood that any, or all, of the rearview mirrors may be automatic dimming electro-optic mirrors, and that descriptions of rearview mirrors is for purposes of explanation and not limitation, such that at least a portion of the control system 106 can be included in a rearview device (e.g., a mirror, a display, etc.). The controlled vehicle 105 is depicted to include a plurality of exterior lights including headlights 220a, 220b, foul weather lights 230a, 230b, front turn indicator/hazard lights 235a, 235b, tail lights 225a, 225b, rear turn indicator lights 226a, 226b, rear hazard lights 227a, 227b, and backup lights 240a, 240b. It should be understood that additional exterior lights may be provided, such as, separate low beam and high beam headlights, integrated lights that comprise multipurpose lighting, etc. It should also be understood that any of the exterior lights may be provided with positioners to adjust the associated primary optical axis of the given exterior light. It should be understood that the controlled vehicle of FIG. 2 is generally for illustrative purposes and that suitable automatic vehicle exterior light control systems, such as those disclosed in the patents and patent applications incorporated herein by reference, may be employed along with other features described herein and within disclosures incorporated herein by reference.

In at least one embodiment, a plurality of imaging devices are incorporated in a vehicle vision system along with at least one display configured to provide the driver with a "bird's eye" view of the area surrounding the controlled vehicle. For example, a first imaging device is integrated into an interior rearview mirror assembly viewing generally forward of the controlled vehicle, a second imaging device is integrated into a CHMSL 245 assembly or rear license plate area assembly viewing generally rearward of the controlled vehicle, a third imaging device is mounted proximate the driver's side of the controlled vehicle and a fourth imaging device is mounted proximate the passenger's side of the controlled vehicle. In at least one related embodiment, a digital image processing algorithm is implemented to synthetically "stitch" the individual images into one contiguous image for display to the driver. Any given imaging device, combination of imaging devices or sub-combination of imaging devices may then be employed for additional automatic control/warning tasks, such as; automatic high-beam assist, blind spot detection, lane departure, accident reconstruction, collision avoidance, tunnel detection, pedestrian detection, sign recognition, fog light control, etc.

Figure 3A:
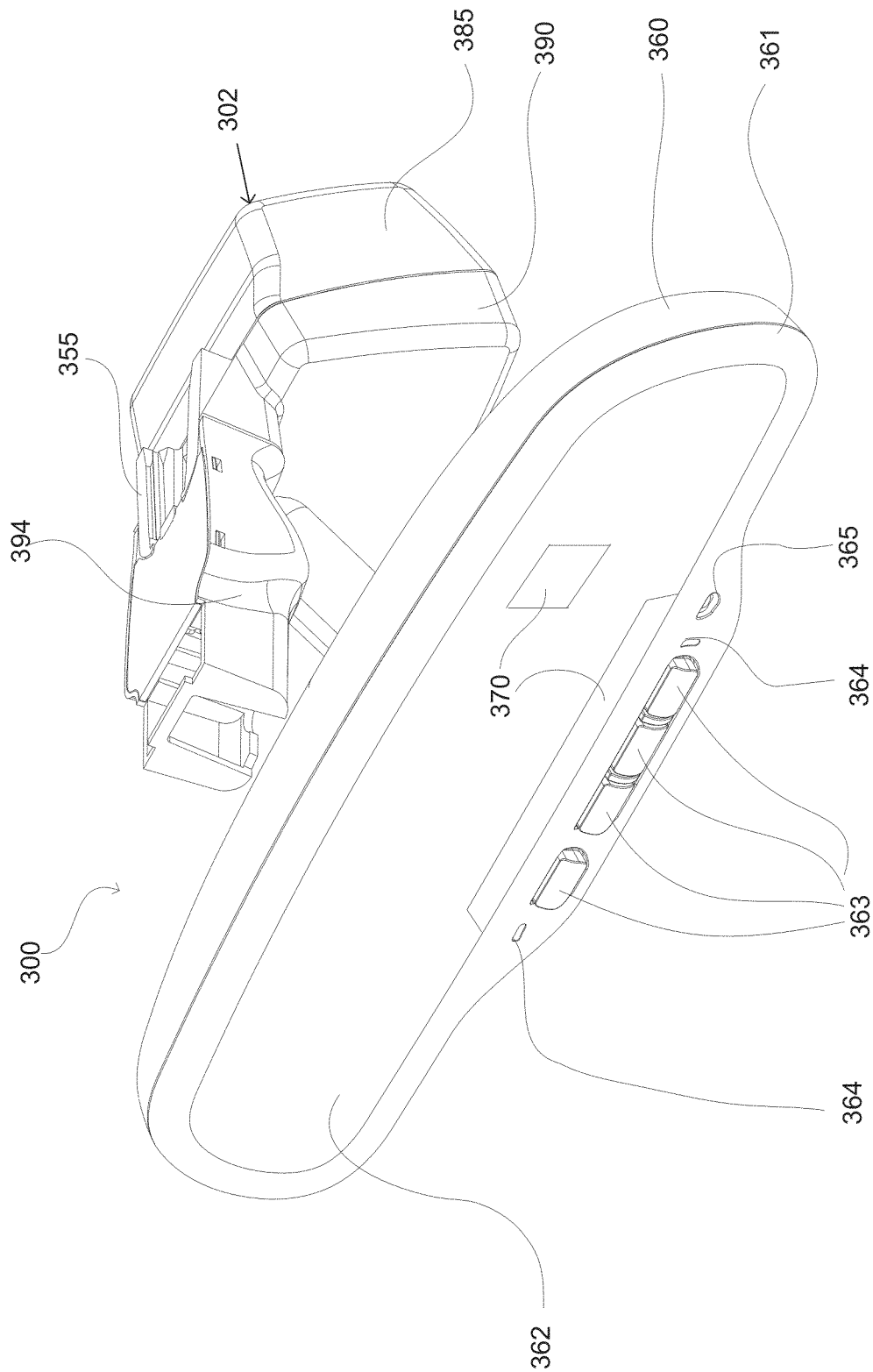
FIG. 3a is a front perspective view of a rearview device having an automatic vehicle equipment control system, in accordance with one embodiment of the present invention.
Figure 3B:
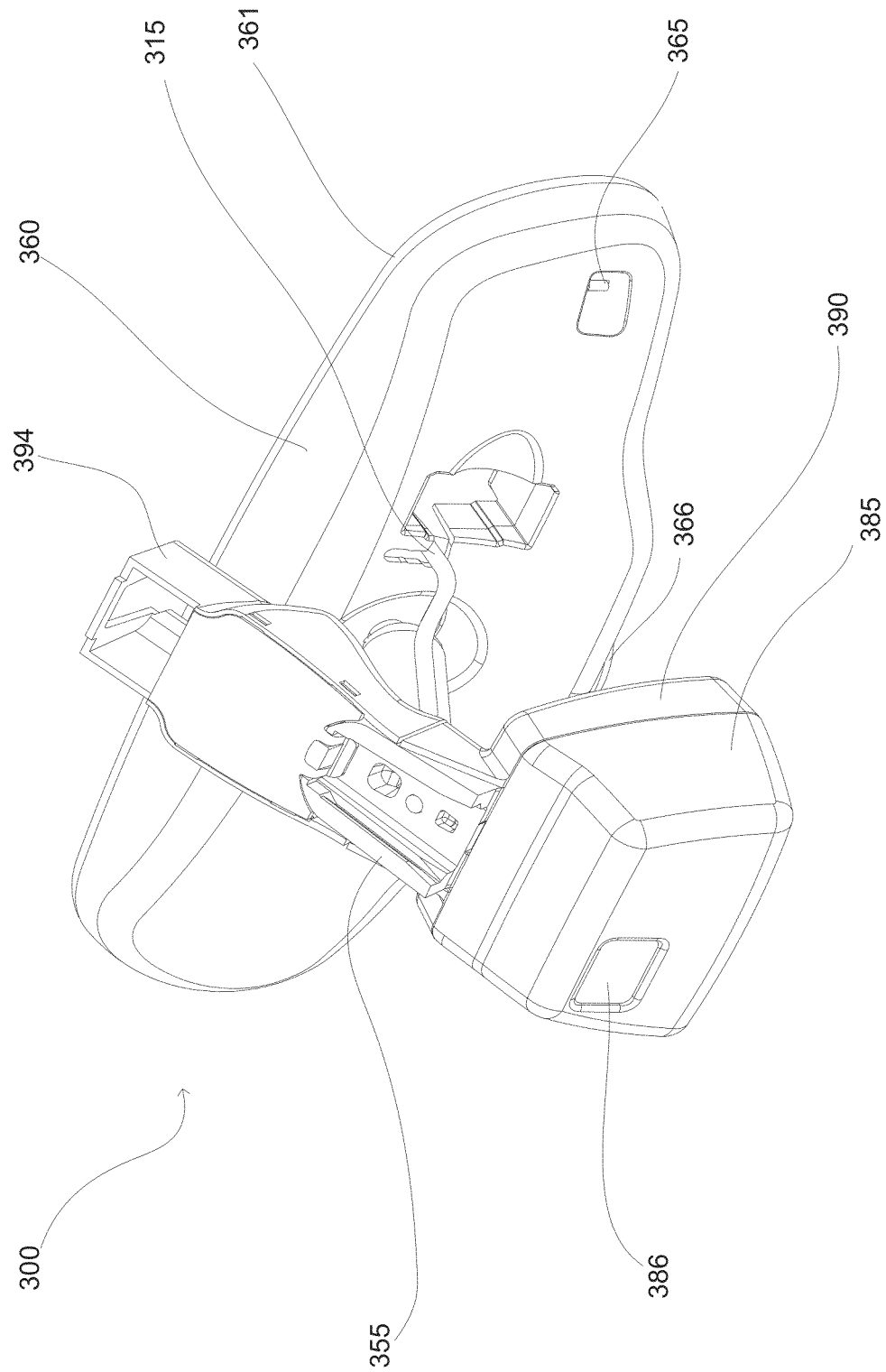

Turning now to FIGS. 3a and 3b, an embodiment of an interior rearview mirror assembly is generally shown at reference identifier 300. The mirror assembly 300 can include a stationary accessory assembly, generally indicated at reference identifier 302, which includes a front housing 385 and a rear housing 390. The front housing 385 can be configured to define an aperture 386 for an imaging device visual opening. The stationary accessory assembly 302 along with a rearview mirror 300 is carried by an attachment member 355. The rearview mirror 300 comprises a mirror housing 360, a bezel 361, and a mirror element 362. A wire cover 394 is included to conceal related wiring 315. The rearview mirror assembly 300 also incorporates an ambient light sensor 365, at least one microphone 366, a glare light sensor 365, operator interfaces 363, indicators 364 and at least one information display 370.

Figure 4:
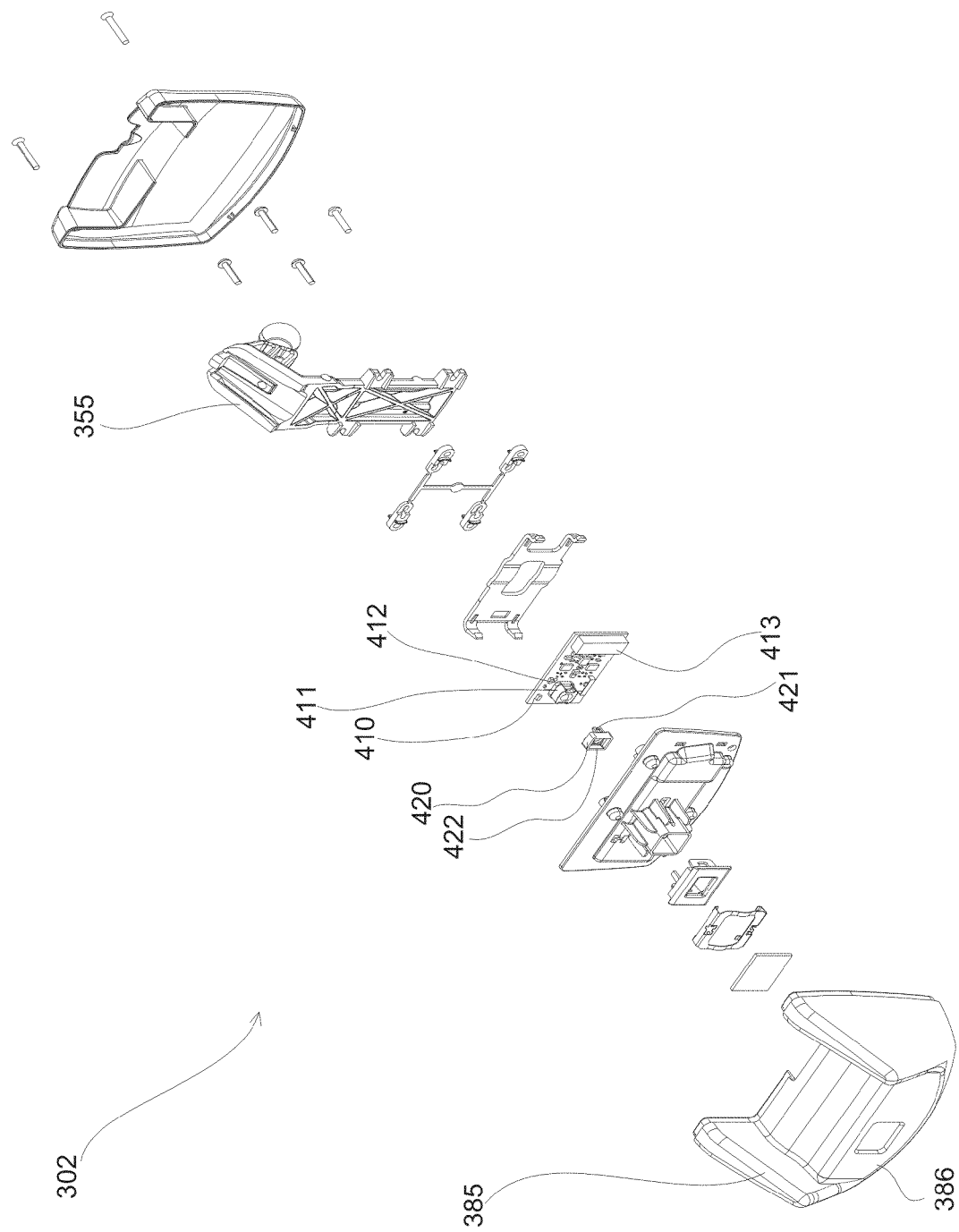
FIG. 4 is an exploded perspective view of an imager housing of a rearview device, in accordance with one embodiment of the present invention.

Turning now to FIG. 4, there is shown an exploded, perspective, view of the accessory assembly 302. In a preferred embodiment, the accessory assembly 302 can provide a rigid structure for mounting a repositionably mounted interior rearview mirror along with a precisely aligned imaging device either stationarily mounted, as described in more detail within commonly assigned U.S. Patent Application Publication No. 2004/0164228, or automatically repositioning, as described in commonly assigned U.S. Pat. No. 7,565,006, both of which are hereby incorporated in their entireties herein by reference. A preferred accessory assembly 302 can facilitate ease of assembly as well as provide for repeatable, reliable and precise alignment of the related components. In at least one embodiment, the associated imager is used for automatic exterior vehicle light control for which precision alignment of the image sensor is preferred. It should be understood that various inventive aspects of embodiments described herein have broad application to light sensing optics generally, in addition to, automotive and consumer electronics applications.

FIG. 4 illustrates various electrical and mechanical components and orientations thereof that can be at least partially enclosed in the accessory assembly 302, according to one embodiment. Imager board 410 is provided with an imaging device with lens 411. In a preferred embodiment, the imager board 410 will also include an image sensor control logic and timing circuit, communication line drivers and wire harness receptacle 413. Optionally, the imager board 410 may comprise a processor for receiving and, at least partially, processing images obtained from the imaging device. In a preferred embodiment, the imaging device and at least one other device selected from the group comprising; 1) an imaging device control logic; 2) an A/D converter; 3) a low voltage differential signal line driver; 4) a temperature sensor; 5) a control output; 6) a voltage regulator; 7) a second image sensor; 8) a microprocessor; 9) a moisture sensor; 10) a FPGA; and 11) a compass are integrated in a common application specific integrated circuit (ASIC), most preferably on a common silicon wafer. In at least one embodiment, the imaging device with lens 411 includes lens cover snap portions 412 configured for engaging a lens cover 420 and snap clips 421. The lens cover can be configured to define an aperture 422 for alignment with an optical axis of the imaging device and lens 411.

An imager board wiring harness is preferably provided with plugs on either end thereof. The imager board is preferably provided with a male receptacle for receiving one of the plugs of the imager board wiring harness. An imaging device in accordance with the present invention employs approximately 5.62 μm pixels and a high quality lens structure, according to one embodiment.

In at least one embodiment, a general purpose processor can be configured to determine electro-optic element control parameters, as well as, other functions, such as, automatic exterior light control; blind spot monitoring; information display; a sub-combination thereof; or combination thereof. In at least one embodiment, a first controlled vehicle CAN bus interface circuit can be configured to interface the general purpose processor to the controlled vehicle CAN bus. In at least one embodiment, a graphics processing unit can be configured to perform at least one of the functions: Lane Departure Warning (LDW); Adaptive Cruise Control (ACC); Collision Avoidance (CA); Traffic Sign Recognition (TSR); Automatic Headlamp Control (AHC); Pedestrian Detection (PD); Occupant Identification (OI); Drowsiness Detection (DD); Smart Airbag Deployment (SAD); Vehicle Theft Identification (VTI); Drive-by Wire (DBW); Blind Spot Detection (BSD); a sub-combination thereof; or a combination thereof.

In at least one embodiment, a first imaging device can be at least partially enclosed in the accessory assembly 302 having a generally forward view of the controlled vehicle 105. A second imaging device can be located proximate a license plate area of the controlled vehicle 105 having a generally one-hundred-eighty degree, rearward, view of the controlled vehicle 105. The first imaging device is configured to perform at least one of the functions: Lane Departure Warning (LDW); Adaptive Cruise Control (ACC); Collision Avoidance (CA); Traffic Sign Recognition (TSR); Automatic Headlamp Control (AHC); Pedestrian Detection (PD); Occupant Identification (OI); Drowsiness Detection (DD); Smart Airbag Deployment (SAD); Vehicle Theft Identification (VTI); Drive-by Wire (DBW); Blind Spot Detection (BSD); a sub-combination thereof; or a combination thereof. The second imaging device is configured to perform at least one of the functions: Lane Departure Warning (LDW); Adaptive Cruise Control (ACC); Collision Avoidance (CA); Traffic Sign Recognition (TSR); Automatic Headlamp Control (AHC); Pedestrian Detection (PD); Occupant Identification (OI); Drowsiness Detection (DD); Smart Airbag Deployment (SAD); Vehicle Theft Identification (VTI); Drive-by Wire (DBW); Blind Spot Detection (BSD); a sub-combination thereof; or a combination thereof. It should be understood that a first imaging device may be configured to function along with a second imaging device to perform at least one of the functions: Lane Departure Warning (LDW); Adaptive Cruise Control (ACC); Collision Avoidance (CA); Traffic Sign Recognition (TSR); Automatic Headlamp Control (AHC); Pedestrian Detection (PD); Occupant Identification (OI); Drowsiness Detection (DD); Smart Airbag Deployment (SAD); Vehicle Theft Identification (VTI); Drive-by Wire (DBW); Blind Spot Detection (BSD); a sub-combination thereof; or a combination thereof. It should be understood that the optical flow algorithms as described in commonly assigned U.S. Patent Application Publication No. 2010/0073480, which is hereby entirely incorporated herein by reference, may be employed to perform at least one of the functions: Lane Departure Warning (LDW); Adaptive Cruise Control (ACC); Collision Avoidance (CA); Traffic Sign Recognition (TSR); Automatic Headlamp Control (AHC); Pedestrian Detection (PD); Occupant Identification (OI); Drowsiness Detection (DD); Smart Airbag Deployment (SAD); Vehicle Theft Identification (VTI); Drive-by Wire (DBW); Blind Spot Detection (BSD); a sub-combination thereof; or a combination thereof.

In at least one embodiment, the present invention relates to algorithms to acquire data from a high dynamic range imaging device that is mounted in an approximately forward facing position, preferably so that it provides a view of the road ahead through the windshield of the controlled vehicle 105. This imaging device is utilized to provide images that are used to perform functions, preferably more than one, that include sensing of the vehicle's 105 position relative to lane markers on the roadway. Some of the other functions for which the imager is used may also include detection of lights from other vehicles on the road to make a determination of headlamp settings to use to minimize glare to drivers of other vehicles that are on the road. To perform this function, it is preferable to provide an imaging device that incorporates a color filter array to enable a determination of the color of lights, particularly red tail lamps 111, oncoming headlamps 116, and lane markers that are detected in the images. The provision of color sensing capability is then useful for other imaging device functions including the lane detection function.

For purposes of explanation and not limitation, the system 106 can be used to detect one or more lane markers, such that the system 106 can be emit a lane departure warning (e.g., visual, audible, tactile, mechanical, etc.), and the system 106 can be configured to enhance a color (e.g. yellow) of a lane marker. Many of the lane markers used to mark boundaries between lanes used for opposing directions of travel are yellow or perhaps orange in color, particularly in the United States. Some implementations of lane departure warning process black and white or grayscale images to perform the lane detection function. When a tiled Bayer color filter array or other color image sensing technology is used to sense color, the generation of a high quality black and white image is preferably accomplished by first interpolating at least one of the color components at each pixel site where it is missing to provide all or at least one of the color components at each pixel site and the grayscale image is preferably generated as a weighted average or other function of one or more of the color components at each pixel location. Following luminance extraction for grayscale conversion, even if all of the interpolated color components are not used to provide the grayscale image, remaining color components may be needed for specific functions. For example, yellow is complementary to blue, so detection of yellow road markings depends at least in part on use of the pixel's blue value to detect the low blue content relative to the red and green content of the pixel. This is typically the strongest indicator that distinguishes yellow lane markings from the surrounding roadway.

When the system 106 includes the imager that is configured to capture high dynamic range images, the system 106 can be configured to enhance high dynamic range color interpolation. With imagers having a conventional Bayer red, green, green, blue color filter array, only one in four pixels has a red (blue) filter so the image created by the red (blue) color components is greatly enhanced by provision of the interpolated red (blue) values for non-red (non-blue) pixel locations and the quality of the interpolated image is strongly dependent on the quality of the interpolation algorithm that is used. The color interpolation algorithm preferably includes analysis of image data to detect edge patterns in the image and interpolated values are based, at least in part, on detected edge patterns. A preferred interpolation arrangement described in commonly assigned U.S. Patent Application Publication No. 2010/0195908, the disclosure of which is incorporated in its entirety herein by reference, performs edge pattern and/or other pattern detection based primarily on pixels in a five by five pixel neighborhood of the pixel site for which an interpolated value is being calculated and selects an interpolation equation based in part on edge patterns and/or other patterns that are detected. The edge pattern detection may optionally be limited to pixels having color filters of a selected color—green for example. Then an interpolation equation is selected at least partially based on the position of the pixel relative to the mosaiced color filter array pattern, the color of the missing component that is being calculated, and the edge pattern, if any, detected for the pixel location where the interpolation is being performed.

With a high dynamic range camera the ratio of pixel values of adjacent pixels, even for pixels with filters of different colors are normally limited due to limitations of the lens and the imaging device. However, the ratio in values between a first pixel and a second pixel that are adjacent may be nearly as high as the ratio in values between the second pixel and a third pixel that is adjacent to the second pixel on a side opposite to that of the first pixel so that the ratio between the values of first pixel and the third pixel with only one pixel between them may nearly equal the square of ratios of values of adjacent pixels. A five by five neighborhood of an interpolation site contains sixteen pixels that have one pixel between them and the interpolation site at the center of the array, while a three by three neighborhood of an interpolation site has no pixels with an intervening pixel between them and the interpolation site at the center of the array.

For interpolation calculations using pixel values from the five-by-five array, the extremely large ratios between the pixel value at the interpolation site at the center of the array and the non-adjacent pixels may lead to one or two pixel values that dominate the calculated result. Since color interpolation in an image is an approximation process, such results for interpolated color values may differ drastically from the true color or intensity of the pixel's color components that are being approximated by the interpolation and these errant pixel values may stand out as objectionable blemishes in the resulting visual image and may lead to errors or to degraded performance in image interpretation when used in machine vision applications. The interpolation errors propagate to calculated grayscale values so that they also adversely affect use of associated grayscale images. Inspection of high contrast portions of high dynamic range images having interpolated values based on use of pixel values in a five by five (5×5 kernel) array of values surrounding an interpolation site confirmed the occurrence of objectionable numbers of pixels having serious interpolation errors. A set of interpolation equations that are primarily a function of pixel values from a three by three neighborhood of the interpolation site was developed, as detailed in commonly assigned U.S. Patent Application Publication No. 2010/0195908, includes pixel values of pixels having filter colors different from the color being interpolated in a substantial number of the interpolation equations. These equations were selected based on edge detection algorithms that use pixel values that include values of pixels that are outside of the three by three neighborhood of the interpolation site.

Using the edge pattern detection with the larger pixel base to select interpolation equations that used the smaller pixel base provided results having far fewer interpolation errors that stand out in the image as compared with similar edge pattern detection algorithms used to select interpolation equations based on values from a five by five neighborhood of the interpolation site. The interpolation equation used to calculate each missing color component is selected based on the edge pattern detection using pixel values from a neighborhood of the interpolation site that extends beyond a three by three neighborhood of the interpolation site and the interpolation equations are primarily based on values that fall within a three by three neighborhood of the pixel for which a missing color component is being calculated. Stated another way, the interpolation equations are primarily based on the values of pixels that are at the interpolation site or are immediate neighbors of the interpolation site and patterns that are detected using pixel values, which include values of pixels that are not at the interpolation site or an immediate neighbor of the interpolation site. The interpolation values based on pixel values from the smaller neighborhood of the interpolation site and edge pattern detection based on a larger neighborhood of the interpolation site also provided a dramatic improvement over bilinear interpolation that also calculates interpolated values based on pixel values in a three by three neighborhood of the interpolation site. However, conventional bilinear interpolation does not employ edge pattern detection and uses pixel values only from pixels with like colored filters to calculate an interpolated value for the color. The present method, as detailed in commonly assigned U.S. Patent Application Publications Nos. 2010/0195901 and 2010/0195908, the disclosures of which are incorporated in their entireties herein by reference, includes pixel values of pixels having filter colors different from the color being interpolated in a substantial number of the interpolation equations.

In a preferred embodiment, an image that includes a view of the roadway is acquired with an imaging device that has a color filter array. Interpolation to supply missing pixel color components is performed, preferably using edge pattern detection as indicated earlier and in commonly assigned U.S. Patent Application Publication Nos. 2010/0195901 and 2010/0195908, and color component values are preferably calculated for pixels in the image. Grayscale values related to the luminance for each pixel are also preferably calculated and used. Color component values of pixels in the image are preferably analyzed to detect pixels that are in a color range that indicates that they may be road markings of a selected color or colors or range of colors, yellow for example. In the preferred embodiment, yellow pixels are detected. The grayscale values for pixels of the selected color are modified, preferably by increasing their values relative to the non-yellow pixels, in order to facilitate their detection as lane markings in the monochrome image based on the grayscale pixel values, and the grayscale values are modified to enhance detection of lane markings as indicated herein to be analyzed to determine the presence of lane markers along with the position of the vehicle 105 relative to the markers. Selection of pixels of a particular color is typically most effective when applied to a color or colors such as yellow that constitutes a common class of lane markings. Additionally a color, such as yellow, that is normally more prevalent in road markings than in other portions of the roadway makes it a preferable choice.

As an option, the indication that a pixel is in a preselected color range may be communicated in other ways such as setting an indicator bit associated with the pixel, but when a particular image is processed to detect and analyze roadway markings, it is preferable to modify this image to enhance pixels of the selected color in a way that facilitates extraction of pertinent features. In a preferred embodiment, the grayscale values of yellow pixels in the image used for analysis were approximately doubled relative to other pixel values. Certain devices used for image analysis map the pixels to reshape the image by application of a spatial transformation for purposes, such as, but not limited to, presenting a top down view, correcting lens distortion, or stitching multiple images. Such transformations of the image can make it difficult to keep track of separate pixel related information as the image is subjected to these transformations. Thus, in the preferred embodiment, color related features in an image are detected and used to enhance a gray scale version of the image prior to performing a spatial transformation or mapping of the image so as to reshape it. In the preferred implementation, the color based enhancements are subjected to substantially the same spatial transformation as the rest of the image.

According to one embodiment, the system 106 can be configured to dynamically adjust color detection criteria based upon probable prevailing lighting conditions. Skylight has stronger blue content than direct sunlight and shadowed areas normally receive more illumination from the blue skylight than from the direct sunlight altering the apparent color of objects in shadows relative to objects in direct sunlight. The determination that a pixel was yellow was made using image pixel data with all of the red, green, and blue color component values after interpolation. To determine if a selected pixel is yellow, the color ratios of various color component values for a pixel to other selected color component values for the same pixel are tested to see if they all fall within specified ranges and a pixel is classified as yellow when the specified criteria are met. Comparisons are preferably arranged to utilize multiple operations instead of divides that normally require more resources and computing time. The ratio bracketing comparisons for yellow generally include comparisons to assure that the blue pixel color component value is sufficiently low relative to the red and/or green color component values for the same pixel and that the ratio between the red and green pixel color component values is in a range consistent with the color being classified under the current lighting condition. Pure yellow is normally specified as full red and full green content with no blue content. With the high dynamic range image, the readings depend very strongly on illumination so yellow needs to be identified over a wide range of illumination levels and for a wide range of light sources as well as for a wide range of yellow road marker conditions. Use of the same criteria for yellow in both shadowed areas and directly sun lighted areas results in classifying too much as yellow in the sunlight areas of the road and/or classifying too little as yellow in shadowed areas. Since pixel values in areas exposed to direct sunlight are normally more than ten times higher than corresponding pixel values in full shadow areas, higher pixel readings may be used to differentiate sunlit from shadowed areas. As an example for a specific imaging device, a green pixel value of 30,000 was selected as a threshold level between typical pixel values for sunlit and shadowed areas and pixels with green pixel color component values that exceeded this level were classified as yellow using a direct sunlight criteria tuned to a lower color temperature and pixels with green pixel color component values that did not exceed this level were classified as yellow using a shaded area criteria tuned to a higher color temperature. As further options, a functional relationship with pixel values might be established to adjust the yellow classification criteria in a continuous or multiple stepwise fashion. Additionally, other yellow classification criteria are appropriate for cloudy days versus sunny days, and yet another for headlamp illumination where the classification criteria is preferably selected particularly for the type of headlamp on the vehicle on which it is installed and optionally for more individualized characteristics of the headlamp system as well. The type and color characteristics of the roadway may also be taken into account in selection of the color criteria. Here, the relative color content of pixels classed as yellow versus the color content of pixels not classified as yellow may be assembled in histogram form and the resulting histograms may be analyzed to determine threshold levels in relative color content that provide good separation between the yellow and non-yellow classification. Adjustment of the thresholds used for the classification may then be based at least in part on these threshold levels. Optionally, when conditions are such that the histograms reveal that separation is poor, the color enhancement mode may be turned off or de-emphasized.

Color detection parameters may be adjusted based at least in part on pixel intensity to compensate for illumination directly from the sun in sunlit areas and from skylight with higher blue content in shadowed areas, and such adjustments may be extended to accommodate other situations. For example, the color of daylight is also affected by the type and degree of cloud cover. To evaluate the type and degree of cloud cover, portions of the sky may be detected in images acquired by the camera and detection of various types of clouds may be based in part on color, pixel intensity, or on spatial variation in pixel intensity indicating partial cloud cover. This data may be used to further differentiate lighting conditions to indicate probable or directly measured color content of the illumination source and selection of color detection thresholds may be based in part on image data from images of the sky. Additionally, the color of pixels from images of lane markings identified by features such as position, size, and orientation, as well as of general color may be used to adjust color detection thresholds to increase inclusion of these colors. Likewise, the color of areas that are detected as lane marking colors but are clearly not may be used to adjust color thresholds to decrease inclusion of these areas. For night-time driving, general illumination levels may be used to indicate that illumination is primarily from the headlamps 220a, 220b of the vehicle 105 on which the lane departure control is mounted and known properties, particularly color content, of the vehicle's headlamps 220a, 200b may be used as the basis for the color detection criteria. The use of color detection is more beneficial in some cases than others depending on the relative difficulty in the detection of the color of lane markers and of the difficulty in detection of lane markers without use of the color information so, as an option, the color detection may be enabled selectively based on lighting conditions that are detected in much the same way that color detection parameters are adjusted based on detection of lighting conditions when color detection is used. As a further option, rather than enabling or disabling the use of color detection altogether the level of image enhancement applied as a result of the detected colors may be altered based on assessments of the quality of the color detection and/or of the benefit of applying the color enhancement.

The following is the "C" programming language code that can be used to classify yellow for a sunny day as just described.

```
/* Parameters to define yellow and to define the red proportion
   in the luminance calculation, green makes up balance. */
/*Pixel color component ratio threshold levels for sunlit areas. */
static float MinRedToBlue = (float)1.7;
static float MinRedToGreen = (float)0.75;
static float MaxRedToGreen = (float)1.7;
/*Pixel color component ratio threshold levels for shadow areas. */
static float MinRedToBlueSh = (float)1.5;
static float MinRedToGreenSh = (float)0.6;
static float MaxRedToGreenSh = (float)1.3;
/*Fraction of Red to green used in pixel luminance calculation*/
static float YRedFraction = (float)0.4;
       tmprf = (float)tmpr;
       tmpbf = (float)tmpb;
       tmpgf = (float)tmpg;
       if( ((tmpgf > 30000.0) &&
/*Color test for high illumination "Sunlight"*/
          (tmprf > MinRedToBlue * tmpbf) && (tmprf >
MinRedToGreen * tmpgf) && (tmprf < MaxRedToGreen * tmpgf))
          ||
/*Color test for low illumination "Shadow"*/
          ((tmpgf <= 30000.0) &&
           (tmprf > MinRedToBlueSh * tmpbf) && (tmprf >
MinRedToGreenSh * tmpgf) && (tmprf < MaxRedToGreenSh * tmpgf)))
       /*Double pixel values to enhance pixel of when classified to be in
specified color range*/
       {
              tmprf *= 2.0;
              tmpgf *= 2.0;
              tmpbf *= 2.0;
       }
       /*Pixel luminance calculation*/
       /*tmpg below was intended to be tmpgf instead but was tested this
way with favorable results so will not be "corrected" until the effect of
correction is investigated*/
       tmpr = tmpg = tmpb = (int32_t)((tmprf * YRedFraction) +
tmpg * (1 - YRedFraction)));
```

Figure 33B:
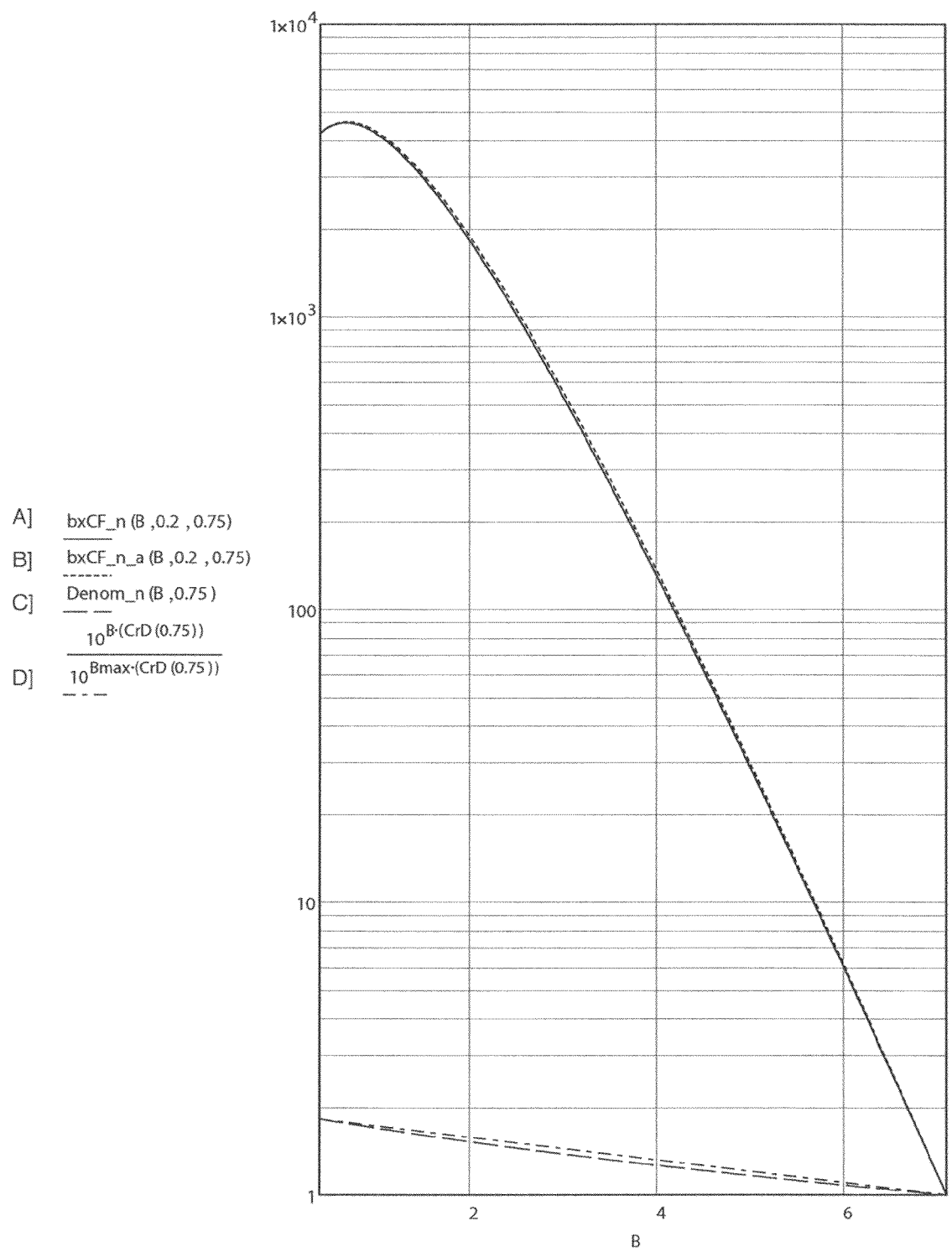

According to one embodiment, the system 106 can be configured to reduce an amount of processing performed by one or more processors on the system 106. One example is to replace a denominator term that requires a repetitious division by a calculated adjustment to an exponent that is already a part of a calculation to provide an approximation to the original equation that eliminates the repetitious division. Turning now to FIGS. 33a and 33b a division replacement algorithm is described for replacement of various mathematical divide functions that would otherwise be utilized to calculate various image information. BASE is the bilateral filter value that is calculated for each pixel. In equations depicted in FIG. 33a and as represented in FIG. 33b, BASE is represented either by BASE or as B. Equations 1] through 9] used to support the approximation to eliminate the denominator term are listed in FIG. 33a below. Equation 1] indicates the maximum value, Bmax, and minimum value, Bmin, of BASE to be used to map a pixel into the output image. Brange is Bmax minus Bmin. These values are established on a frame by frame basis. Equation 2] is a Durand-Dorsey equation used to calculate the compression factor, CF(BASE, Cr), as a function of BASE, the bilateral filter value calculated for each pixel, and of the compression ratio, Cr, that is calculated for each frame. Equation 3] indicates the bFactor that can be added as a multiplying factor of the Durand-Dorsey compression factor CF to substantially improve the tonal balance of the resulting image. Equation 4] indicates the combined compression factor that, for convenience of plotting in FIG. 33b, is normalized to 1 for BASE equal to Bmax. In the actual application, the constant scaling factor would preferably be chosen to properly limit the number of pixel values that are saturated after tone mapping.

The per pixel division needed to implement the denominator term of Equation 3] is costly to implement. A logarithmic plot of the compression factor, CF, of Equation 2] is a straight line whose slope is determined by the compression ratio, Cr. A logarithmic plot of the denominator term in Equation 4] is close enough to a straight line that it may be approximated by a straight line. Equation 5] is the numerator of Equation 3] normalized to 1 for the BASE equal to Bmax. Equation 6] is the denominator of Equation 3] in its reciprocal form, normalized to 1 for the BASE equal to Bmax. Equation 7] is a calculation of the compression ratio modification, CrD, that is used in an exponential expression to approximate the value of Denom_n of Equation 6]. When CrD is used in an exponential expression similar to the one for CF and is scaled to 1 for BASE equal to Bmax, the value of the exponential expression is equal to the expression for the normalized denominator in Equation 6] for BASE equal to Bmin and for BASE equal to Bmax. Then Equation 8] indicates that the product of the exponential terms for the Durand-Dorsey compression factor CF and the approximation for the denominator term reduces to the addition of CrD to Cr in the Durand-Dorsey expression, i.e. of a modification of the compression ratio in the Durand-Dorsey expression that is already part of the compression factor calculation. Thus, the once per pixel evaluation of the denominator term, along with the division that it requires, is replaced by the evaluation of Equation 7] once per frame and addition of the result to the compression ratio Cr used in the Durand-Dorsey equation. The scaling multiplier is also adjusted to reflect the adjustment to Cr and then only the numerator term and the Durand-Dorsey compression factor remain to be calculated on a per pixel basis. Equation 9] indicates the final approximating equation normalized to one for BASE equal to Bmax.

In FIG. 33b below curve A] is a plot of the product of Durand-Dorsey compression factor and the modifier; curve B] is a plot using the approximation that eliminates the denominator term; curve C] is a plot of the denominator term in its reciprocal form; and curve D] is a plot of the exponential approximation used for the denominator term.

Figure 9:
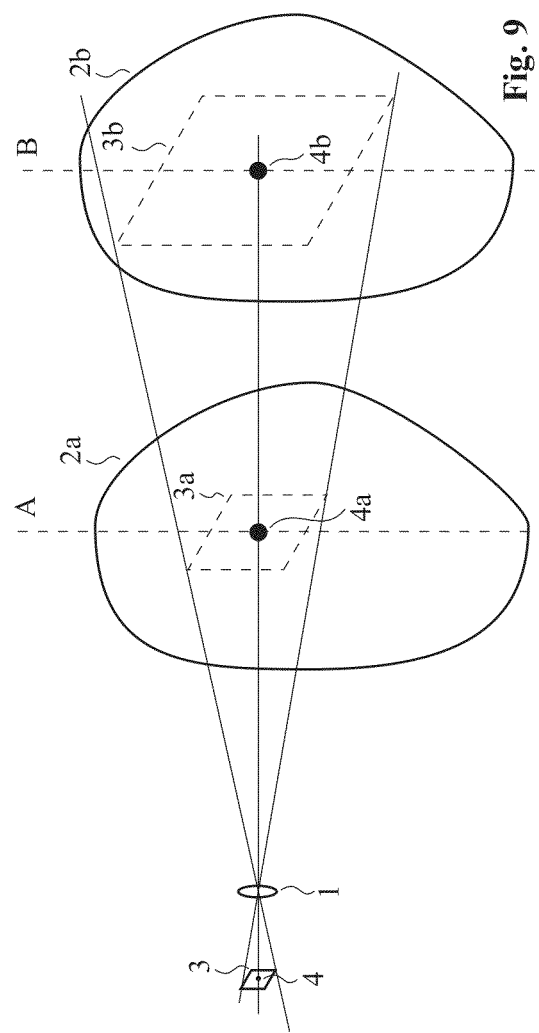
FIG. 9 is a schematic diagram of an imager system imagining a scene, in accordance with one embodiment of the present invention.

According to one embodiment, the system 106 can be configured to process the one or more high dynamic range images to control exterior lights of the vehicle 105, such as, but not limited to, detecting headlights 116 of the oncoming vehicle 115 and/or taillights 111 of the leading vehicle 110 to turn on or off high beam lamps of the controlled vehicle 105, control an illumination pattern of the headlight 220a, 220b of the controlled vehicle 105, the like, or a combination thereof. Turning now to FIG. 9, lens 1 represents a preferred imaging device lens. Object 2a represents a remotely illuminated object having a diffusely reflecting surface that is positioned at a distance A from the imaging device and object 2b represents the same object after it is moved to distance B that is twice as far as distance A from the lens 1. Dashed line square 3a represents the area from object 2 at distance A that is projected onto a pixel 3 of the imaging device, and point 4a represents a small area light source, also at distance A that is projected as a spot 4 on the pixel 3. In this example, object 2b, dashed line square 3b, and small area light source 4b represent the same components as at location A but moved from location A to location B so they are twice as far from the imaging device. In the example, it is assumed that the illumination of the object and the intensity of the small area light source are the same at location B as at location A. The linear dimensions of the square 4b are double and the area four times that of the linear dimensions and area of square 4a. The light that is projected onto area 4 of pixel 3 from the small area source or from a given very small area of the larger object decreases as the square of the distance to A or to B so it is one fourth as great at B but the area of the square 4b is four times larger than square 4a offsetting the reduction due to distance so the contribution to light intensity projected onto the pixel remains nearly constant with distance for the large area lighted surface so long as its projected area covers the pixel whereas the intensity of the small area light source falls off as the square of its distance from the imaging device.

Below are example advantages of an imaging device in accordance with the present invention for headlamp control using a repetitive frame rate imaging device and investigate ways to utilize the strengths to mitigate the challenges presented by the repetitive frame acquisition and loss of flexibility to acquire images using a large variety of capture sequences and the loss of the solid color spectral filter patterns provided by the dual lens imaging device of the prior art. With the seven to one decrease in pixel area compared to the imaging device of the prior art, an imaging device in accordance with the present invention has reduced sensitivity to lighted objects having a large area and low luminance; but, for small area light sources of high luminance and with a high quality lens, most of the light from such a light source that strikes the lens (more accurately, the entrance pupil of the lens) may be focused onto a single pixel or a very small group of adjacent pixels. With the high quality, well focused lens, even light from distant tail lamps 111 gives a relatively strong response for pixel reading for the individual pixel or small cluster of pixels on which the light is focused. The high dynamic range of the imaging device in accordance with the present invention makes it possible to image headlamps 116 and tail lamps 111 directly whether they are very close or very distant and to do so without saturation of the imaging device. By providing a device to efficiently locate and provide image data for these light sources in successive images, statistically calculated light levels may be provided for each of the spectral filter array colors and comparisons of the statistically calculated values for each of the color components, based on readings taken over time as the position of the projected image changes over time, may be used to differentiate one type of lamp such as red tail lamps 111 from other light sources. The same image data from successive frames for a given light may be further utilized to provide other classifications for position and trajectory of the light sources that may be used with or even in place of color to differentiate various types of light sources including headlamps 116, tail lights 111, street lights, and illuminated signs. Statistically calculated intensity may also be one of the best indicators of distance given the square law falloff of light level with increasing distance to indicate the distance of the light source from the vehicle with the imaging device. With imaging devices with a conventional dynamic range, direct images of light sources are normally saturated except for images of very distant lamps and prior art high dynamic range imaging devices have not typically provided accurate light level readings over their usable dynamic range, having addressed these issues with the imaging device used to practice this invention, effective use of this option is enabled and enhanced by the very high dynamic range of the imaging device.

For light sources that are 100 or more yards away, the typical image of an individual headlamp or tail lamp may be comparable to the size of an individual pixel and as the position of the headlamp or tail lamp changes in the field of view of the imaging device, the image will strike various pixels or more normally be divided between a very small cluster of two or more adjacent pixels. Individual images in a sequence of images may be analyzed, preferably as they are acquired, to locate bright spots in the image. This data is preferably recorded in a way that provides indication of the locations of the bright pixels in the array along with indication of the color of the spectral filter that covers the given pixel(s). The indication of the spectral filter color may be implicit given the pixel location. Then the recorded data on bright spots may be analyzed to classify ones that are likely to have originated from light sources such as headlamps or tail lamps to which the control should respond. Once bright spots are classified as ones needing further processing, a record is created and maintained to record data such as position and an indication of relative time of acquisition, and intensity as measured for pixels in the neighborhood of the bright spot so that pixels with spectral filters of more than one color are included and this record is maintained and refined as the associated bright spot is tracked through multiple images. This data may be used immediately for analysis and/or entered in the record as needed. In one algorithm that uses data acquired as indicated above, for each of the sets of pixel readings taken for a given light source through color array spectral filters of a given color, the pixel readings of pixels associated with the light source may be queried to find the one or ones with the peak pixel reading in a sequence of images and this peak reading may be used for the color component. Optionally, other algorithms or a combination of algorithms may be used to analyze data to formulate an estimate of color and intensity of the light source. Additionally, other information such as trajectory, relative speed, and size of the light source, the presence of an associated separate light source such as the other light from a pair of headlamps of an oncoming vehicle or tail lamps of a leading vehicle may be detected and used as further attributes to classify a given light source. The accuracy of a measurement such as color, intensity, or position of a dual or multiple light sources may be improved by taking and utilizing measurements taken on the light from one or more of the associated images of the light. Note here the synergy of locating and keeping track of a light source through multiple images and then using this data base for determining more than one property of the light source. These properties may include, but are not limited to, determinations of color, intensity, a profile of intensity versus time, position, trajectory, velocity, the like, or a combination thereof.

When the image of a light source moves randomly on the surface of the imaging device, which is often the case with an imaging device mounted in the controlled vehicle 105, totaled response of pixels having spectral filters of a given color will be approximately proportional to the density of these pixels having spectral filters of the given color in the array and to the number of values accumulated in the total. For example, in a conventional Bayer pattern spectral filter array, 25% of the pixels have red spectral filters, 50% of the pixels have green spectral filters, and 25% of the pixels have blue spectral filters so that totaled response of green spectral filtered pixels will be about twice that of totaled response of red or of blue pixels relative to response of pixels of each color to direct exposure to the imaged light source. Totaled response of pixels of a given color to the light source will be approximately proportional to the percentage of pixels that have the particular color spectral filter in the spectral filter array, for example 25% for red and for blue and 50% for green. These percentages are best adjusted based on experimental results. Since the methods are statistical, it is prudent to provide ways to estimate the accuracy of the results. One way to estimate the accuracy is to apply more than one algorithm to obtain two or more results and to compare values calculated using the different algorithms to see if they are acceptably close. For example, peak readings may be compared against totals adjusted for the number of readings and the density of the pixels with spectral filters of the given color in the array. Other quality assessments may be made. For example, for a conventional Bayer pattern RGB color spectral filter array, half of the pixels with green spectral filters are in rows having alternate neighboring pixels with red spectral filters and the other half of the pixels with green spectral filters are in rows having alternate neighboring pixels with blue spectral filters. Statistically, the total response for pixels in these two sets should converge to nearly equal values as pixel response to a light is observed over a number of sequential images. Sums of green pixel values for green pixels in the row with blue pixels and for green pixels in the row with red pixels may be separately accumulated and compared to provide an additional estimate of the statistical quality of measurements based on time averaged response of pixels with spectral filters of a given color to a given light source adjusted for density of said pixels in the imaging array.

The problem of detecting headlamps 116 and tail lamps 111 increases with distance. Detection of headlamps 116 out to several thousand feet and of tail lamps 111 to over a thousand feet is needed to appropriately control the headlamp dimming function of the controlled vehicle 105. Most headlights 116 and tail lights 111 have dimensions smaller than those subtended by one pixel for distances from the imaging device that exceed several hundred feet and may be reasonably classed as small area sources whose intensity falls off as the square of the distance from the imaging device when distances exceed several hundred feet.

As noted above, images of light sources that cover only a very small number of pixels do not provide adequate information to provide reliable color information based on interpolation. The image may be diffused, perhaps by using birefringent filters, but precisely controlled diffusion is expensive to implement and reduces image resolution. As also explained and illustrated above, one way to preserve high resolution is to take advantage of the relatively high image frame rate and to locate and create histories associated with particular light sources in the sequence of images. A first and computationally intensive step to locating light sources in an image is to scan the image and locate local pixels with peak reading values that exceed a minimum threshold set for a given spectral filter color. Since both tail lamps 111 and headlamps 116 have red content, detections of lights in the image may be based on the location of red pixel values that are greater than or equal to the pixel values of the nearest red neighbors. The minimum thresholds for each color are preferably set based on various image parameters such as the density of bright spots in an adjoining area of the image. The minimum thresholds for each color may optionally be equal.

When a color spectral filter array is used, edge preserving color interpolation is typically needed to provide pixel color and luminance information for objects that are large enough to span several contiguous pixels in the image but normal color interpolation is not appropriate for determining color for an isolated image of a distant small area light source and different algorithms are needed to provide reliable color data for images of these distant, small area light sources. This said, color interpolation and locating local peaks of image pixel readings in the image through different calculations that serve different purposes are each computationally intensive and each is preferably based on the same pixel data from the imaging device. Furthermore, each may be primarily based on pixel data acquired by the imaging device in a small neighborhood of a targeted pixel location. For both it can be advantageous to provide a device that presents pixel data acquired by the imaging device for pixels in a neighborhood of a targeted pixel location and to share this data to perform the separate color interpolation and peak detection functions. The targeted pixel location is sequenced through an image or area of an image, preferably pixel-by-pixel for pixels in a row and then row by row for rows in an image and imaging device pixel data for pixels in the neighborhood of the targeted pixel is updated to keep it current relative to the location of the currently targeted pixel whose pixel value is also supplied. As indicated above, the imaging device pixel data for pixels in the neighborhood that includes supporting pixel data for the kernel for a targeted pixel is preferably shared to calculate pixel color interpolation data and also to perform comparisons of the targeted pixel value with neighboring pixel values in order to identify localized peaks or plateaus in readings for the targeted pixel.

A successful prior art headlamp control system is based on a camera that captures information used to control headlamps through acquisition of a mix of individual image frames and short sequences of image frames. During the capture sequence, image exposure, image frame position, image frame size, and image capture rate are regularly adjusted over large ranges to acquire information used to control the headlamps. The camera is specialized to the headlamp control function and utilizes a dual lens configuration to project dual images, each through a separate color filter to separate portions of the imaging array. The camera is primarily dedicated to headlamp control, and sequences of images acquired using several different acquisition settings are typically used to classify varied features present in the image during a short interval of time to provide input for the headlamp control function. As one example of short sequences of images used for specialized purposes, the system stitches information from three separate images taken at separate exposure levels to provide the dynamic range needed to view brightly lighted signs without saturating in order to distinguish them from headlamps of an oncoming vehicle. As another example, the imager takes rapid sequences of exposures using relatively few pixels in small image windows centered on lights to measure AC content to see if the lights are street lamps.

It has become desirable to provide imagers that are equipped to acquire images for more than one function and many of these functions are preferably implemented so that images of large portions of the scene are acquired at periodic acquisition rates that exceed the rate at which images of large portions of the scene are needed for headlamp control. Additionally, some of the functions require much higher resolution. For imagers using much higher resolution and acquiring images including large portions of the scene at relatively high frame rates for other control functions, the time and the disruptive nature of interposing specialized image acquisition sequences similar to those used by the prior art imager referred to above would result in excessive pixel data rates and limit time available to provide exposures that are long enough to provide needed low light level sensitivity. Prior art cameras are currently being used with higher pixel counts in a repetitive video mode, but many do not perform the headlamp control function as well as the more dedicated, lower cost prior art system briefly described above.

With application of a camera used to provide data for headlamp control and additionally to provide other functions such as lane departure warning that benefits from higher resolution and from an acquisition sequence that is preferably maintained at a uniform, reasonably rapid, frame rate, it is preferable to shift the paradigm from capture of a variety of images, with each adjusted to serve a specialized purpose, to capture of a preferably single sequence of images preferably acquired at a specified frame rate that more nearly resembles a video camera capturing a uniform sequence of images rather than a specialized camera that captures a varied assortment of highly specialized images. As indicated, there are prior art devices that also use this paradigm to varying degrees, but most if not all suffer from limitations failing to provide images based on capture of images having relatively high and uniform pixel readout accuracy over a greatly extended dynamic range while providing much or all of the extended dynamic range to image features that may be separated by a relatively few pixels in individual images.

As an example when images of substantially the same scene taken with multiple imager acquisition modes are not available, a single sequence of images then needs to provide information that is adequate to perform the specified functions. A significant obstacle in the reliance on a commonly used sequence of images is the very large range of brightness levels that are encountered in image details that need to be analyzed. Additionally, dim and bright objects that each need to be viewed to perform a respective camera based functions may be relatively close to each other in the same image frame. As an example, using a high dynamic range camera having a low light level sensitivity needed to see headlamp illuminated road marking detail at night, direct images of headlamps of close oncoming vehicles occasionally register pixel readings that are more than one million times higher than those from headlamp illuminated roadway markings used for lane departure warning. Distant tail lamps 111 of interest might register peak pixel readings that are more than ten thousand times lower than the brightest headlamp 116 readings. AC street lamps of interest are preferably analyzed for AC flicker content that indicates that they are powered by an AC power line to distinguish them from automotive headlamps. Such street lamps may, for example, have peak pixel readings ranging from one hundred to several hundred thousand times brighter than roadway markings. Any mix of the features indicated above may be present in the same image, even in neighboring regions, so the wide dynamic range is preferably available on a per pixel basis. An example of such a camera is described in one or more patents or patent applications incorporated herein by reference. Prior art cameras known to the inventors and targeted for automotive applications have not possessed a dynamic range that provides the needed readout resolution over substantially all of the dynamic range in combination with provision of nearly the full dynamic range to features approaching one pixel in size where the primary limits are in the optics and adjacent pixel cross-talk as provided by the camera referenced above. The combination of the high dynamic range with its uniformly high accuracy over most of the range that extends to features that are close together (e.g., less than about 100 pixels, less than about 50 pixels, less than about 10 pixels, less than about 5 pixels, less than about 2 pixels, one pixel) in an image so that it provides detailed information to detect and classify objects and features alluded to above all from a shared sequence of high dynamic range images acquired preferably as a single stream of high dynamic range images with a high dynamic range imaging device. As a further example, with the same high dynamic range camera and lens configuration used to experiment with features included in this invention, light levels would need to be attenuated by less than two to one to avoid saturation of a significant proportion of pixel readings even when viewing the sun directly. Yet, some individual pixel readings were occasionally saturated by the headlamps 116 of oncoming cars as they passed.

Most of the features described herein are not limited to but perform well when operating on a single set of high dynamic range images using a camera based on the description in one or more patents or patent applications incorporated herein by reference, and using one reading per pixel per image with camera exposure and image acquisition settings that remain unchanged through extended periods of operation and that may in some cases be used as permanent settings for the application. The ability to directly read pixel exposure levels for the directly viewed lamps, including tail lamps, street lamps, signs, and even headlamps in all but the brightest conditions greatly enhance the ability to perform analysis for AC content and to use other algorithms to detect color and to use intensity as an attribute that is very helpful to distinguish signs from headlamps in classification of various light sources. These capabilities work in concert to provide a control that responds appropriately to automotive headlamps and tail lamps without excessive numbers of false detections.

Thus, the imager can be configured to capture a non-saturated image of nearby oncoming headlamps 116 and at least one of a diffuse highway marking and a distant tail lamp 111 in one image frame of a continuous sequence of high dynamic range single frame images, and the control system 106 can be configured to detect at least one of the highway markings and tail lamps 111, and quantify light from the oncoming headlamp 116 from data in the one image frame. Typically, the capturing of a non-saturated image is at least partially a function of each pixel 3 of the pixel array being able to determine an integration period independent of an integration period for other pixels of the pixel array, such that at least two pixels of the pixel array have a different integration period. Additionally or alternatively, the control system 106 can be configured to simultaneously detect and quantify dim light sources in a single frame while also detecting and quantifying bright light sources without saturating pixels of the pixel array. Typically, an acquisition sequence of the imager remains unchanged for an extended period of time, which can include when multiple different types of light sources are detected.

According to one embodiment, the system 106 can be configured to detect brightness peaks in an image. In such an embodiment, the processor (e.g., an FPGA) can be configured for brightness peak detection and share at least one processing resource/component with a demosaicing process or gray scale image reconstruction process. Commonly assigned U.S. Patent Application Publication No. 2010/0195908 discloses a color interpolation algorithm based on use of a 5×5 kernel that is centered at the target pixel location for which missing color values are provided. In the following description, the image pixel data flow and buffering to support the 5×5 kernel used as a base to generate the multiple pattern images and for the calculations to provide missing color components may also be used to generate a map of pixels in the image whose values equal or exceed those of nearest neighbors (preferably in eight directions) in their color plane in the image to facilitate location of light sources in the image. The row buffering memory and logic for handling pixel data to move it into (through) a set of registers to provide ready access to data in the kernel array is already provided by the circuit used to provide interpolated color values so the logic additions to provide peak detection are minimal. The peak detection may optionally employ its own compare circuits or make shared use of compare circuits used to generate the pattern images that are used in the edge or pattern detection and classification for color interpolation. In either event, there is economy in sharing circuits used to access pixel data to perform color interpolation or luminance or grayscale extractions and peak detections to locate lights. Their combined functions are preferably performed in an FPGA.

Figure 10:
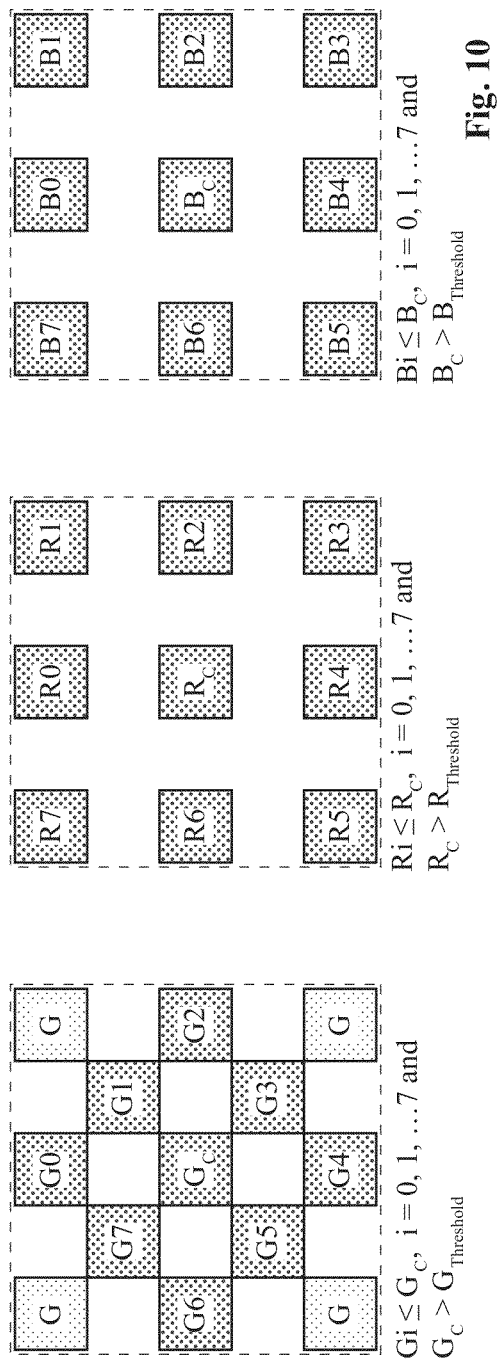
FIG. 10 is a diagram of pixel arrangements, in accordance with one embodiment of the present invention.

In FIG. 10 three pixel arrays are indicated with G, R, and B representing pixel values for pixels having green, red, and blue color spectral filters, respectively. The center pixel having the C subscript in each array is the targeted pixel for which the peak pixel reading or bright spot determination is being made. The suffix values of 0 through 7 indicate the closest neighboring pixels that are in the same color plane as the targeted center pixel for each array and that include pixels aligned vertically, horizontally, and diagonally with the targeted center pixel that has the C subscript. Pixels depicted in each of the three arrays of FIG. 10 are preferably a subset of the 5×5 kernel array and the arrays are shown when a green, a red, and a blue pixel, respectively, are in the targeted pixel location at the center of the 5×5 kernel array. The conditions used in the example for classification of the pixel with the C subscript as a bright spot are indicated below each of the arrays. In the example local maxima or plateaus with the center pixel being equal to one or more of the nearest neighbors and greater than the others in the respective color plane are included as local maxima. In alternate implementations, the criteria may be altered to require that the center pixel is greater than rather than just greater than or equal to some or all of its nearest neighbors in the color plane. Since pixel data is preferably shifted through the kernel array, the locations of pixels in each of the arrays correspond to their location in the 5×5 kernel array so compare circuits may be directly connected between the corresponding locations in the kernel array. G0, G2, G4, and G6 have the same locations as R0, R2, R4, and R6, and B0, B2, B4, and B6 so the same four compare circuits may be used for each of the three cases. G1, G3, G5, and G7 have different locations than R1, R3, R5, and R7 or B1, B3, B5, and B7 that share the same locations so two sets of four directly connected compare circuits are needed to implement these two discrete array configurations for pixels that are used for the compare operations in the two different array configurations.

FIG. 11 indicates an option to perform the eight compare operations in three cycles using a total of five rather than twelve separate compare circuits and providing a selection for the center pixel in the right hand column in the first array, in the center column of the second array, and in the left hand column of the third array. As indicated in commonly assigned U.S. Patent Application Publication No. 2010/0195908 discloses pixel values for the kernel array that are entered a column at a time on the right and columns of pixel values that are already in the array are shifted one column to the left as each new column is entered. FIG. 11 indicates pixel locations in the kernel array at three different points in the processing sequence. The array on the left indicates the first location of pixel values when pixel $C_C$ is in the right hand column, the array in the middle indicates the second location of pixel values that occurs two pixel processing times later when columns in the kernel array have been shifted two columns to the left with new pixel data appearing in the rightmost two columns and pixel $C_C$ is now in the center column, and the array at the right indicates the third location of pixel values that occurs two pixel processing times later when columns in the kernel array have been shifted two more columns to the left with new pixel data appearing in the rightmost two columns and pixel $C_C$ is now in the left hand column of the kernel array. The circuit provides a data selector to access $C_C$ from its three positions as depicted in each of the arrays. Pixel compare values with the B subscripts are selected for the green pixels and compare values with the A subscripts are selected for the red and blue pixels. Compare circuits are provided to compare the selected $C_C$ value against each of the five pixel values. The pixels that are used in compare operations are depicted by the darker shading of pixels in the first and second columns of the kernel array from the right. The compares are performed in three operations one when pixel values are in each of the three locations as indicated in FIG. 11 with $C_C$ selected. The appropriate subsets of compare indications are selected for each of the three operations and logically combined to provide an indication of whether or not $C_C$ is greater than or equal to each of its eight nearest neighboring pixels that have the same spectral filter color. The example is for a standard Bayer pattern spectral filter array, if red and green are interchanged so that there are twice as many reds, the first array in FIG. 10 is used for red instead of green pixels and in FIG. 11 values with B subscripts are used for red instead of green pixels. Such an embodiment can be used for headlamp control applications where detection of distant red tail lamps 111 is important. If only two color spectral filters are used with each in a checkerboard pattern, then patterns indicated for the green checkerboard pattern are used for all of the compares and the alternate pattern indicated for use with red and blue is not needed. The selector circuit used to implement the configuration of FIG. 11 may need about as many resources as three compare circuits so the net hardware savings to implement the version in FIG. 11 may be about 30 percent.

According to one embodiment, the detected bright spots or peaks in an image can be compared to a variable threshold in order to prioritize and/or classify the brightness peak. The luminance (this is per unit area) of signs and other relatively large area surfaces that reflect light diffusely and that are illuminated by external sources is normally so much lower than the luminance of the light emitting area of a headlamp or tail lamp that pixel readings for most externally illuminated objects are far lower than statistically calculated peak pixel readings for all but very distant headlamps and tail lamps. However, light reflected from various objects including snow and ice, from crystals or shiny surfaces of stones, from shiny objects, or from lenslets built into retro-reflecting surfaces may not be diffuse and may result in numerous, relatively intense, spots in the image when they are intensely lighted and also relatively close to the imaging device. Such spots tend to be small and numerous and because of their specular nature, their intensity tends to fall off as the square of the total distance of the path from the light source to the point of reflection and from the point of reflection to the imaging device. To reduce the number of bright spots that undergo further processing, it is preferable to provide a screening mechanism to screen out a significant number of the peaks in pixel readings due to these specular reflections while retaining response to bright spots that are likely to originate from light sources that need to be detected. The majority of bright spots due to specular reflections that are bright enough to be of concern are generally confined to regions close to and directly illuminated by the vehicle headlamps or perhaps by other bright, nearby light sources and when they occur in these areas, there are often many of them. At the relatively short distances from the imaging device where most of the bright spots occur, direct images of headlamps or tail lamps are normally very bright so that prudent increases in the threshold brightness used to screen peaks having lower pixel readings from some of the further processing steps does not result in rejection of bright peaks from headlamps and tail lamps of nearby vehicles. A relatively high density of bright spots in a zone in the image provides a reasonable indication that specular reflections are occurring making it prudent to raise the screening threshold for minimum brightness of bright spots based on increased density of bright spots in the near vicinity or proximate of the bright spot being screened.

One way to implement this is to partition the image into vertical stripes (preferably but not necessarily more than one) and to provide an indicator, preferably having clamped limits for its maximum and minimum values, for each of the stripes. The values of each clamped indicator is set to the high clamping limit when attempting to increase the indicator value above its high limit and is set to the low clamping limit when attempting to decrease its value below its low limit. Then an incremental value associated with the occurrence of a bright spot and optionally dependent on the level of the bright spot may be added to the clamped indicator value associated with the stripe when a pixel in the stripe is classified as a bright spot and a decremental value associated with the absence of a bright spot may be subtracted from the clamped indicator value when a pixel in the stripe is not classified as a bright spot.

A first screening threshold that may be a constant is preferably used to classify a pixel as a bright spot used for the density indication and a preferably different second screening threshold that is preferably based in part on the bright spot density indication is preferably used to screen bright spots that are subjected to further processing. The first value of the first screening threshold is preferably selected to be less than values that may be assigned to the second screening threshold. In general, the incremental value added to the clamped indicator value as bright spots occur is preferably substantially larger than the decremental value that is subtracted from the clamped indicator value when a pixel is not classed as a bright spot. The incremental value may for example be 400 times greater than the decremental value. The intended result is achieved by appropriate selection of the incremental value added for the occurrence of a bright spot, the decremental value subtracted for the absence of a bright spot, the width of the stripes that form the boundaries of the zones and the amount by which the screening threshold is raised based on the value of the clamped indicator. In one trial, 10 vertical stripes were used and the second screening threshold was adjusted over a 30 to 1 range. With appropriate values for parameters indicated above, the value of the clamped indicator increases for a higher density of bright spots in the most recently processed, and thus the nearby, region of the associated stripe, and decreases when the density of bright spots in the most recently processed, and thus the nearby, region of the associated stripe is low. Then when a bright spot is identified, a screening threshold based on the clamped indicator value for the stripe and optionally also for clamped indicator values for adjoining stripes is used in making a determination to classify or not to classify the detected bright spot as one that should be included in a list or bit map that provides an indication of bright spots to be included in a further processing step. The screening threshold is preferably increased, within a limited range, as the density of bright spots in the associated stripe or stripes increases.

A digital device presents a sequence of target pixel values from an imaging device providing an associated kernel array of pixel values that includes its associated target pixel value and the pixel values in the associated array bear a uniform spatial relationship to the current target pixel. The sequence of target pixels and the associated array are used as the basis to provide data for two or more separate calculation sequences used to calculate separate streams of data that are used for separate applications that may include provision of missing color values and provision of a map of relative bright spots or plateaued areas of brightness in an image.

Figure 12:
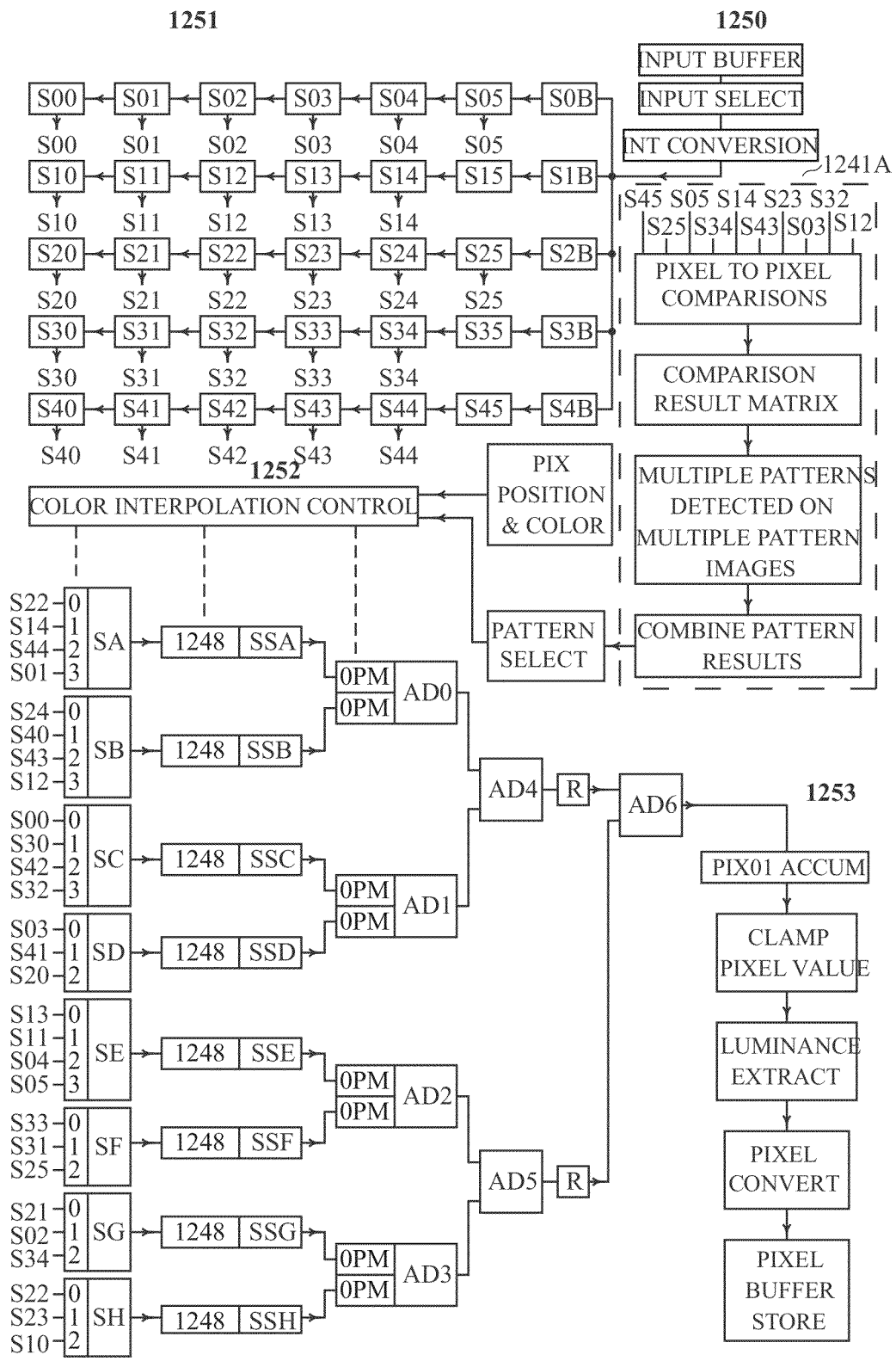
FIG. 12 is a circuit block diagram of an automatic vehicle equipment control system, in accordance with one embodiment of the present invention.

The circuit in FIG. 12 is described in detail in commonly assigned U.S. Patent Application Publication No. 2010/0195908. It depicts an embodiment of a logic device that in circuits of 1250 buffers rows of pixel data from an imaging device with a color spectral filter array and converts and transfers the pixel data to the 5×6 array 1251 of pixel data storage locations that provide access to data for the data kernel based calculations performed in blocks 1241A and 1252. Pixel data with all of the color components is converted to forms that are needed for the application in block 1253. FIG. 12 is included because the row buffering and conversion of pixel data in block 1250 and the assembly of data for target pixel S22 and the associated array of pixels that in the example include S00, S02, S04, S11, S13, S20, S24, S31, S33, S40, S42, and S44 are used as indicated in FIG. 12 and also shared to provide data for the bright spot detection circuit depicted in FIG. 13.

Figure 13:
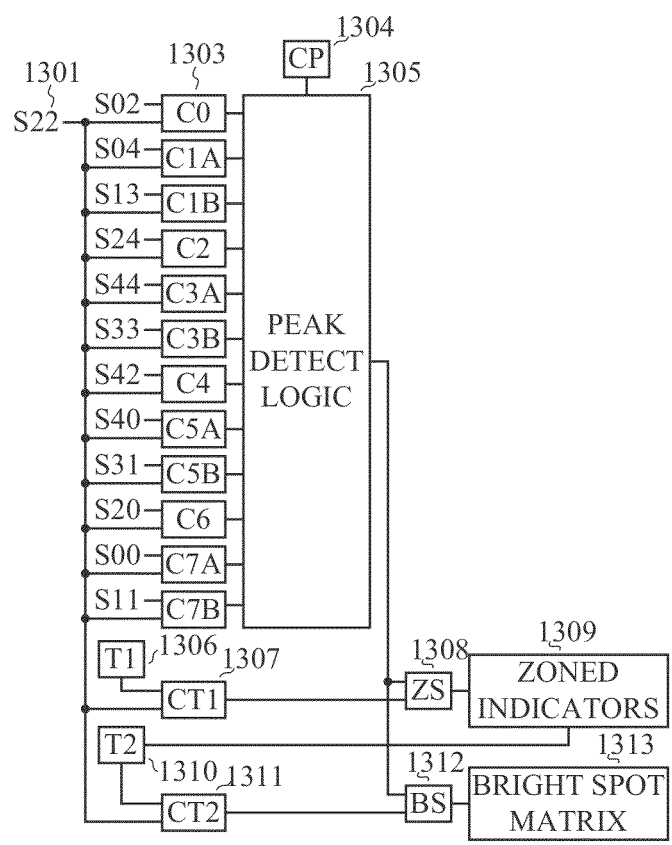
FIG. 13 is a circuit block diagram of an automatic vehicle equipment control system, in accordance with one embodiment of the present invention.

FIG. 13 is a block diagram of a circuit configured to perform comparisons for image bright spot detection as indicated in FIG. 10. The circuit may be readily modified to perform the calculation in multiple stages with fewer hardware components as depicted in FIG. 11. Additionally, in certain embodiments, compare circuits in block 1241A of FIG. 12 may be shared to provide some or all of the compare operations for the peak detect calculations in FIG. 13. Compare circuits in the column 1303 compare pixel values S02, S04, S13, S24, S44, S33, S42, S40, S31, S20, S00, and S11, respectively, against the pixel value of target pixel S22 1301 to provide a set of comparison values that is used to determine if the targeted pixel value S22 is local maxima or plateau in light intensity values relative to neighboring pixels that preferably have color spectral filters of the same color as target pixel S22. The CP circuit 1304 indicates the pattern of the color spectral filter array for the target pixel that is used by peak detect logic circuit 1305 to select compare inputs to select the correct set of neighboring pixels for the pattern of the color spectral filters for pixel S22. For example, for the Bayer pattern spectral filter pattern depicted in FIG. 10, the A suffixed compare values for S04, S44, S40, and S00 are used for pixels with red and blue spectral filters and the B suffixed compare values S13, S33, S31, and S11 are used instead for pixels with green spectral filters. It should be appreciated by those skilled in the art that when two red pixels, one green pixel, and one blue pixel are used in the color spectral filter pattern, reference to red and green are interchanged in the description herein.

Target pixel value S22 1301 is compared against threshold value T1 1306 by compare circuit CT1 1307 to screen low pixel values from those that are used to provide an indication of bright spots to include in the bright spot density calculation performed in the zoned indicator circuit 1309. Logic gate ZS 1308 provides an indication that the target pixel S22 is a bright spot only when pixel S22 is a local peak or plateau in intensity as indicated by peak detect logic 1305 that also exceeds a threshold value T1. The zoned indicator circuit 1309 is preferably configured to maintain a clamped accumulating indicator for each zone and the indicator associated with the zone of which S22 is a member is increased by a first larger value when S22 is in the zone and circuit ZS 1308 classifies S22 as a bright spot that exceeds intensity T1. The same indicator associated with the zone of which S22 is a member is decreased by a second smaller value; otherwise, when S22 is in the zone but is not a bright spot that exceeds threshold value T1. Optionally, other algorithms or refinements of the one just detailed may be used to provide the zoned indicator value and such modifications are considered to be in the scope of this invention. Zoned indicator circuit 1309 includes inputs not shown in the simplified diagram to select the active zone or zones that correspond to S22 to make calculations and provide zoned indicator data that is correlated to the zone to which target pixel S22 belongs. The effect is to increase the value of the indicator associated with a given zone when a modest to high proportion of the recently processed target pixels in the zone are classified as bright spots and to decrease the value of the indicator when a low proportion of the recently processed target pixels in the zone are classified as bright spots. The relation between the value of the zoned indicator and the density of bright spots is given as an example and may be established in any of a number of different ways to facilitate the desired effect of raising the screening threshold T2 when the density of bright spots in the vicinity of the target pixel is larger.

The second threshold value T2 1310 is preferably based at least in part on the zoned indicator value 1309 for the zone of which S22 is a member and optionally additionally on zone indicator values for certain neighboring zones or on being in a central region in the image. In a preferred embodiment, the zone indicator for the zone for which pixel S22 is a member may be used directly as the threshold value T2. Target pixel value S22 1301 is compared against threshold value T2 1310 in compare circuit CT2 1311 to screen low pixel values from those that are used to provide an indication of bright spots to include in the bright spot matrix 1313 of bright spots indicated for additional processing. Logic gate BS 1312 provides an indication that the target pixel S22 is a bright spot when pixel S22 is a local peak or plateau in intensity as indicated by peak detect logic 1305 that exceeds a threshold value T2.

Bright spot matrix 1313 includes indications of bright spots in the image that are of interest for further processing. This data is preferably communicated to a microcomputer, a digital processing unit, or other computing device to provide image data on occurrence of bright spots in the image to facilitate further analysis to provide headlamp or other control or warning or notification functions related to the image that is acquired. The data may be provided in any one of a number of optional formats including but not limited to an array of, preferably single bit, indicators organized in a matrix with each bit position corresponding to a related pixel location in the image, or as a list of bright spots each with an indication of the location of the related target pixel, as an indication included with each pixel value.

For the device of FIG. 13, it is preferable to process the image progressively from top to bottom and begin with settings for the zoned indicators that result in values of T2 that are close to the maximum screening sensitivity since distant tail lamps for which the greatest sensitivity is needed, tend to appear higher in the scene. This may be accomplished by initializing the clamped zoned indicator values in block 1308 to their minimum or close to their minimum values at the start of each frame and then depending on the higher spatial density of peaks within the zones to increase corresponding zoned indicator values to thereby increase the T2 threshold to screen out more of the low intensity peaks. Illuminated roadway, particularly the lane markings that are directly illuminated by the vehicle's headlamps, tend to be lower in the scene and to create numerous peaks of low to moderate intensity in the image. By beginning with high sensitivity (zoned indicator initialized to a value that indicates a low spatial density of peaks) at the top of the scene and progressing to lower sensitivity (increasing density of peaks) when a zoned indicator for a zone adjusts to increased density of peaks due to vehicle lights or other sources of illumination there is normally a smooth transition in a peak screening threshold that permits sensing of most distant tail lamps, while preventing reporting of excessive number of peaks due to reflections from snow or from the roadway. It is preferable to set the CT1 threshold considerably lower, for example—one half, of the minimum setting for the variable threshold T2, so that the zoned indicators may respond to lower peak values and adjust the variable threshold T2 before large numbers of peaks exceed the T2 threshold so that they are reported.

One situation where the scenario does not perform as well is when there are numerous overhead lamps such as street lamps that appear higher in the scene than distant tail lamps so that sensitivity is reduced before the tail lamps are scanned. To mitigate this problem, since distant tail lamps normally appear within a relatively small region in the central part of the image, this central region of the image is identified and maximum or near maximum sensitivity (low value selected for T2) to peaks are is applied for screening peaks to report when they are in this region. Preferably, the adjustment of zoned indicators is allowed to continue normally while in the central region, but a value is selected for T2 that permits peaks from relatively distant tail lamps to be reported.

Figure 13A:
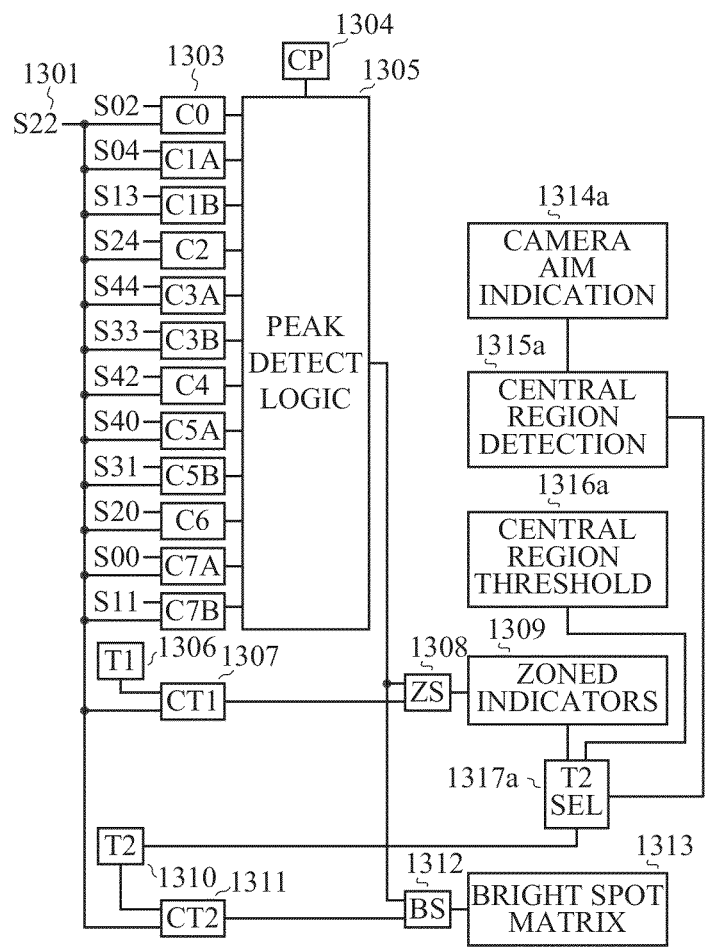
FIG. 13a is a circuit block diagram of an automatic vehicle equipment control system, in accordance with one embodiment of the present invention.

FIG. 13a is similar to FIG. 13 with blocks 1301 and 1303 through 1313 being substantially unchanged, and blocks 1314a through 1317b are added. The central region 1315a may, for example, include approximately six degrees of coverage in the horizontal and vertical directions but much smaller or much larger central regions are still considered to be in the scope of the invention. The most important selection is for the lower boundary of the central region 1315a in the image since if it is too low, a lot of peaks in the illuminated roadway will be reported and if it is too high, many tail lamps will not be included. Other portions of the headlamp glare control function are dependent on aiming of the camera so camera aiming orientation relative to the forward direction of the vehicle 1314A either provided as a factory calibration and/or as a dynamically or periodically adjusted parameter, is already available. This camera aim indication 1314a is preferably used to position the central region 1315a for which peak reporting sensitivity is maintained at a high level. For portions of the image that lie within the variably positioned central region 1315a select circuit 1317a selects central region threshold 1316a for T2 1310 that provides adequate sensitivity to report relatively distant tail lamps that appear within the central region 1315*a*. The adjustment of zoned indicators in 1309 is preferably permitted to continue normally while processing pixels that are in the central region 1315*a* so, preferably, only the selection of the threshold T2 is changed while in the central region.

The zoned indicator circuit screens many of the peaks in intensity due to specular reflections while still providing satisfactory response to bright spots from headlamps and tail lamps in these regions and also providing response to very distant headlamps and tail lamps that are likely to be in areas in zones that do not contain high densities of bright spots. Here it is preferable to configure the imaging device to order the image data acquisition to provide pixel data from more distant regions first so that the zoned indicator values will tend to be based on regions within the zones that are farther away. This may be accomplished by positioning image rows in a generally horizontal orientation and progressing from the row that images projected from the upper portion of the scene before that projected from the lower part of the scene. Then, for example, in the case that the image of a distant tail lamp suddenly appears over the crest of a hill, the zoned indicator values will be based on the distant portions of the scene rather than on brightly light areas of the road present in the image close to the vehicle and before the crest of the road.

After peaks or local plateaus have been located, they may be used to locate and identify light sources in the scene. Peaks in the following will refer to peaks or local plateaus where a pixel of a given color is greater than or equal to the values of each of the eight neighboring like colored pixels in the vertical, horizontal and diagonal directions. Red peaks will refer to peaks for pixels having red filters. As an option, peaks with any or all of the color filter colors may be used. For detection of vehicle headlamps and tail lamps, the distant tail lamps are the dimmest and the light from headlamps has substantial red content so a preferred option is to search for red peaks and use these peaks as a starting point to find lights to classify. After finding peaks, a region of the image that surrounds the peak may be analyzed to classify it for various properties such as brightness and size.

According to one embodiment, the system 106 can be configured to group two or more pixels or brightness peak, such that the system 106 can further process the group a single entity rather than individually processing each member of the group. More than one peak may be associated with a single object, so it is advantageous to locate groups of peaks belonging to the same object. The following algorithm is useful in linking peaks that are associated with a common object. It is based on determining that the peaks are both (all) members of a connected set of pixels in the image that exceed a threshold brightness that is preferably based on the intensity at least one of the peaks. The threshold intensity may, as an option, be selected as a fraction (fifty percent, for example) of the brighter peak. Here, a set of pixels is considered connected if it is possible to traverse between adjacent pixels in a horizontal, vertical, or diagonal direction, one pixel at a time, to travel from any starting pixel to any ending pixel in the set without leaving the set. If a peak is less than the threshold brightness, it is not connected to the other peaks. When one or more peaks exceed the threshold brightness, it is necessary to see which of the pixels in question are members of a connected set of pixels that exceed the selected threshold brightness. A connected set of pixels that exceed the threshold brightness may be constructed by creating a binary threshold brightness image over a preferably rectangular region selected so that it includes the peaks in question, preferably with the region made large enough so that peaks being considered are at least several pixels (five, for example) from a nearest boundary.

Pixels in the selected region whose brightness values approximately exceed the threshold brightness are included in the set of pixels that form the brightness threshold image. Then a connected set of pixels may be constructed iteratively from pixels that are members of the brightness threshold image. The connected set may be constructed iteratively by selecting one of the peaks, preferably the brightest, as the seed member to construct a set of connected pixels and this connected set is iteratively expanded by an iterative application of morphological dilation which expands the set to include additional pixels from the set that forms the brightness threshold image and that are adjacent to a pixel that is already a member of the connected set. This iteration may be continued until the iteratively generated connected set includes the remaining point or points whose connectedness is in question or until no more points are added by additional iterative steps. When no more points are added by an iterative morphological dilation step, any peaks in question that are not in the connected set are not connected with the peak used as the seed pixel and according to the criteria are not part of the same lighted object. Peaks that are part of the same connected set are, according to the criteria, part of the same lighted object.

Imager pixels may be covered by a filter pattern such as Bayer filter pattern and as options, pixels of different colors may be treated separately or different weighting may be given to pixel values for pixels of different colors. In a preferred configuration, only brightness peaks of red filtered pixels are selected as light source candidates and pixel values of pixels of all of the colors are treated without regard to their color in the test for connectedness, as described herein. Because red and blue pixels are not adjacent in a Bayer filter pattern, multiple peaks from relatively pure red or relatively pure blue sources are not connected in the test as outlined above. Tests for connectedness may be modified in a number of ways to be more color-blind or color inclusive. For example, options may include but are not restricted to using only red or only blue pixels, respectively, for predominantly red or predominantly blue light sources or the test for connectedness may be done using a structuring element in the iterative morphological dilation steps that will allow gaps between like colored pixels. It is preferable to limit spacing of peaks that are tested for connectedness. For example, peaks that are within 30 pixels of each other in both the x and in the y direction might be considered. The connectedness classification aids in the formulation of more refined classifications such as the identification of signs or of pairs of lights that move together.

Light (e.g., bright spots or peaks) aggregation (e.g., grouping) can be performed by creating a binary image in the neighborhood of both candidate peaks using an adjustable threshold (e.g., 0.5 or 0.25), where pixel values greater than the threshold are represented as ones and pixels equal to or below the threshold are represented as zeroes, according to one embodiment. This can also be done on a single color channel (e.g., green) such that color differences do not affect the calculation.

Once the binary image is created, a seed fill operation can determine whether or not a path exists between the two peaks in which all pixels in the path are above the threshold. Typically, the seed fill starts from one of the peaks and tests its neighbors in a plurality of directions (typically N, E, W, S, where these are abbreviations for North, East, West, and South, respectively). If the tested pixel meets one or more criteria (e.g., brightness), its neighbors can then be checked. Checking the neighbors can continue until no neighbors of pixels of interest have met the criteria. This can be implemented very efficiently using recursion.

In the course of doing the seed fill, if the other peak in question is ever the pixel of interest, we know that we have a direct path of pixels, all of which meet or exceed our criteria, between the two peaks, and that the two lights should be aggregated into one. Thus, any number of lights can be aggregated into a single light.

In any embodiment where brightness peaks are detected, the peaks (or groups) can be prioritized so that more important peaks are processed prior to less important peaks. The headlamps 220a, 220b of the controlled vehicle 105 are controlled using image data from a high dynamic range camera captured at a repetitive frame rate to minimize glare to other drivers. Detection of other vehicles 110, 115 on the road is based primarily on detecting headlamps 116 and tail lamps 111 of these vehicles 110, 115 in the sequence of high dynamic range images and detection of these vehicular lamps 111, 116 normally begins with detection of red peaks or maxima in the images. The red peaks are screened according to an acceptance threshold that is adjusted according to position in the scene and to the frequency of occurrence of peaks in zones in the image. With these screening features, a reasonably small number of peaks are reported for most images. However, it is still desirable to process peaks approximately in order of importance with the most important peaks being processed first so that important lights are not likely to be missed even when the processor runs out of time and is forced to skip over peaks that have not yet been processed. In a preferred embodiment, a 4 bit, 16 level priority number is generated in the same FPGA, and this number is reported as a four bit entry along with the occurrence of each peak that is reported. Typically, the FPGA used is the same FPGA used to analyze the image and detect the peaks as the image is scanned.

Additionally, for each peak that is reported the direction of a brightest adjacent pixel of each of the other colors can be reported. For red peaks, there are four adjacent or neighboring green pixels one to the right, one below, one to the left, and one above the red pixel, and four neighboring blue pixels at diagonal corners of the red pixel. One two bit item is used to report the direction of a brightest (or one of the brightest when there is more than one) adjacent blue pixel and a second two bit item is used to report the direction of a brightest adjacent green pixel. With two red pixels for each pair of green pixels and blue pixels, the direction of the brightest blue and brightest green pixels may be reported using this or any suitable alternative encoding method. Thus, eight bits of information are reported with each red peak including one item of four bits for the priority and two items of two bits each for to indicate the direction of a brightest adjacent blue and a brightest adjacent green pixel. In a preferred embodiment, only red peaks are reported since the lights of real interest are headlamps and tail lamps which both have red content. Optionally, green and/or blue peaks may also be reported and similar prioritizing and brightest neighbor direction indications may be used for them. For green pixels, there are four other green neighbors and two red pixels on opposite sides and two blue pixels on opposite sides. For configuration with two red pixels for each green pixel and blue pixel pair, there are two adjacent green pixels, two adjacent blue pixels, and four diagonally adjacent red pixels.

The FPGA can generate an importance weighting of the pixels having the peak readings that are reported based on the sum of individual weighting factors that preferably include weightings factors for the row position of the peak in the image array, the column position of the peak in the image array, the approximate logarithm of the brightness of the peak, and the magnitude of the peak relative to that of adjacent red and blue pixels.

As an example, a Xilinx Spartan 6 FPGA based logic circuit can be used to detect peaks in the portion of the image sensed through red filters of a Bayer filter array used on a wide VGA (480 row×752 column) high dynamic range camera. The FPGA is also used to calculate a four bit ranking index with higher numbers that indicate the likelihood that the peak is of interest. First, separate ranking values based on individual properties of a given peak are calculated as follows: A row rank ranging from 0 to 120 is calculated as the row number divided by 2 for row numbers that are less than or equal to 240 and as (480−row number)/2 for the remaining rows. A column rank ranging from 0 to 117 is calculated as the column number times $5/16$ for column numbers that are less than or equal to 376 and as 235 minus the column number times $5/8$ for the remaining columns. A peak brightness rank ranging from 0 to 460 is calculated as 20 times the bit position of the leading one in the 24 bit integer representation of the peak pixel reading. Pixel bit positions are numbered from 0 for the least significant bit to 23 for the most significant bit and the bit position of the leading one in the pixel value corresponds to the integral portion of the logarithm to the base 2 of the peak reading pixel value. The sum of the pixel values of the green and blue pixels that are adjacent to the peak red pixel are summed and a redness rank that ranges from 0 to 322 is assigned based on a comparison of the peak red value to this sum. The redness rank is set to 322, 242, 161, or 80 if the peak red pixel value is, respectively, greater than 1, ½, ¼, or ⅛ of the sum of adjacent non-red pixels and is set to zero otherwise. This may be modified to greater than 2, 1, ½, or ¼ for a configuration with two red pixels for each pair of green and blue pixels.

The row position, column position, peak brightness, and redness ranks as described above are summed, and the four highest order bits of the ten bit number are used as the 4 bit priority ranking assigned to the peak and reported with it to the processor that evaluates the peaks. The sum of the maximum values for the individual rankings is just under 1023 so the priority ranking may range from 0 to 15.

According to one embodiment, once a pixel is found to be peak, a score can be given to this peak, which can dictate how this peak is processed downstream. The scoring can be based upon a combination of pixel value, location in the image, color estimate, the like, or a combination thereof. Additional or alternative features that can be used, include, but are not limited to, height, width, brightness, motion, age, contrast etc. Further, the individual score computed for each feature can be weighted in any combination to produce the desired result.

Figure 5:
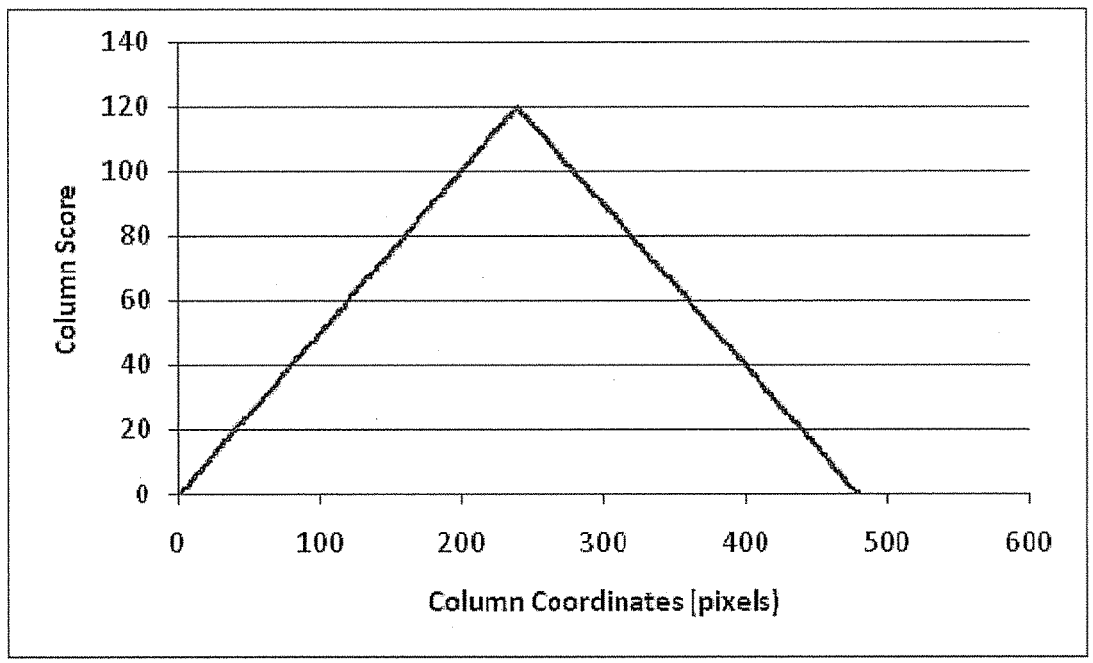
FIG. 5 is a chart illustrating a column score with respect to column coordinates (pixels), in accordance with one embodiment of the present invention.

For purposes of explanation and not limitation, the column location of the pixel can produce a column score, which will then be input to a final computation of an overall peak score. If the column location is less than the image width divided by two, then the column score equals the sum of the column location divided by sixteen and the column location divided by four. If the column location is greater than the image width divided by two, then the column score equals the sum of the difference between the image width and column location divided by 16 and the difference between the image width and the column location divided by four. This column scoring method results in a linearly increasing score from either edge of the image to the center of the image (FIG. 5).

Figure 6:
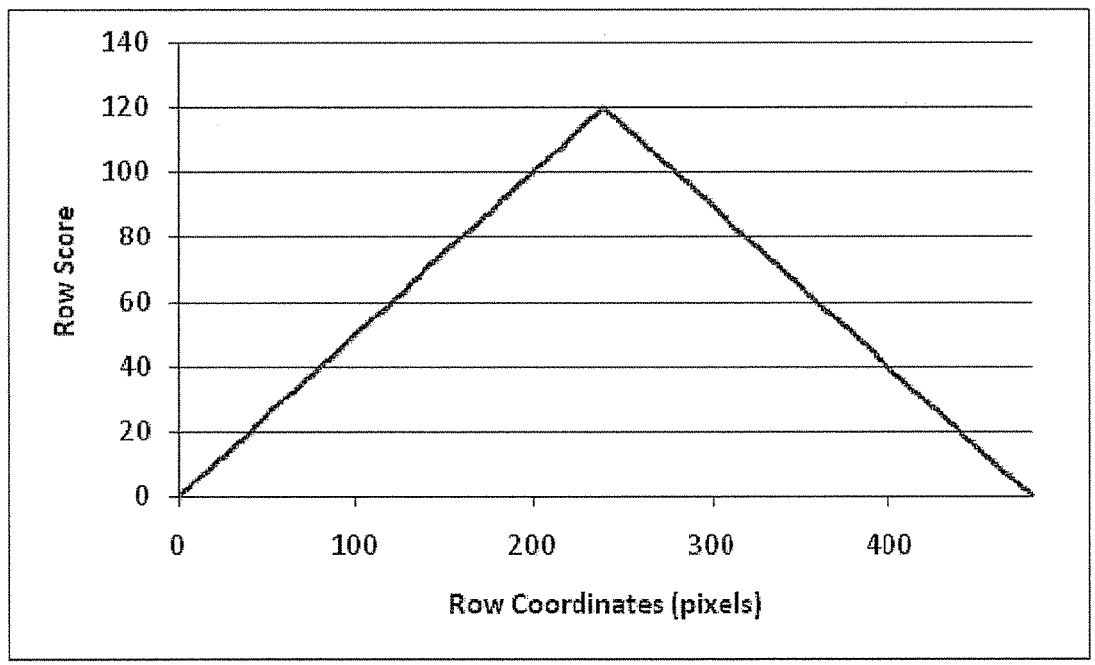
FIG. 6 is a chart illustrating a row score with respect to row coordinates (pixels), in accordance with one embodiment of the present invention.

The row location of the pixel can produce a row score, which can then be input to the final computation of the overall peak score. If the row location is less than the image height divided by two, then the row score equals the row location divided by two. If the row location is greater than the image height divided by two, then the row score equals the difference between the image height and row location divided by 2. The row scoring can result in a linearly increasing score from either edge of the image to the center of the image (FIG. 6).

The color score can be based on the premise that a higher red content should yield a higher priority peak. A weighting scale of the ratio between the red pixel and the green and blue pixels can be used to efficiently estimate the red content of a peak. An example color score is:

---
rval = pixel value of the peak; //peak is always found on red
(in this algorithm)
gval = maximum value of the green pixels adjacent to the peak;
bval = maximum value of the blue pixels adjacent to the peak;
if rval is greater than gval + bval then color score equals 322
else if rval > (gval + bval) / 2 then color score equals 242
else if rval > (gval + bval) / 4 then color score equals 161
else if rval > (gval + bval) / 8 then color score equals 80
else color score equals 0
---

Another feature that can be used in the overall peak score calculation is the linearized pixel value of the peak pixel. This feature can be based on the assumption that brighter light sources tend to be of more interest than dimmer sources. The peak value score can increase as a logarithmic function.

An example of such a logarithmic function can be where a peak value score=20*(1+log(linearized pixel value)/log(2)), with the exception of the zero case in which the peak score is set to zero. The final computation of the peak score is a summation of the individual feature scores divided by 64. Peak score=(column score+row score+color score+peak val score)/64. The final result can now be a score on the scale of 0 to 15, wherein 0 is the lowest priority peak and 15 is the highest priority peak.

The processor can now use the peak score information to process the peaks in order of priority. This is done in order to more intelligently work around the constraints of the system, particularly time and memory. Thus, the system 106 can be configured to filter out low priority peaks to save processing time and memory usage, and the system 106 can be configured to process the peaks in order of highest priority peaks first, and if time is a factor, then the system 106 can be ensured to have processed the most important peaks first.

Typically, the system 106 can detect non-headlight or taillight light sources, such as alternating current (AC) like sources (e.g., street lights). In an embodiment wherein the control system 106 is configured to control the vehicle's 105 headlights 220a, 220b, the system 106 can detect an AC light source, and disregards such light sources, such that the system 106 does not generate a high beam off signal based upon detection of a street light. Detecting and distinguishing street lamps from headlamps presents a challenge for nighttime light identification systems. Both lamps share many characteristics in that they generate their own luminance instead of simply presenting reflections like signs, mailboxes, and other roadside objects. However, headlamp dimmer systems should ignore street lamps (in general) while responding to headlamps.

This similarity of lights is exacerbated by the fact that many imagers run at approximately 20 or 30 frames per second, which is on or near a harmonic frequency with the AC flicker rate of many streetlights (120 Hz in North America and parts of Japan, 100 Hz elsewhere). Because of this, street lamps are, in many instances, sampled in phase with the lights flicker frequency, and its varying flicker is not readily detectable. Additionally, observing the flicker rate can be best accomplished by looking approximately directly at the light source with the camera and including even the brightest pixels in the image of the light in the image. Most prior art cameras have not provided a dynamic range to provide accurate, unsaturated, preferably linear, readout of the intensities of these light sources as part of the standard video image.

One solution to this problem is to use an imager with a very high dynamic range and run the imager at a non-harmonic frequency of either 120 Hz or 100 Hz lights with the image capture frequency chosen specifically to create a beat frequency with the lights over the course of a number of frames. In typical applications, the frame rate at which successive images are acquired is substantially lower than the AC induced flicker rates creating aliasing artifacts. The AC line frequency is normally known to be either 50 Hz or 60 Hz with flicker rates typically at twice the AC line frequency, and the camera frame rate and flicker rates are normally well known so many of the aliasing artifacts are predictable. The presence of the response patterns, even though they are aliased due to sampling at a rate that is well below the flicker rate, may be used to indicate that the light is likely to be a streetlight or other line frequency supplied light source as opposed to an automotive headlamp. In contrast, the absence of the response pattern may be used to indicate that the light is likely to be from an automotive or other vehicular source. For initial calibration or for verification that an alternate line frequency is not being encountered, it may be necessary or beneficial to determine whether the AC source is 50 Hz or 60 Hz and characteristics of the aliased response pattern may be used to make this determination.

As a refinement to the above, it can be advantageous to select an odd integer n, and denote the period (inverse of the frequency) of the flicker as the flicker period. A repetition period (inverse of image repetition rate) of the image acquisition can then be selected so that it is a little longer or a little shorter by a predetermined amount than the flicker period multiplied by n/2. The intent of the selection of the integer n as odd and division of n by 2 is to make the phase of the flicker component of the light at the time that the image is acquired alternate by approximately (preferably not exactly) 180 degrees between successive image acquisition cycles. Then when an image is acquired near the peak of the flicker cycle for one image, it is likely to be acquired near the valley of the flicker cycle for the next image that is acquired causing a near maximum variation in intensity of the light in the image from one cycle to the next. The repetition rate of the image acquisition can be set a little higher or lower than the rate at which the phase of the flicker would change the phase by precisely 180 degrees for each successive image to prevent a static phase relationship similar to that indicated above for a light with a 120 Hz flicker rate acquired at 30 frames per second (i.e. 33⅓ milliseconds per frame) or a light with a 100 Hz flicker rate acquired at 25 frames per second.

Instead, to prevent the problem indicated above for selection of 25 or 30 frames per second, the repetition rate of the image acquisition can be selected to create a beat frequency half cycle period that is preferably at least two image acquisition periods long (not necessarily an integral number) so that during the beat frequency half cycle period, the phase of the alternating acquisition pattern shifts by approximately 180 degrees relative to the flicker cycle. The result is a beat pattern in which the signal for the sub-sampled flicker frequency tends to oscillate at a rate that is approximately equal to one half of the frame rate (i.e. approximately one image frame period between a positive inflection and negative inflection and approximately one image frame period between the negative inflection and the next positive inflection yielding approximately two image frame periods for the complete cycle) and the phase of this signal is inverted during each of the beat frequency half cycle phase reversal periods. Thus, the complex sampled waveform of the flickering light provides a waveform on which the higher frequency alternating pattern is modulated by the phase shift envelope with the phase of the higher frequency alternating pattern reversed for each half cycle of the phase reversal.

With the power line frequencies precisely set to 50 or to 60 Hz and the camera acquisition rate established with a precise crystal oscillator, the frequencies and periods referred above are highly reproducible. Thus, a correlation filter may be used to detect the presence and relative strength of the waveforms just described. Here strong correlation indicates that the light is powered from a line frequency source and presumably stationary as opposed to vehicular. The data that is used is preferably assembled using devices described elsewhere in this document and in related applications incorporated by reference elsewhere herein. Steps in assembling the data may include, first locating lights as peaks or plateaus of brightness in the image preferably acquired using a high dynamic range camera, then relating peaks or groups of peaks to light sources, then tracking and maintaining a frame by frame history on the sources of interest, then calculating an intensity based on the sum of the intensities of brighter pixels related to the light source in each image, and then performing various analytical operations such as the one just described to classify the sources and finally to respond appropriately as, for example, by dimming headlamps for oncoming vehicles.

The control system 106 can be configured to use a sampling image repetition period that is longer, such as, but not limited to, an integral multiple n of a flicker cycle period of the AC light source, wherein n is greater than one to detect AC content of light sources imaged in one or more high dynamic range images. The images used to sample the AC content can also be analyzed to locate other probably points of interest. The flicker content can be detected and measured by a Fourier based analysis, an added restriction that n is an odd number and uses a correlation filter based analysis, the like, or a combination thereof.

Figure 14:
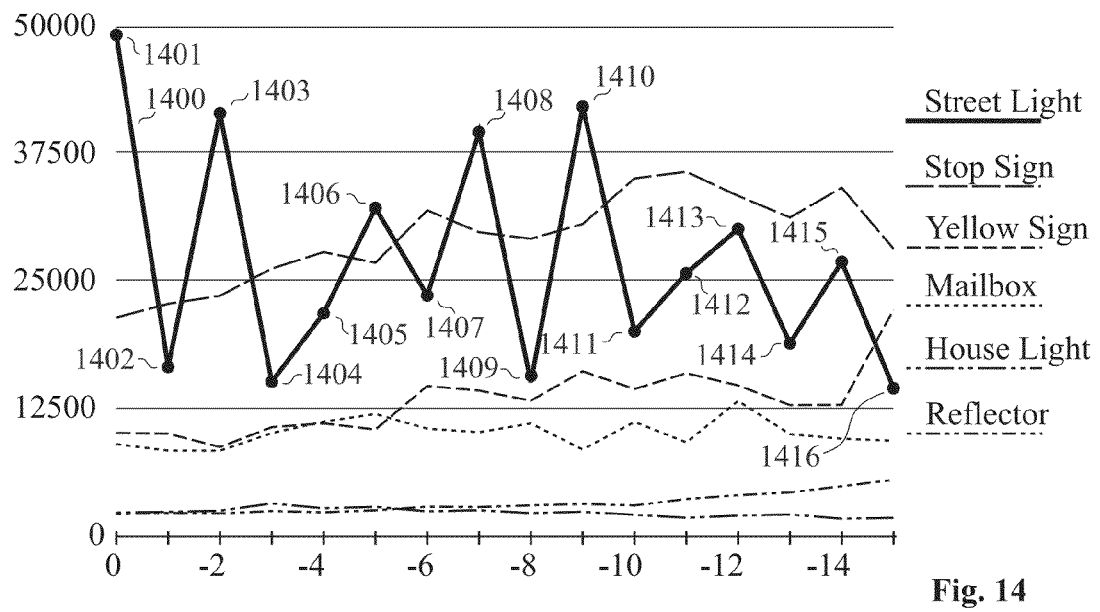
FIG. 14 is a chart illustrating light intensity with respect to an image frame for a plurality of light sources, in accordance with one embodiment of the present invention.

According to one embodiment, as illustrated in FIG. 14, the intensity of lights from various sources can be traced, the lights being identified on the right as a Street Light, Stop Sign, Yellow Sign, Mailbox, House Light, and a Reflector. The values plotted are acquired from 16 successive images identified at 0 through −15 on the x axis, wherein image 0 is the most recently acquired. The brightness level for each light source is based on the sum of pixel values related to the respective light and is plotted on the y axis. Measurements are all taken from the 15 images and lines connecting the measured values are provided only to indicate trends and associated points. The frame rate was just over 22 frames per second and line frequency in the local was 60 Hz so there are approximately 5.4 flicker cycles between acquisition of each successive image for a related 120 Hz flicker rate. These flicker variations are not measured and are not indicated by the lines on the graphs that connect the points representing the measurements that are taken. Identification of the light sources is based on the measured values and as explained above, the aliased results as depicted do not represent the true waveform of the light source, but still provide information that is sufficient to formulate a useful classification of the light source. Intensity measurements for the street light are indicated by the 16 points 1401 through 1416 on connected point curve 1400. Phase reversals occur close to imager reading sample points 1405 and 1412 spanning roughly 7 frames for a half cycle of the beat frequency so there are roughly 14 frames for a complete beat cycle.

As a brief example, it is preferable to first normalize readings prior to application of a correlation filter so that the filter output is more closely related to the shape and frequency content of the curve than to the overall magnitude of the brightness readings. The preferably normalized brightness readings from the light are processed by a filter that sums points 1401, 1403, 1406, 1408, 1410, and 1413 with weighting factors of 1, and points 1405 and 1412, with weighting factors of 0, and points 1402, 1404, 1407, 1409, 1411, and 1414 with weighting factors of −1, and that takes the absolute value of the sum. For curve 1400, this provides a strong positive indication that would still hold if the points with the greater magnitude were interchanged with the points of lesser magnitude. There is benefit in extending the number of samples used in the correlation filter, particularly to increase the rejection of lights that do not display the lower beat frequency. One way to do this is to repeat the pattern above extending it from 14 to 28 pixels. The benefits of these options are preferably balanced against the need for relatively quick response. One option is to first use a quick responding filter that may provide a usable indication after about seven frames, and then through analysis of a history of succeeding correlation indications for the light and/or of correlation indications generated from a larger sample base, the indication may be revised or refined. For fastest response, a usable indication of AC content may be obtained with seven samples.

Once the lights' histories are known (as in FIG. 14), their AC likelihood can be mathematically determined by normalizing the data and passing the results through a correlation filter. A correlation filter has maximum output when the input waveform matches the pattern sought by the correlation filter.

Normalization can include determining the range of brightnesses for a given light by subtracting the minimum brightness from the maximum brightness, dividing that range by two, and adding the minimum brightness and the (divided) range to get an offset. This offset is subtracted from each sample, and then each sample is divided by the range to get all samples into a −1 to +1 space. After these operations, no sample will be above +1 or below −1.

Because the camera is moving, lights are often varying in brightness because the sources are approaching the vehicle 105. It can be important to separate the AC line brightness variation (generally sinusoidal when sampling frequencies are chosen as described above) from distance variation (generally increasing in an approximately linear manner for the time frames under discussion for approaching lights). At the cost of increased computational complexity, this variation can be subtracted during the normalization step using any number of linear approximations (least squares regression, endpoints, averaging multiple endpoints, etc.) for each point. Normalization can be computed with the following equation:

$$Z_i = (Y_i - [(X_i * m) + b])/R;$$

wherein $Z_i$ is the normalized brightness, $Y_i$ is the raw brightness sample, $X_i$ is the corresponding sample number (or relative timestamp, if available), m is the best-fit slope of the linear approximation, b is the best-fit intercept of the linear approximation, and R is the range of the raw brightnesses (maximum brightness minus minimum brightness).

After normalization, the samples should be submitted to the correlation filter set. At 22.2 Hz to detect 120 Hz flicker, a beat frequency of 14 frames becomes apparent. The filter coefficients are:

{+1, −1, +1, −1, +1, −1, 0, +1, −1, +1, −1, +1, −1, 0}

The result of the correlation filter is that of a standard FIR filter with the most recent sample multiplied by the first coefficient, the next most recent sample multiplied by the second coefficient, and so on, accumulating each of those results and taking its absolute value. This output will range from 12 (perfect match) to 0 (no match at all).

Because the system has no a priori knowledge of its phase within the beat frequency cycle, we can apply a number of correlation filters to test each phase for maximum detectability. Because of the symmetrical nature of the correlation filter coefficients, only half of the combinations need calculating. To change the phase of the correlation filter, simply rotate the last coefficient onto the front. For example, the filter specified above becomes:

{0, +1, −1, +1, −1, +1, −1, 0, +1, −1, +1, −1, +1, −1}

One more iteration makes it:

{−1, 0, +1, −1, +1, −1, +1, −1, 0, +1, −1, +1, −1, +1}

And so on until cycling through arrives back at the original correlation filter. By feeding the normalized data through each of these filters, and taking the maximum, the best-matching phase can be detected.

This measurement can also be compared over a number of frames to determine whether the lights phase is cycling through each of the correlation filters as expected, which provides more confirmation that the light source is powered by AC line voltage. The base measurement provides a likelihood of an AC powered light, and this confirmation provides a great deal of confidence in discriminating between AC powered lights and other varying lights.

By preferably normalizing the result to the general brightness of the light source and applying similar filters with zero coefficients corresponding to approximate phase reversal positions at 1401 and 1408, and at 1402 and 1409, and at 1403 and 1410, and at 1404 and 1411, and at 1406 and 1413, and recording the maximum value, an AC flicker correlation value for the light source can be determined. As an option that takes more acquisition time, only one, or a reduced number of correlation measurements may be acquired at each point and the maximum correlation value over the last seven readings may be used. Optionally, components such as straight line trends may be removed by, for example, subtracting a best fit line from the set of values used for the correlation measurement. Results are somewhat different since the sample point base is skewed and more time is required, but results should be similar and fewer calculations are performed. The normalizing step may, for example, be to divide the resulting value by the average of the 14 brightness measurements used in the calculations. Note that in the above, the use of absolute values permits each correlation measurements to apply to two separate cases so that the filter operations do not need to include seven additional steps where all the signs of all of the weighting factors are inverted. The correlation filter just described provides a higher output value for the street light that is powered by a 60 Hz power source so that it has a 120 Hz flicker rate than for the other sources. The house light is likely to have a bulb with a tungsten filament and may have a weaker 120 Hz signature that may be useful in some situations since it is preferable to also distinguish this light from an automotive light source.

Figure 15:
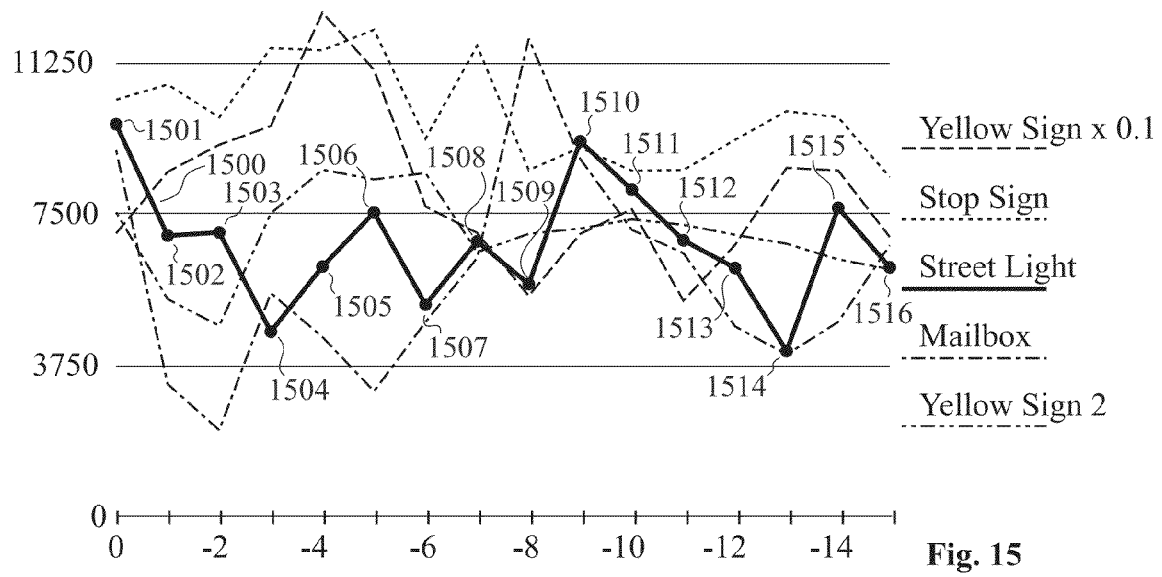
FIG. 15 is a chart illustrating light intensity with respect to an image frame for a plurality of light sources, in accordance with one embodiment of the present invention.

According to an embodiment illustrated in FIG. 15, which is a plot 1500 similar to that of FIG. 14 (e.g., points 1501-1516 are associated with 1401-1416) that depicts the measured brightnesses of five different light sources recorded for 16 successive image frames. It is included to demonstrate performance when the street light is approximately twice as far away as the one in FIG. 14 so the measured light intensities are about 25% of those for the light source in FIG. 14. Reflections from the yellow sign in FIG. 15 are bright so they are scaled to one tenth of their original values so that they fit on the graph. Because of the preferred normalizing step, the shape of the plot is still appropriate. As visually apparent, the 120 Hz correlation indication is not as strong for this dimmer light, but is still high enough to clearly distinguish the AC powered street lamp from the other light sources.

Embodiments preferably employ a frame rate that provides a frame-to-frame phase change of approximately 180, or optionally approximately 120 degrees, approximately 240 degrees, or other suitable change in the phase of the light flicker signal from an AC powered light. This provides a relatively high frequency component due to AC line induced flicker in the aliased record of light level readings. Preferably, the embodiment also includes a substantially smaller superimposed frame-to-frame phase shift component in sampling of the flickering light signal from the AC light source that beats at a lower frequency against the phase of the flicker level. The combination of the higher frequency and the beat frequency may be evaluated by a correlation filter to provide an indication of flicker components in light sources that indicate that they are powered from the AC line.

It is preferable to use a frame rate that provides satisfactory performance for a line frequency of either 50 Hz or 60 Hz. This necessitates compromises and, as an option, the system may be configured to provide optimized performance for either 50 Hz or 60 Hz with only a small change in frame rate so that sensitivity and other qualities of image capture will not change substantially. For best performance, the image capture period should be an integer multiple of the AC line period plus one half cycle (e.g., 3.5×, 5.5×), modified slightly to create the beat frequency. This modification is also crucial to determine the period (i.e., the number of frames) for detecting the beat frequency. A reasonably short beat period (6-20 frames) is preferred both for responsiveness (i.e., having to examine fewer consecutive frames) and memory usage (i.e., less storage for historical data).

For 120 Hz there are 4.5 flicker cycles per frame for a 26.67 frames per second image capture rate. For 100 Hz there are 3.5 flicker cycles per frame for a 28.57 frames per second image capture rate. For 120 Hz there are 5.5 flicker cycles per frame for a 21.818 frames per second image capture rate. For 100 Hz there are 4.5 flicker cycles per frame for a 22.22 frames per second image capture rate. To provide a 180 degree shift of the flicker signal relative to frame capture during seven frame times the frame rate may be increased from 21.818 to 22.11 frames per second for a 120 Hz flicker rate and decreased from 22.22 to 21.875 frames per second for 100 Hz flicker rate. Here, the change of less than one quarter frame per second or slightly more than one percent in camera frame rate allows one to adjust the camera for similar flicker detection properties in going between areas using 60 Hz and 50 Hz. For the 22.11 frames per second setting selected for 60 Hz and for 7 capture frames for a 180 degree phase shift of the flicker cycle relative to frame capture, there will be 21.9 (almost 22) capture frames per 180 degrees of phase shift when used with 50 Hz. For the 21.875 frames per second setting selected for 50 Hz and for 7 capture frames for a 180 degree phase shift of the flicker cycle relative to frame capture, there will be 35 capture frames per 180 degrees of phase shift when used with 60 Hz. These excessively slow beat frequencies may be detected and used to indicate that the camera is not in the proper frame rate capture mode and should presumably be changed from the 50 Hz to the 60 Hz mode or vice versa.

According to one embodiment, the system 106 can be configured to utilize a discrete-time Fourier transform (DTFT) to detect an AC light source in one or more images. With respect to FIGS. 7A-8C and 35, the system 106 can be configured to take several samples of a detected light source. Typically, the samples include a direct current (DC) sample and seven different complex sinusoidal samples ($AC_1$ to $AC_7$) (e.g., AC frequency buckets or bins). The DC sample and AC samples can be compared in order to determine if the imaged light source is a DC light source (e.g., a headlight 116 or a taillight 111) or an AC light source (e.g., a street light). The sample period can be between 15 Hz and 30 Hz, between 20 Hz and 25 Hz, or other suitable sample period. Additionally or alternatively, the sample period is configured so that AC lights sources operating at 60 Hz and AC light sources operating at 50 Hz can be detected. Thus, the system 106 can be configured to monitor both 50 Hz AC and 60 Hz light sources substantially simultaneously, such that the system 106 does not need to be reconfigured based upon the type of AC source to be detected.

Figure 7A:
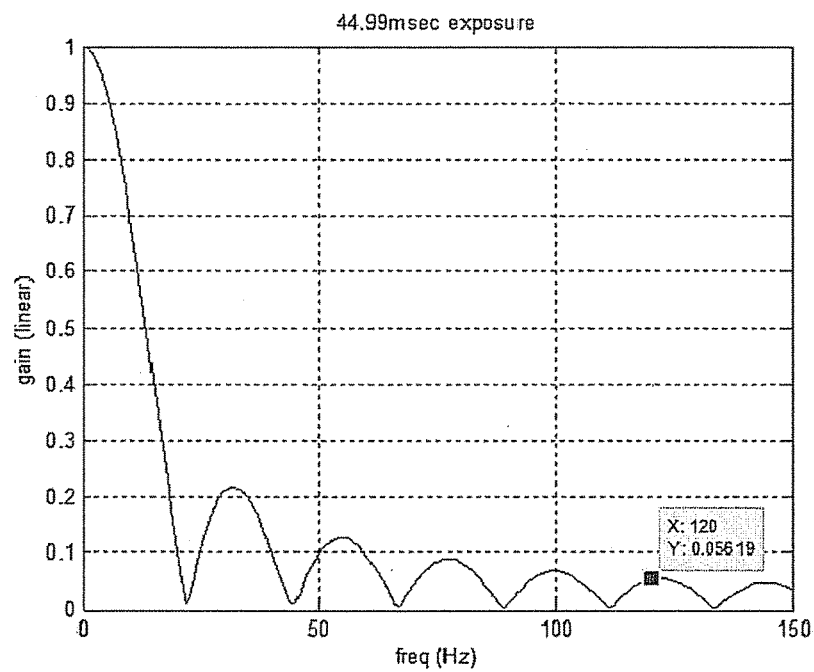
FIG. 7a is a chart illustrating an effect of exposure time at a frame rate, in accordance with one embodiment of the present invention.
Figure 7B:
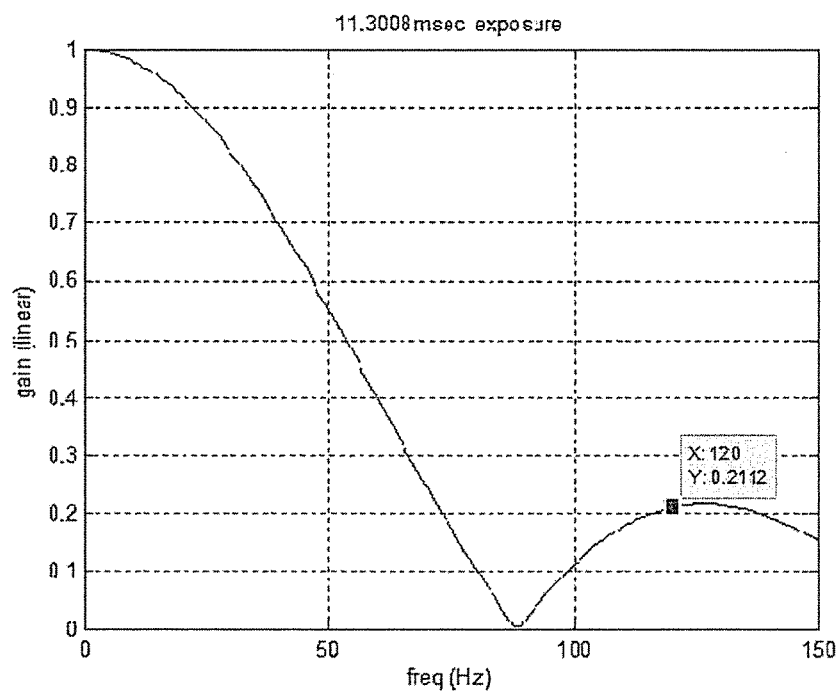
FIG. 7b is a chart illustrating an effect of exposure time at a frame rate, in accordance with one embodiment of the present invention.
Figure 7C:
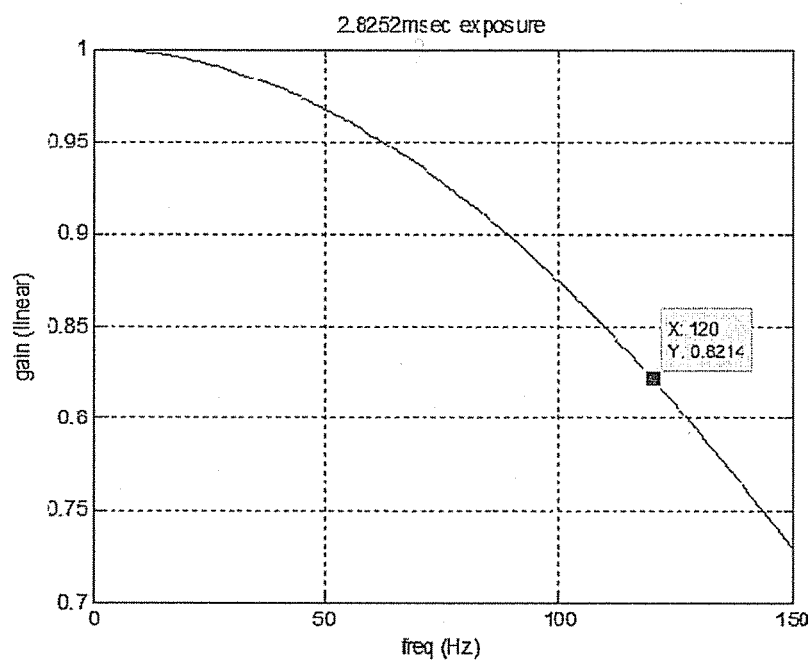
FIG. 7c is a chart illustrating an effect of exposure time at a frame rate, in accordance with one embodiment of the present invention.
Figure 8A:
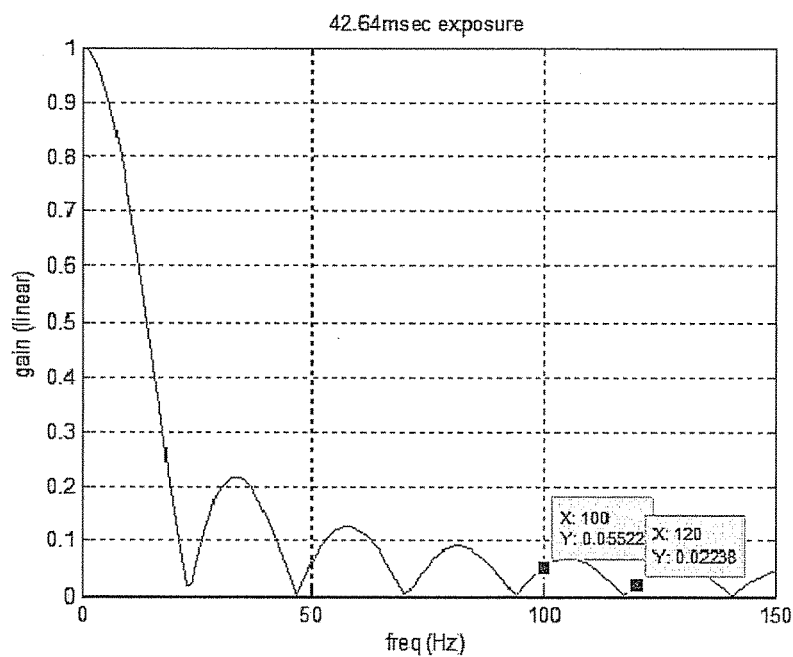
FIG. 8a is a chart illustrating an effect of exposure time at a frame rate, in accordance with one embodiment of the present invention.
Figure 8B:
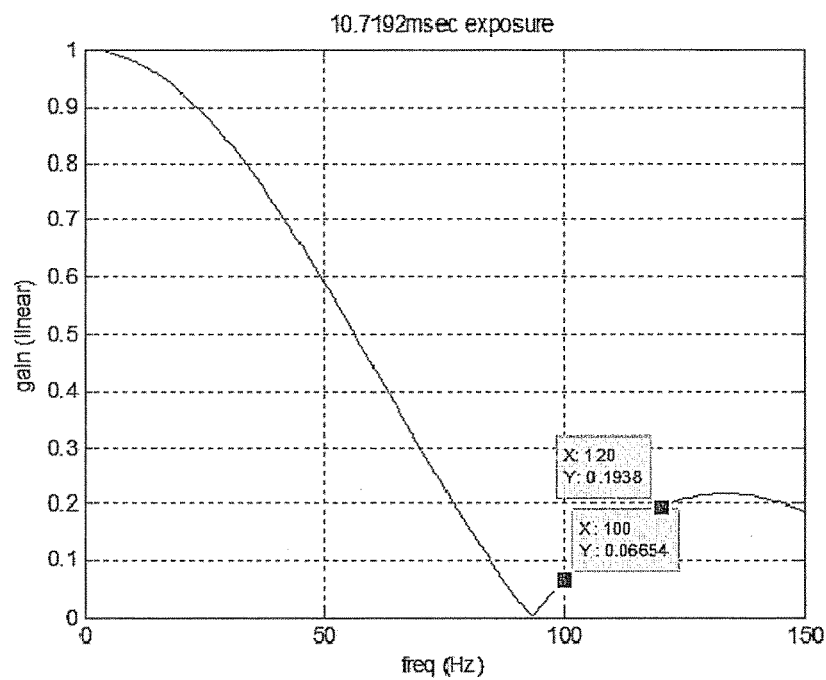
FIG. 8b is a chart illustrating an effect of exposure time at a frame rate, in accordance with one embodiment of the present invention.
Figure 8C:
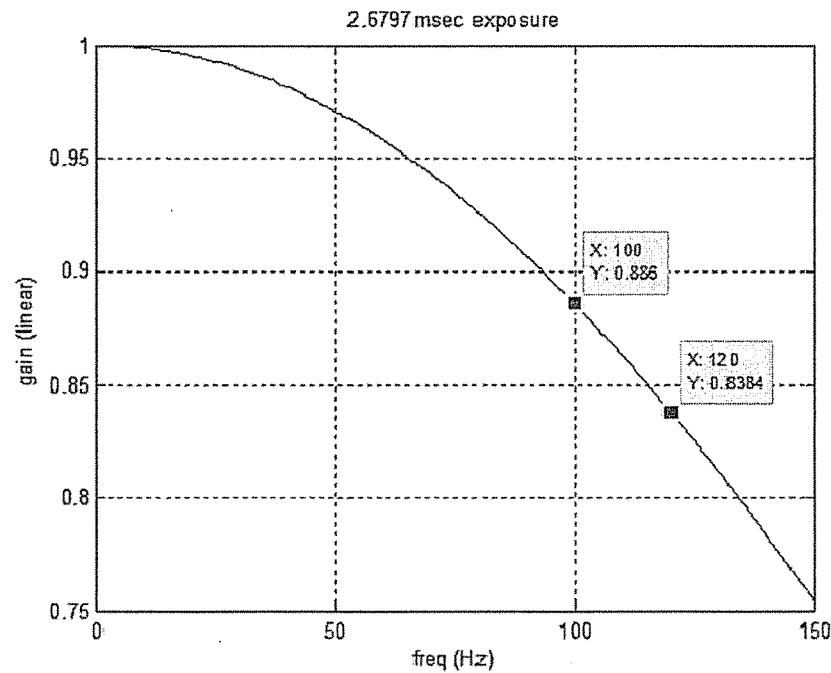
FIG. 8c is a chart illustrating an effect of exposure time at a frame rate, in accordance with one embodiment of the present invention.

In regards to FIGS. 7a-7c, these charts illustrate an effect of exposure time using an approximately 22.1124 Hz frame rate, wherein FIG. 7a illustrates an exposure time of approximately 44.99 ms, FIG. 7b illustrates an exposure time of approximately 11.3008 ms, and FIG. 7c illustrates an exposure time of approximately 2.8252 ms. As to FIGS. 8a-8c, these charts illustrate an effect of exposure time using an approximately 23.3293 Hz frame rate, wherein FIG. 8a illustrates an exposure time of approximately 42.64 ms, FIG. 8b illustrates an exposure time of approximately 10.7192 ms, and FIG. 8c illustrates an exposure time of approximately 2.6797 ms.

Figure 35:
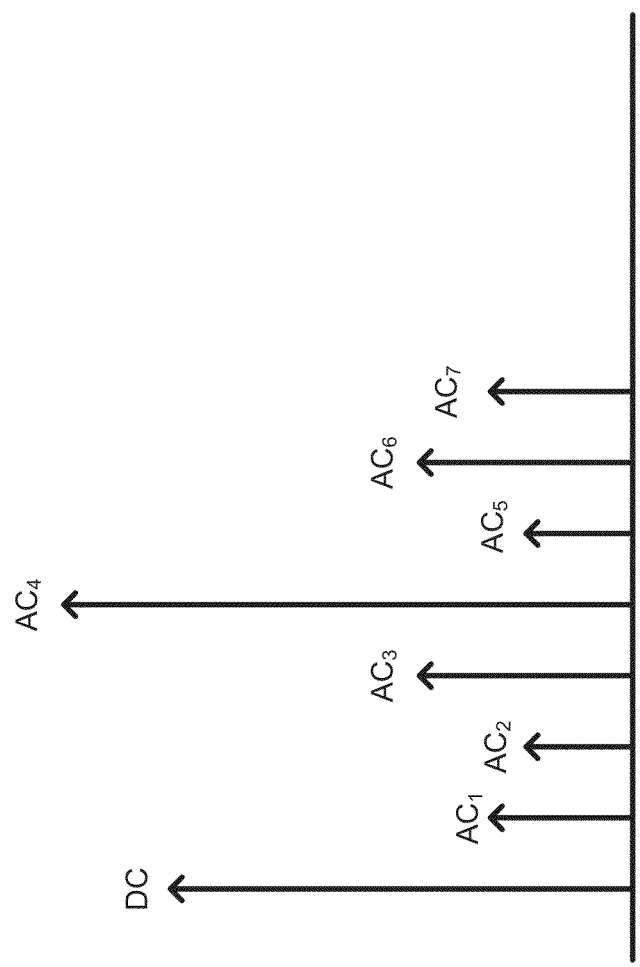
FIG. 35 is a chart illustrating of various samples of an imaged light source, in accordance with one embodiment of the present invention.
Figure 36:
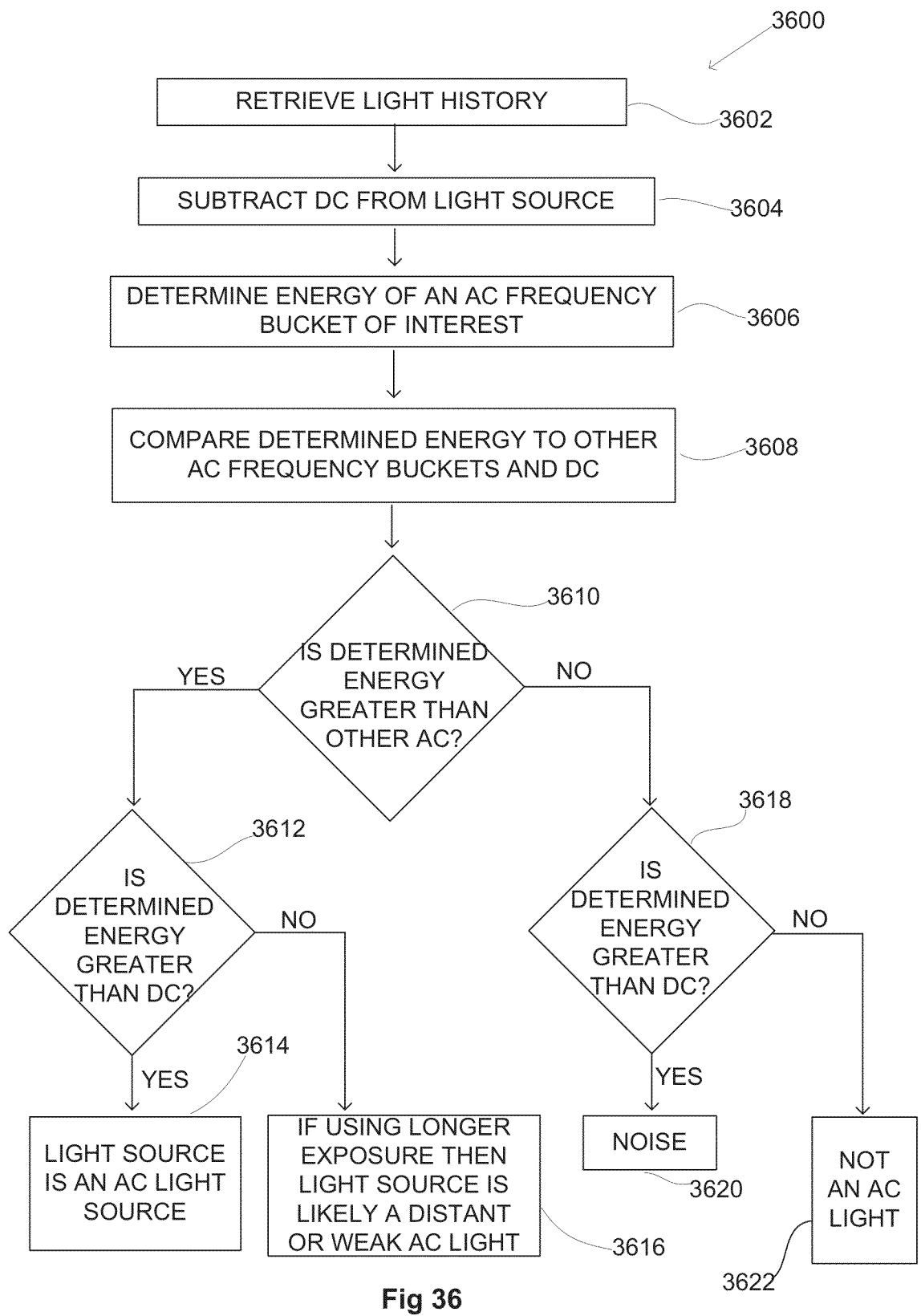
FIG. 36 is a flow chart of a method for detecting an alternating current (AC) light source in an image, in accordance with one embodiment of the present invention.

With respect to FIGS. 35 and 36, a method of detecting an AC light source in one or more high dynamic range images is generally shown in FIG. 36 at reference identifier 3600. At step 302, a light history is retrieved, which can include retrieving data that has been stored for a detected light source for two or more images. According to one embodiment, seven approximately consecutive images can be used, which yields a DC bucket and 6 AC bins. Alternatively, other suitable number of approximately consecutive images can be used, such as, but not limited to, 14 images, which yields a DC bucket and 13 AC bins. Taking the DTFT of the sample yields the DC sample and the various AC samples. At step 3604, detected DC is subtracted from the samples in the time domain, and step 3608, the determined energy is compared to other AC frequency samples (buckets) and the DC sample.

At decision step 3610, it is determined if the determined energy is greater than the other AC samples. If it is determined at decision step 3610 that the determined energy is greater than the other AC samples, then the method 3600 proceeds to decision step 3612, wherein it is determined if the determined energy is greater than the DC. If it is determined at decision step 3612 that the determined energy is greater than the DC, then the method 3600 proceeds to step 3614, wherein the imaged light source is classified as an AC light source. However, if it is determined at decision step 3612 that the determined energy is not greater than the DC sample, then the method 3600 proceeds to step 3616, wherein the imaged light source is classified a distant light source (e.g., far away from the controlled vehicle 105) if the exposure was approximately 10 ms or greater.

If it is determined at decision step 3610 that the determined energy is not greater than the other AC samples (it can already be determined that the light source is not an AC light source), the method 3600 proceeds to decision step 3618, wherein it is determined if the determined energy is greater than the DC sample. If it is determined at decision step 3618 that the determined energy is not greater than the DC sample, then the method 3600 proceeds to step 3622, wherein it is determined that the light source is not an AC light source (e.g., a headlight 116 or taillight 111). However, if it is determined at decision step 3618 that the determined energy is greater than the DC sample, then method 3600 proceeds to step 3620, wherein the imaged light source is classified as noise (e.g., light flickering due to motion).

In at least one embodiment, exposure performance of an imaging device is configured for sudden change of brightness in the scene, such as; freeway underpasses; shadows from trees along side freeways; and freeway tunnel entrances/exits. In at least one embodiment, a high dynamic range imaging device, such as that described in commonly assigned U.S. Patent Application Publication Nos. 2008/0192132, 2009/0160987, 2009/0256938, and 2009/0190015, and Taiwanese Patent Application No. 97103404, filed Jan. 30, 2008, the disclosures of each of the above are incorporated in their entireties herein by reference. The disclosures of each of the above are incorporated in their entireties herein by reference. In at least one embodiment, a WVGA, ⅓ inch, stand-alone CMOS imaging device p/n MT9V024, as available from Aptina imaging is incorporated; in a related embodiment, a "synthetically" created high dynamic range source may be made available via combination of non-high dynamic range images utilizing two or more unique integration periods for a given non-high dynamic range imaging device as is known.

In at least one embodiment, a control system is configured to incorporate a synthetic high dynamic range image as described in commonly assigned U.S. Pat. No. 7,683,326, the entire disclosure of which is hereby incorporated herein by reference. In at least one embodiment, an imaging device may incorporate an integration period that is at least in part a function of a second light sensor having a field of view different from the imaging device.

The present invention is particularly advantageous when incorporated in lane departure warning, lane tracking and lane keeping systems utilized in various vehicular applications. In at least one embodiment, the system 106 is configured to detect lane markers where one lane marker is in a shadow and another lane marker is within a portion of a scene not within a shadow. In at least one embodiment, a controller is configured to detect both lane markers in shadows and those exposed to sunlight within a common image. In at least one embodiment, the system 106 is configured to detect lane markers at night even with headlight(s) 116 of oncoming vehicle(s) 115 present in a given scene; in a preferred embodiment, the system 106 is configured to detect lane markers with oncoming vehicles 115 in a closest lane.

In at least one embodiment, the system 106 is configured to detect lane markers with shiny road surfaces (example, wet pavement); a preferred embodiment is configured to detect lane markers on shiny road surfaces when the associated controlled vehicle is being driven toward a rising or setting sun.

Figure 34:
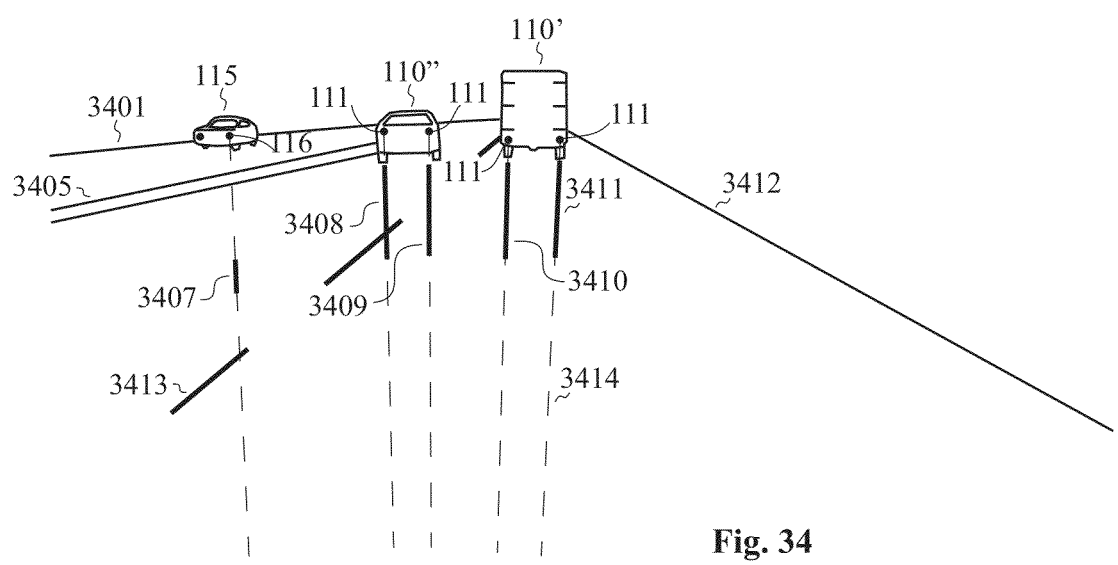
FIG. 34 is an environmental view of a field of view of an imager, in accordance with one embodiment of the present invention.

With respect to one embodiment directed towards detecting lane markers on wet pavement and FIG. 34, reflections of lights on wet pavement, particularly from tail lamps 111 or headlamps 116 of other vehicles 110, 115, frequently appear as elongated streaks that may be confused as road lane markings. Elongated reflections of the type likely to be confused as lane markings often come from bright lights that are close to the road and headlamps 116 and tail lamps 111 are frequently the source as indicted above. The system 106 described may locate other lights and is not limited to headlamps 116 or tail lamps 111. A way to screen out many of these false lane indications is to locate the associated bright light source as the cause of the reflection or to verify that there are no likely sources of such reflections to confirm that the image is likely to be a mark on the roadway. Since images used in this device include close, directly viewed lamps, a camera with an exceptionally wide dynamic range greatly enhances performance of the device.

To correctly associate light sources and their reflections and to expedite the search to locate such sources, it is instructive to investigate some typical geometric characteristics of these reflections. A water coated, smooth, level section of highway may approximate a modestly diffuse horizontal reflecting surface. A body of water having modest surface ripples may provide similar reflections. In a picture of a scene that includes a still, mirror like, body of water and a reflected scene taken with a camera aimed in a horizontal direction that includes the scene and its reflected image, the features in the reflected image are inverted but vertically aligned with the corresponding features in the actual scene. When modest ripple is introduced, the predominant effect is to modestly widen the image of a reflection and lengthen it, sometimes greatly, in a generally vertical direction along the vertical line through the image of the object and the area of strongest reflection in the reflected image. Here the area of strongest reflection is normally close to the vertically aligned area where the reflected image would appear with still water. These characteristics correlate well with reflections from wet, flat, level roadway. One characteristic difference is that most highways are not flat but have a modest crown. The crown causes the alignment of the light source and the associated reflected image to tilt modestly to the left on the left side of the scene and modestly toward the right on the right side of the scene. This causes a modest divergence in the camera images of lines drawn through light sources and their associated reflected images in going from reflections on the left to reflections on the right. This is indicated by slightly wider separation of lines 3407, 3408, 3409, 3410, and 3411 in FIG. 34 as one progresses from closer locations toward the bottom of the image to more distant locations viewed toward the top of the image. In the above, vertical and horizontal are used to indicate relative orientation. Since a vehicle is positioned relative to the portion of the road that is in contact with its tires, it tends to maintain its angular orientation relative to any incline that this portion of the road might have, and it should be understood that this angular orientation of the road where the vehicle is supported is technically a better reference than references to vertical or horizontal. Thus, the descriptions above apply just as well to flat or crowned and uniformly inclined portions of the roadway as they do to horizontally oriented flat or crowned surfaces, and in this more general case, the vertical reference is replaced by a reference to a normal to the road surface.

In a preferred application, a scan is performed to locate features in the image that are likely to be lane markings. This may, as an option, be done using a version of the scene on which a perspective transformation has been applied, but references to location and orientation apply to the image before such transformations are applied. Then, searches are performed to locate or verify the absence of bright peaks that indicate an intense light source in a relatively narrow region above each of the feature that are in question. If a light source is found in the restricted area above a feature, it indicates the likelihood that the associated mark is a reflection and the absence of such a light source adds evidence that the mark is on the road. The area searched may be adjusted to compensate for the crown of the roadway by providing a modest counterclockwise rotation of the search area on the left side of the image and a modest clockwise rotation of the search on the right side of the image centering these rotations on the feature being evaluated as a reflection. The color of a marking in question may also be compared with the color of an associated light source as further verification of a match. Here, for example, a reflection from a tail lamp has considerably more red content than green or blue content, and reflections from a headlamp have appreciable green content relative to the red content (this does not mean that the green is necessarily higher than the red, just that it is not expected to be extremely low compared to the red). The color content of different headlamps and even different tail lamps may differ considerably, so a best way to perform the match is to obtain color measurements of both the light from the reflection and the associated light and to compare the relative colors of these measured values. The color content of the reflected light does not necessarily match that of the source, so tolerance are preferably provided to accommodate these variations as well as color measurement errors. A preferred embodiment provides a color matching score that is used to in part to calculate the probability that the feature is a road marking.

FIG. 34 represents features of a digital image taken by a camera mounted to view the road in the forward direction through the windshield of the vehicle 105 (FIGS. 1 and 2) in which it is mounted. Reflections on the road are visible from both tail lamps 111 of truck 110' and car 110", and reflections from the driver side headlamp 116 of car 115 are also visible. In more detail, reflections from tail lamp 111 of the truck 110' create a visible stripe on the road as indicated by the thicker line 3411. The lighter dashed construction line 3414 indicates the approximate co-linear alignment of the lamp 111 and its reflection 3411 on the road and the approximately vertical orientation of the line in the image. Heavier lines 3407, 3408, 3409, and 3410 indicate reflections of the other four lights from the wet pavement, and dashed construction lines similar to line 3414 indicate the approximate vertical orientation and approximate co-linearity of the light sources and their associated reflections. The very modest divergence of the associated construction lines in the upward direction indicates the effect of the crown in the road. Lines 3401 and 3412 mark edges of the road, dashed line 3413 is a lane marker, and 3405 is a center barrier. Note the relatively large angle of convergence for these lines in the perspective view of the relatively straight roadway as opposed to the near parallel lines of reflection that even diverge modestly due to the crowned roadway. These geometric features may optionally be used as other indicators to distinguish reflections from roadway markings. However, in some cases, only one reflected feature may be sensed, and it is more straightforward to search a relatively well defined area for a bright light source than to compare the relative orientation of features in the image not knowing if they are reflections or actual markings.

Cameras used for lane departure warning are often used for associated functions such as headlamp dimming and/or aiming control that depends in part on locating lights in the scene so information used to locate the lights may be shared. The near vertical orientation of the reflections refers to the original image and not to a mapping, such as a transformation to a top down view that changes the directional orientation of lines, so the method indicated may necessitate converting the location of features in question from a mapped space back to an orientation related more directly to the original image in order to access the right data to locate associated lights if they are present. As an alternative, some or all of the needed information may be mapped to the transform space, and orientations that are near vertical in the image may be classified so that they may be identified in the transformed image space.

In at least one embodiment, the system 106 is configured to detect lane markers with dark road surfaces; a preferred embodiment is configured to detect lane markers when the controlled vehicle is being driven during twilight gloom or evening time. In at least one embodiment, the controller is configured to detect lane markers during twilight gloom or evening time with headlight(s) of oncoming vehicle(s) within the scene. In a related embodiment, the controller is configured to detect lane markers within an image during twilight gloom or evening time with headlight(s) 116 of oncoming vehicle(s) 115 within the image at a closest oncoming traffic lane.

In at least one embodiment of the present invention, the controller is configured to detect lane markers within an image that was acquired while an associated controlled vehicle 105, and therefore the associated imaging device, was moving vertically and/or horizontally in addition to parallel to a roadway. A preferred embodiment is configured to detect lane markers within a series of images acquired while an associated controlled vehicle 105 is moving vertically and/or horizontally in addition to parallel to a roadway. In at least one embodiment, the controller is configured to compute the eco-motion within a series of individual images. A related embodiment employs at least one accelerometer input to impart image stabilization. A preferred embodiment of the present invention is configured to associate a detected lane marker in a given image with a detected lane marker in a second image within a series of images; in at least one embodiment, the controller is configured to detect and track a given lane marker within a series of stabilized images. In a related embodiment, the system 106 is configured to detect and track lane markers within a series of stabilized images when the associated controlled vehicle is being driven in an environment, such as night time or in a tunnel, where an associated imaging device has a relatively long exposure time.

In at least one embodiment, the system 106 is provided to detect low contrast markers; a preferred embodiment is configured to detect both yellow and white lane markers on concrete pavement road surface. In a related embodiment, the controller is configured to detect tinted lane markers; a preferred embodiment is configured to detect tinted lane markers at night. At least one embodiment of the present invention is configured to detect lane markers that are comprised of a series of protrusions potted into the roadway surface; a preferred embodiment is configured to detect lane markers comprised of a series of protrusions potted into the roadway surface when the lane markers are in shadows during the day. Often, the series of protrusions are referred to as Botts' dots, which are round non-reflective raised pavement markers. In many U.S. States and in several other countries, Botts' dots are used (along with reflective raised pavement markers) to mark lanes on highways and arterial roads. They provide tactile feedback to drivers when they move across designated travel lanes, and are analogous to rumble strips. Botts' dots are most commonly white, but may also be yellow when used to substitute for the yellow lines that divide opposing directions of traffic in North America. The dots are made of various ceramic materials, or plastics like polyester. On some roads, lanes are marked only with a mix of Botts' dots and conventional reflective markers, eliminating the need to repaint lane divider lines.

In at least one embodiment a system is provided to detect lane markers when a corresponding controlled vehicle is being driven in the rain and fog. A related embodiment may be configured as described in commonly assigned U.S. Pat. Nos. 5,923,027, 6,863,405, and 7,019,275, the disclosures of which are herein incorporated in their entireties by reference.

In at least one embodiment, the system 106 is configured to detect lane markers when there is small distance between the associated controlled vehicle 105 and a preceding vehicle 110; in a preferred embodiment a controller is configured to not detect lane markers when there is small distance between the associated controlled vehicle 105 and a preceding vehicle 110, and the speed of the controlled vehicle 105 is below a speed threshold.

Figure 16:
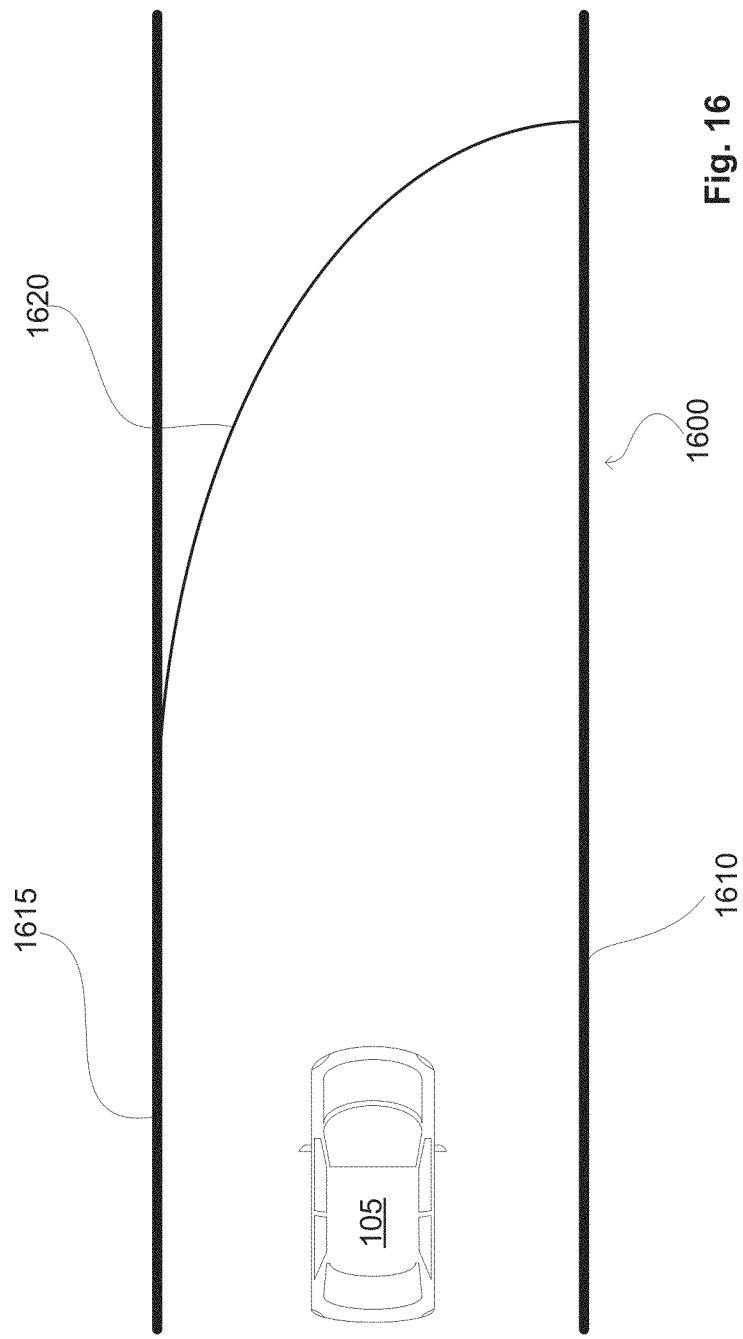
FIG. 16 is an environmental view of a controlled vehicle having an automatic vehicle equipment control system, in accordance with one embodiment of the present invention.

In at least one embodiment, the system 106 is provided to detect lane markers in strong noise environments, for example: roadway surface with mottling surface pattern; tar marks after roadway maintenance/tire mark (skid mark); low contrast lane marker (concrete surface with yellow lane marker); incompletely deleted lane markers 1620 as depicted in FIG. 16; paint on road surface (except lane markers); snow outside of the lane; pavement joint lines; vehicles running side-by-side (close vehicles in proximate lanes); curb-local roads (in general); guard rail; walls close to lane markers; rain/water on the roadway/controlled vehicle windshield wiper movement; nighttime non-vehicular lighting; shadows parallel to lane markers. As depicted in FIG. 16, the controlled vehicle 105 is located on a roadway 1600 having left lane markers 1615 and right lane markers 1610.

In at least on embodiment of the invention a controller is configured to detect low density lane markers (markers with large space, up to 2.5 meters); a preferred embodiment is configured to detect lane markers comprised of a series of low density protrusions potted into the roadway surface.

Figure 17:
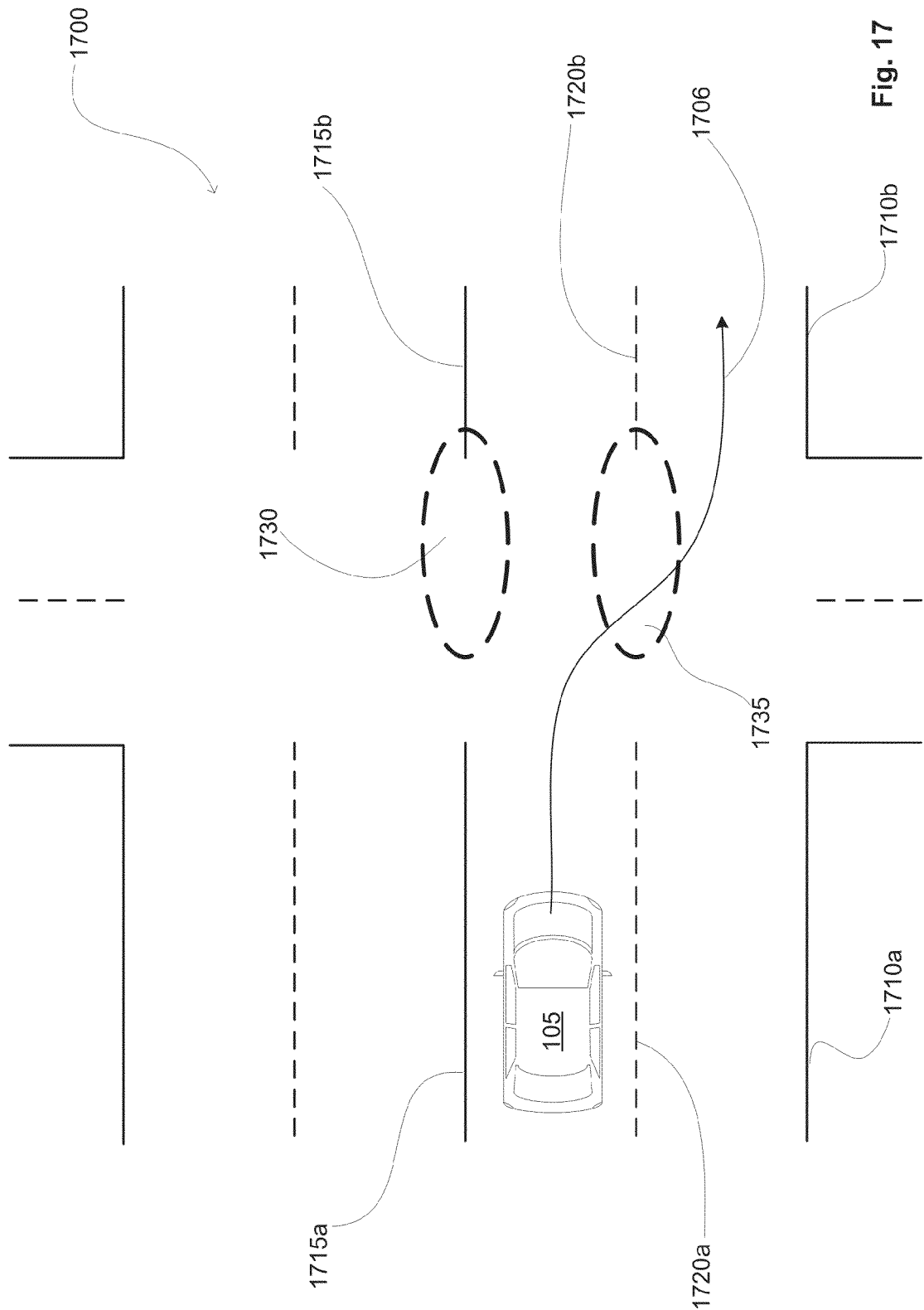
FIG. 17 is an environmental view of a controlled vehicle having an automatic vehicle equipment control system, in accordance with one embodiment of the present invention.

In at least one embodiment, the system 106 is configured to detect lane markers within a detect time period subsequent to driving the controlled vehicle 105 through a toll gate, after a roadway merger section, and after intersections. In a related embodiment, the system 106 is configured to cease lane marker detection within a no-detect time period subsequent to when lane markers disappear. With reference to FIG. 17, warning is not necessary at 1735 when the controlled vehicle 105 is drive along path 1706, and at 1730. In at least one embodiment, the system 106 is configured for low false-alert rate when the vehicle 105 is within intersection. As depicted in FIG. 17, the controlled vehicle 105 is located on a four lane roadway 1700 having left lane markers 1715*a*, 1715*b*; center lane markers 1720*a*, 1720*b*; and right lane markers 1710*a*, 1710*b*.

In at least one embodiment, lane markers that define curvature in the roadway are detected; in a related embodiment a system threshold for lane marker curvature radius is selected such that lane markers are detected on steep road curves. In at least one embodiment a change ratio of lane marker curvature is utilized to detect lane markers; in a preferred embodiment, a change ratio by time is linear to a speed of the controlled vehicle 105.

Figure 18:
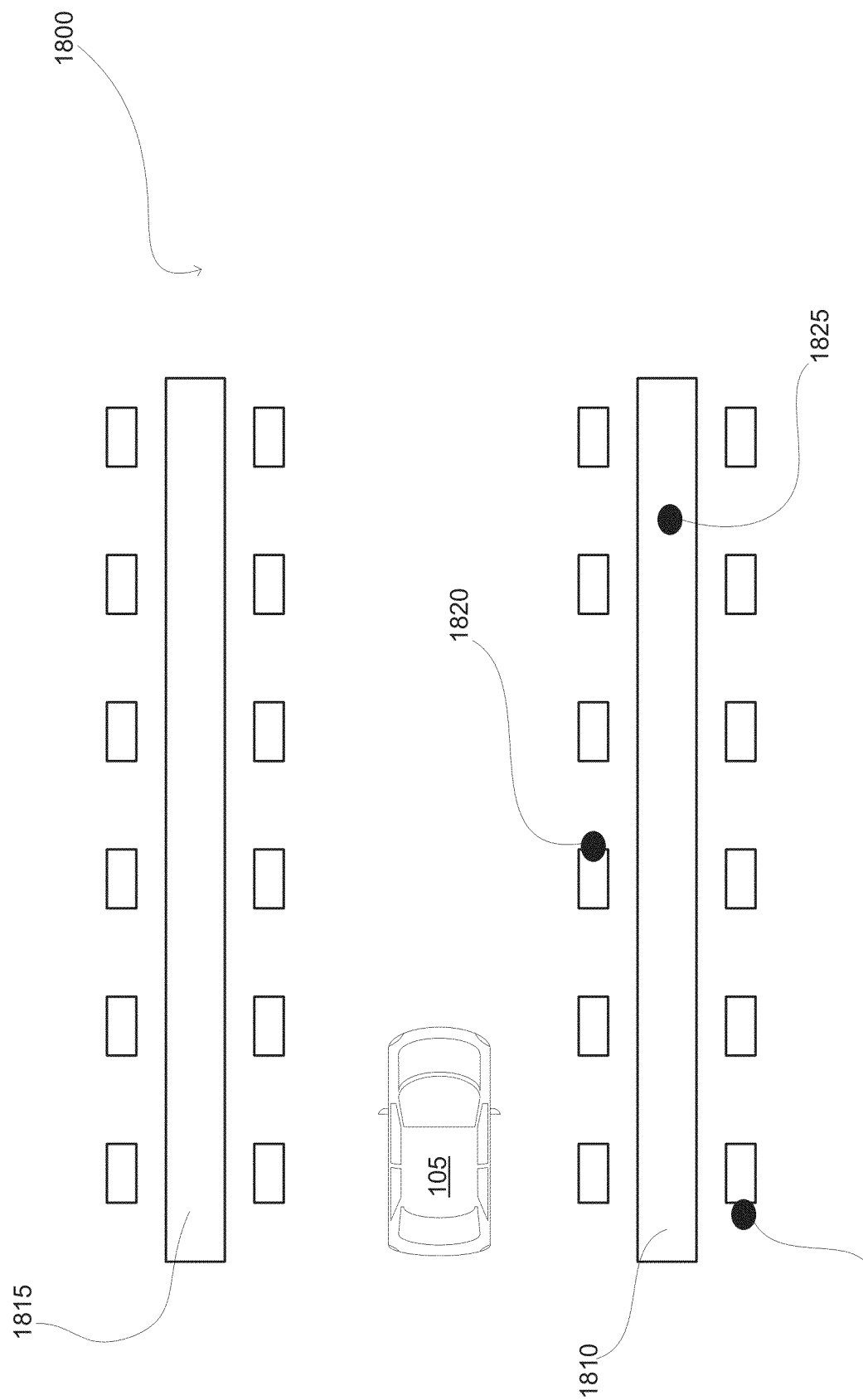
FIG. 18 is an environmental view of a controlled vehicle having an automatic vehicle equipment control system, in accordance with one embodiment of the present invention.
Figure 19:
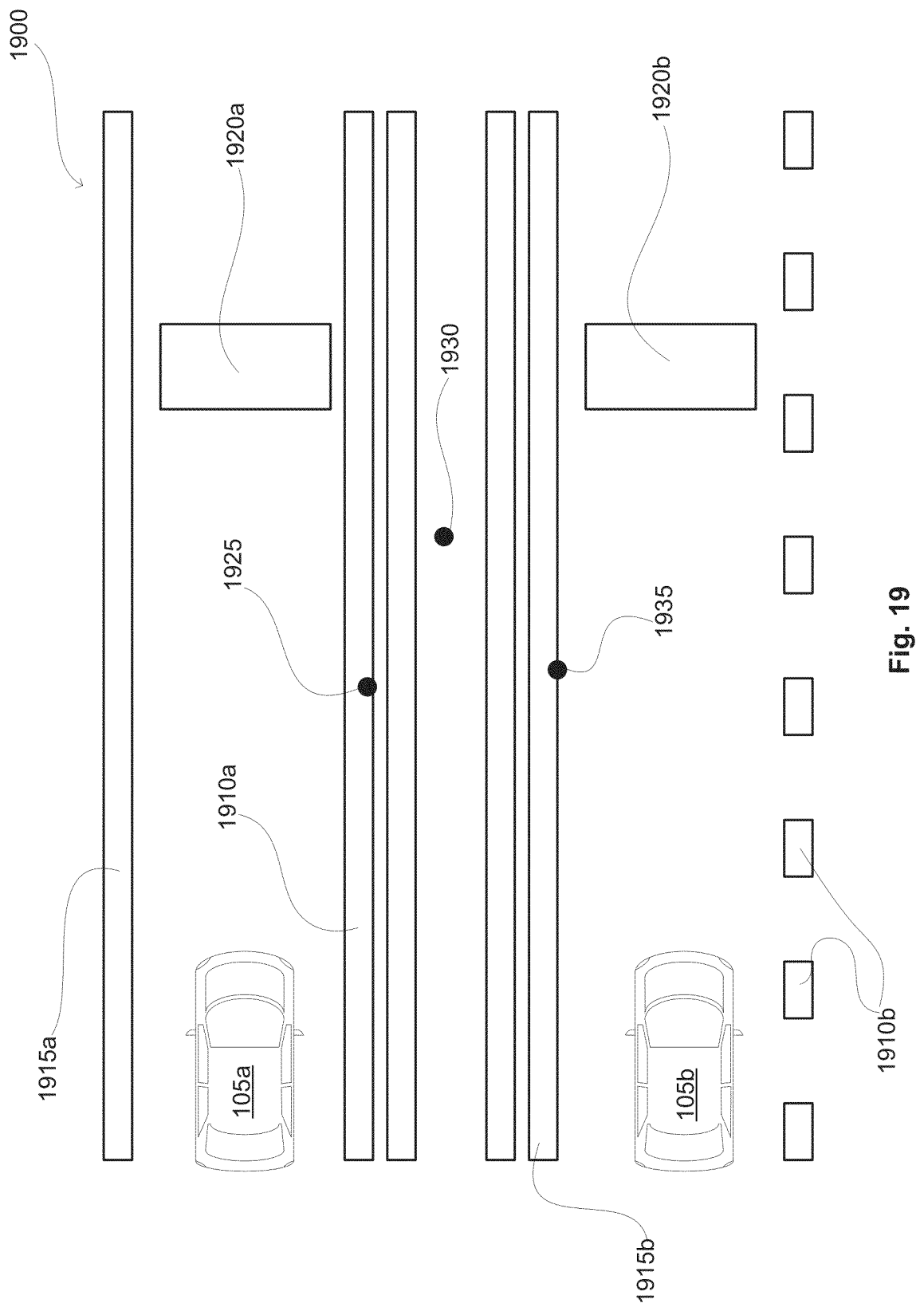
FIG. 19 is an environmental view of a controlled vehicle having an automatic vehicle equipment control system, in accordance with one embodiment of the present invention.

At least one embodiment of the present invention is configured to detect unique lane markers. As depicted in FIG. 18, the controlled vehicle 105 is located on a roadway 1800 having left lane markers 1815 and right lane markers 1810. In at least one embodiment, unique lane markers, such as: multiple lane markers side by side and composite lane markers. As depicted in FIG. 18, the system 106 is configured that warning against solid line 1825 is defined as appropriate timing, warning against first dashed lane marker 1820 is an early warning, and warning against second dashed lane marker 1830 is considered a late warnings. There are 10 predominate patterns associated with roadways of interest; a preferred embodiment is configured to detect all 10 patterns of composite patterns. At least one embodiment is configured to detect lane markers on roadways having a carpool lane (HOV lane) 1920a as depicted in FIG. 19, it should be appreciated that there are various type of carpool lanes throughout the World. As depicted in FIG. 19, controlled vehicles 105a, 105b are located on a roadway 1900 having left lane markers 1915a, 1915b, respectively, right lane markers 1910a, 1910b and a non-carpool lane 1920b. In at least one embodiment, the system 106 is configured such that when a controlled vehicle 105 is driven in a carpool lane, warning at 1925 is appropriate and warning at 1930 and 1935 are considered late warnings. In at least one embodiment, the system 106 is configured such that when a controlled vehicle is driven in a non-carpool lane, warning at 1935 is appropriate and warning at 1925 and 1930 are considered late warnings.

Figure 20:
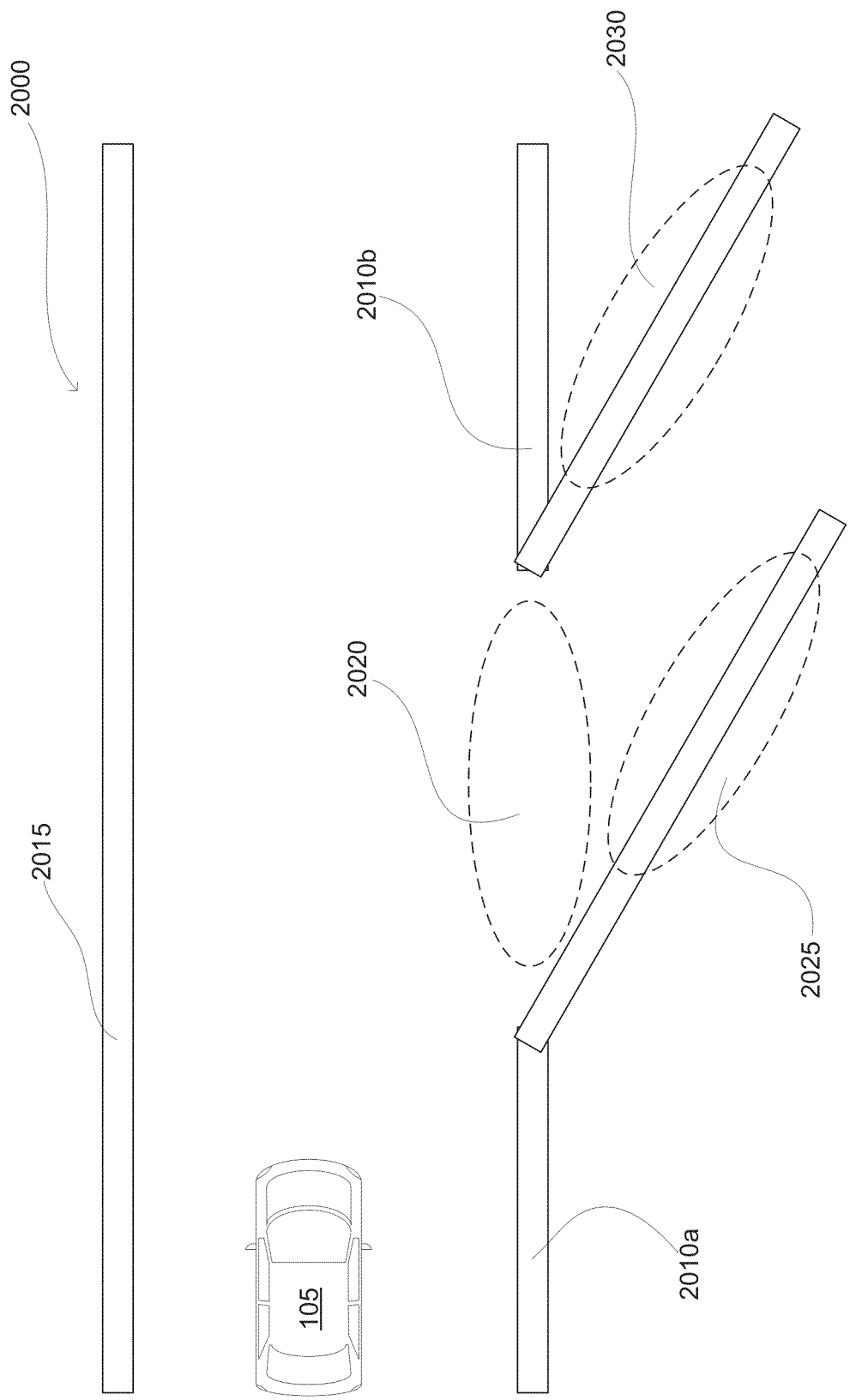
FIG. 20 is an environmental view of a controlled vehicle having an automatic vehicle equipment control system, in accordance with one embodiment of the present invention.
Figure 21:
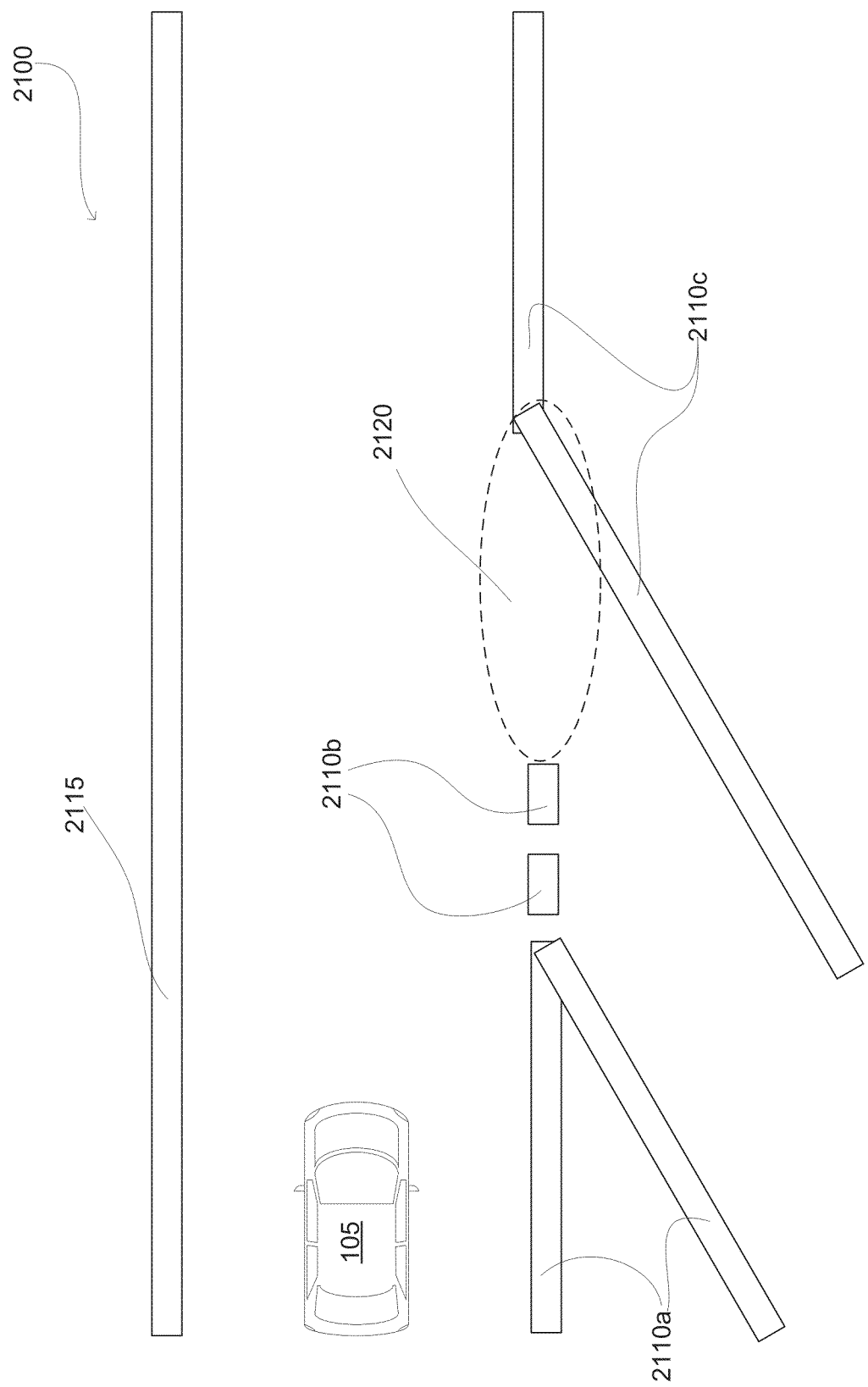
FIG. 21 is an environmental view of a controlled vehicle having an automatic vehicle equipment control system, in accordance with one embodiment of the present invention.

As depicted in FIG. 20, the controlled vehicle 105 is located on a roadway 2000 having left lane markers 2015, right lane markers 2010a, 2010b and a road branch without lane markers. In at least one embodiment, warnings should not occur at 2020, warnings are desired at 2025, and warnings are considered pending at 2030; a preferred embodiment does not generate warnings at 2020 and is able to generate warnings at 2025. As depicted in FIG. 21 a controlled vehicle 2105 is located on a roadway 1600 with a merge not having lane markers, left lane markers 2115 and right lane markers 2110a, 2110b, 2110c.

Figure 22:
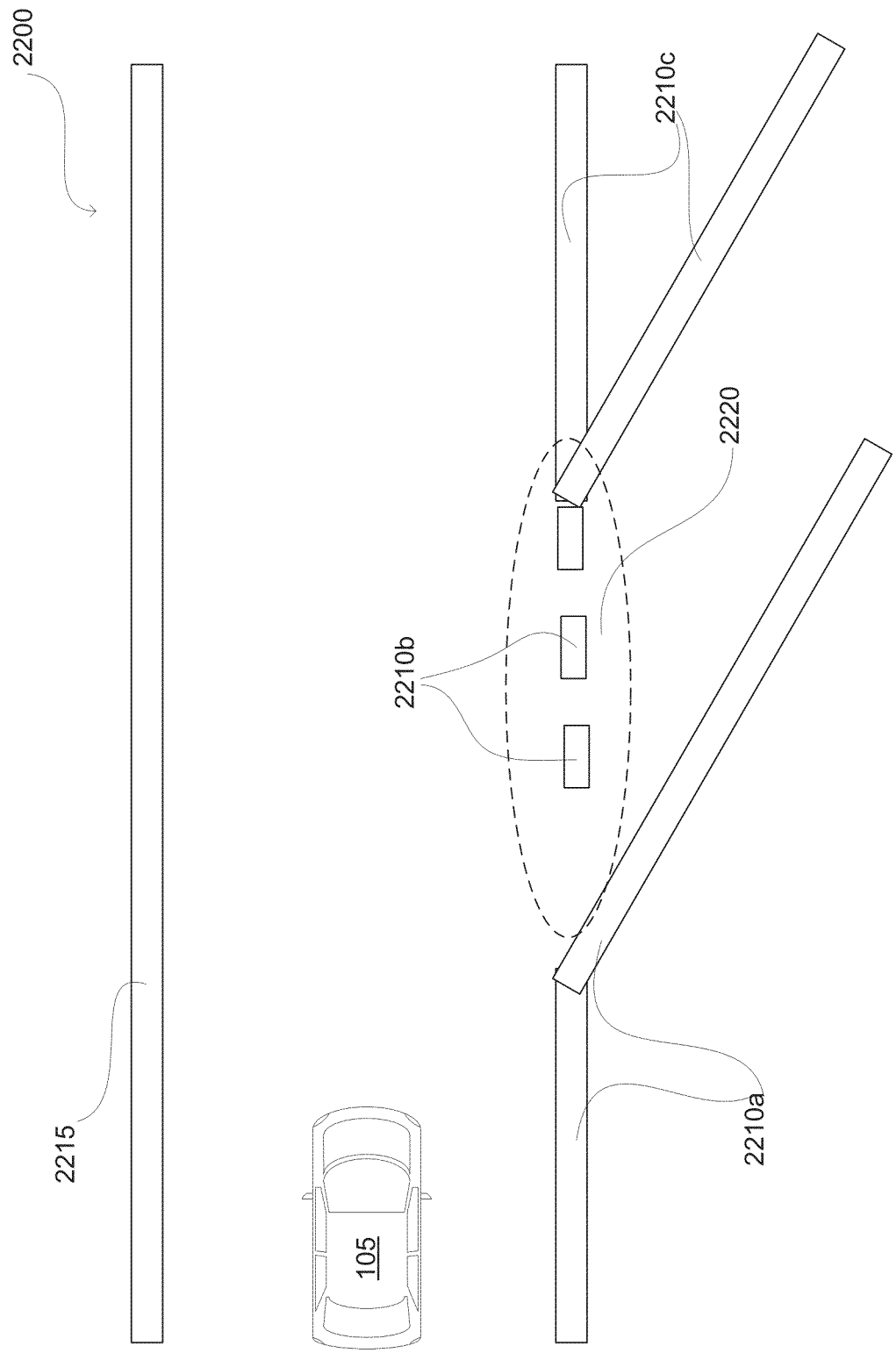
FIG. 22 is an environmental view of a controlled vehicle having an automatic vehicle equipment control system, in accordance with one embodiment of the present invention.

As depicted in FIG. 22, the controlled vehicle 105 is located on a roadway 2200 having branch lane markers 2210b, left lane markers 2215 and right lane markers 2210a, 2210c; a preferred embodiment is configured to generate warnings at area 2220.

Figure 23:
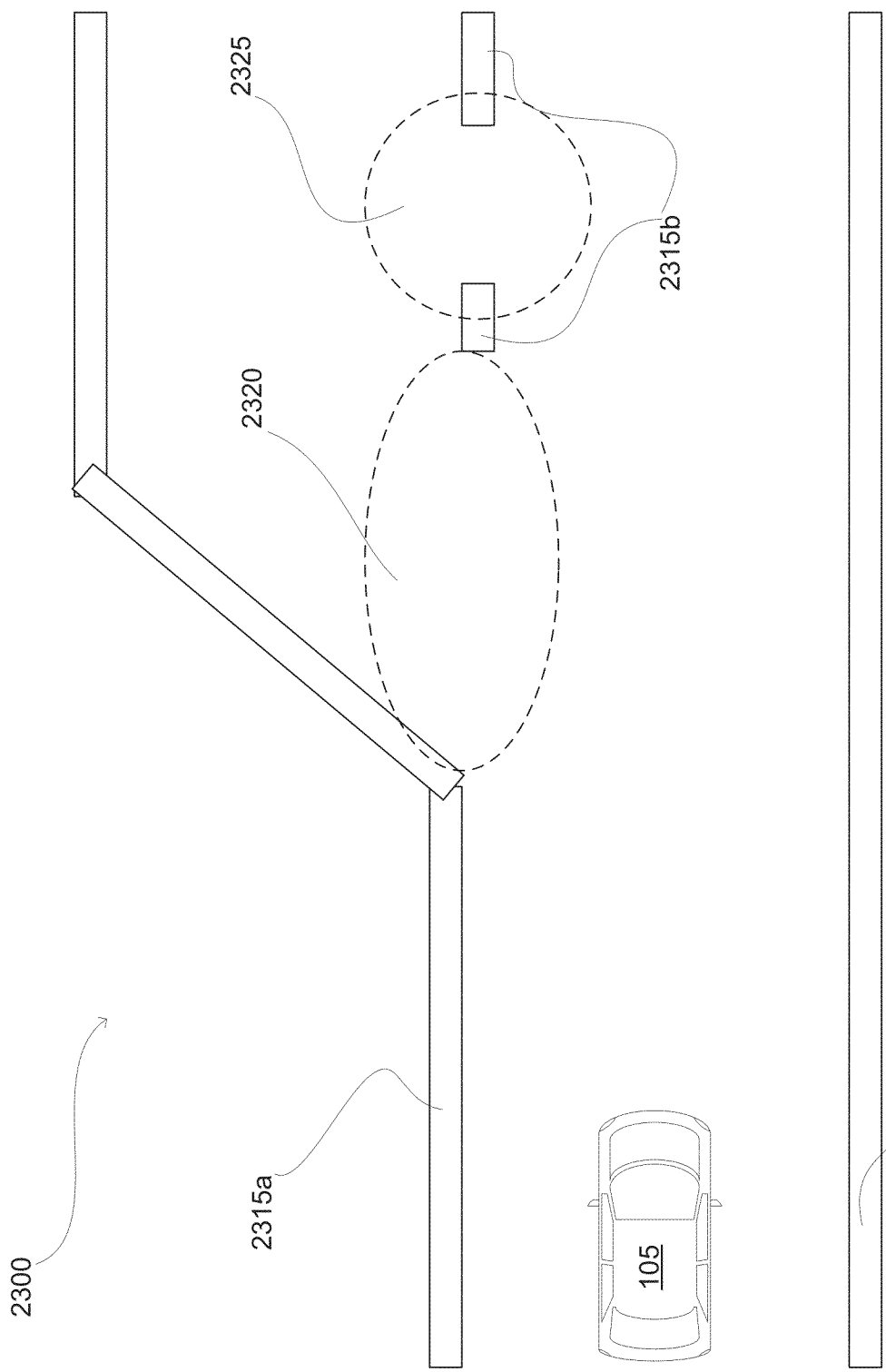
FIG. 23 is an environmental view of a controlled vehicle having an automatic vehicle equipment control system, in accordance with one embodiment of the present invention.

As depicted in FIG. 23, the controlled vehicle 105 is located on a roadway 2300 having a left turn lane, left lane markers 2315a, 2315b and right lane markers 2310; a preferred embodiment is configured to not generate warnings 2320 and should be ready to generate warnings at 2325.

Figure 24:
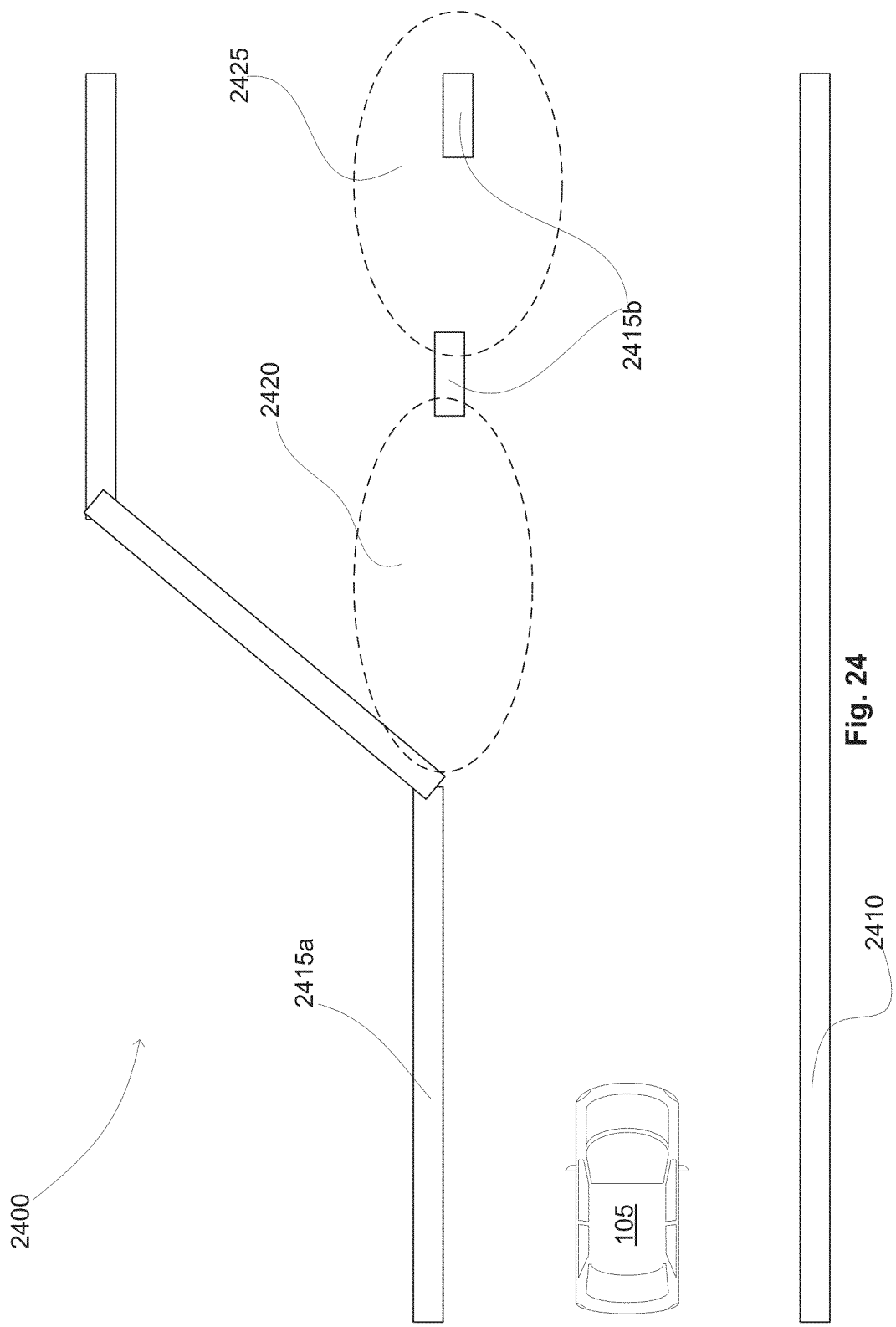
FIG. 24 is an environmental view of a controlled vehicle having an automatic vehicle equipment control system, in accordance with one embodiment of the present invention.

As depicted in FIG. 24, the controlled vehicle 105 is located on a roadway 2400 having a right turn lane, left lane markers 2415a, 2415b and right lane markers 2410; a preferred embodiment is configured to not generate warnings 2420 and should be ready to generate warnings at 2425.

Figure 25:
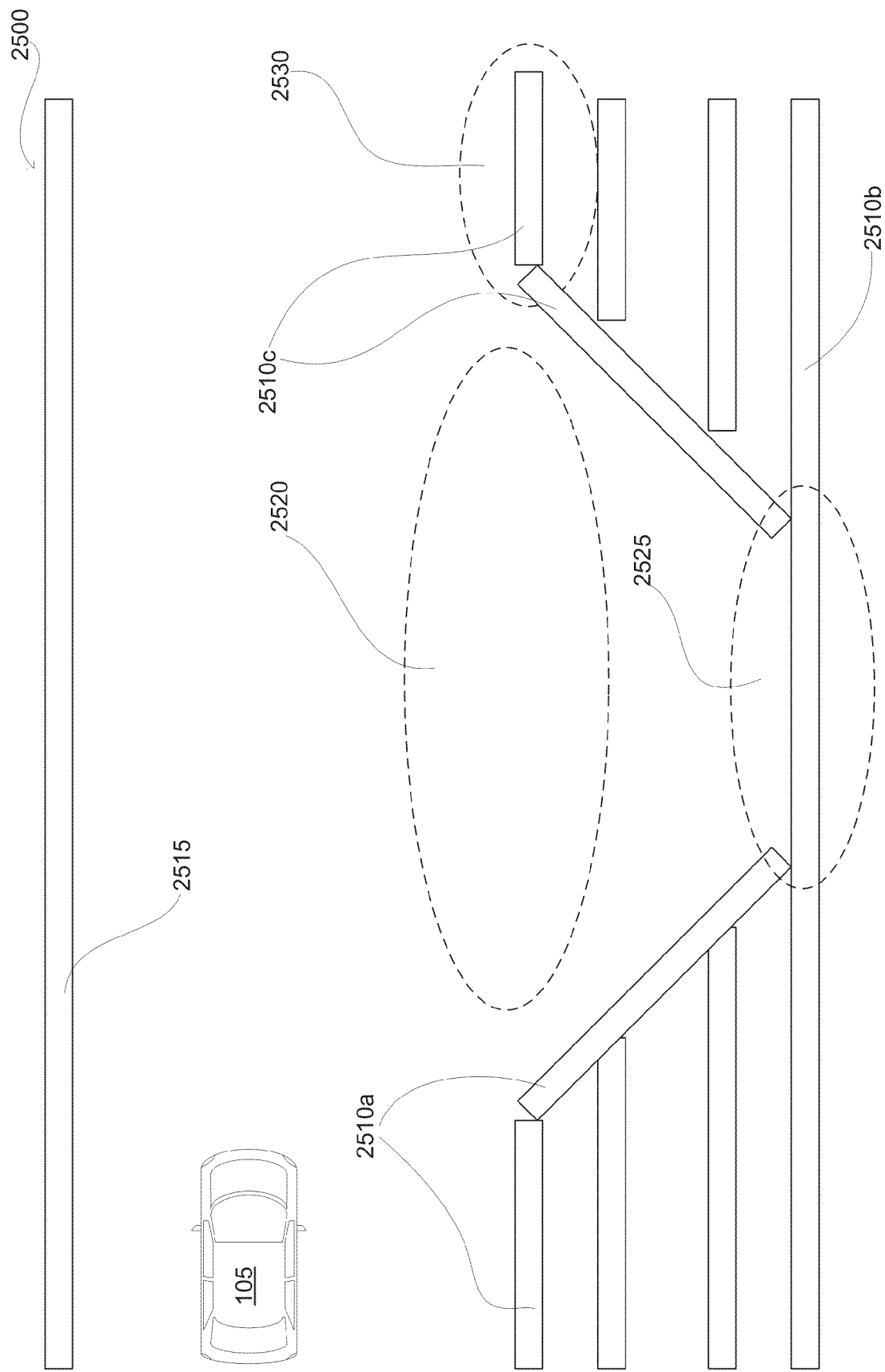
FIG. 25 is an environmental view of a controlled vehicle having an automatic vehicle equipment control system, in accordance with one embodiment of the present invention.

As depicted in FIG. 25, the controlled vehicle 105 is located on a roadway 2500 having a car pool lane exit section, left lane markers 2515 and right lane markers 2510a, 2510b; a preferred embodiment is configured to not generate warnings at 2520, is ready to generate warnings at 2530 and should generate warnings at 2525.

Figure 26:
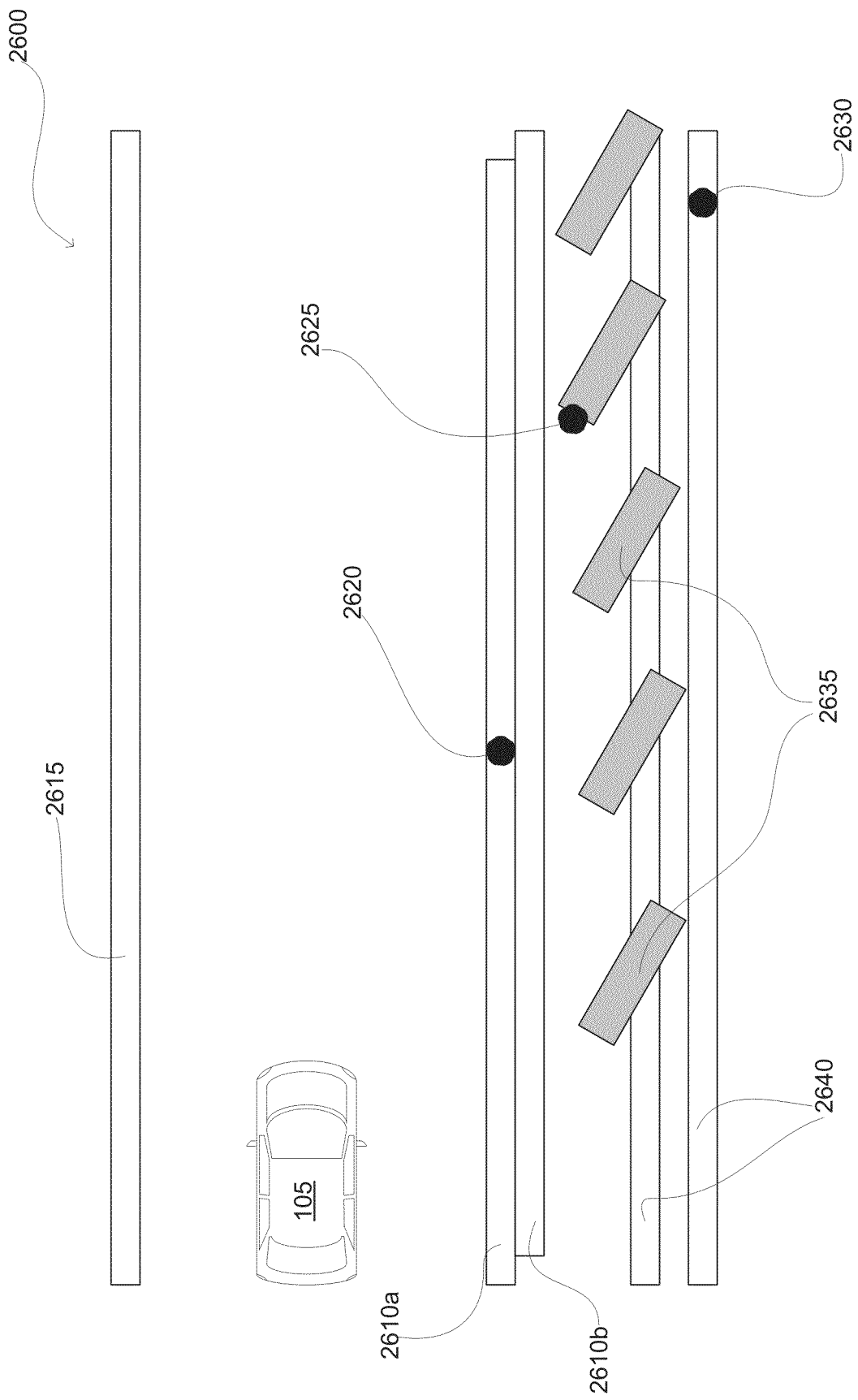
FIG. 26 is an environmental view of a controlled vehicle having an automatic vehicle equipment control system, in accordance with one embodiment of the present invention.

As depicted in FIG. 26, the controlled vehicle 105 is located on a roadway 2600 having tentatively shared zone, left lane markers 2615, right lane markers 2610a, 2610b, pylons 2635 and temporary line markers 2640; a preferred embodiment of the present invention is configured to generate warnings at 2620, warnings at 2625 and/or 2630 are defined as late warnings.

At least one embodiment is configured to detect lane markers on walls proximate a roadway. In at least one embodiment a system is configured to exhibit hysteresis for sporadically spaced lane markers, such as, in car pool lanes, composite lane markers, roadways with mottling surface pattern, fixed roadway surface patterns (tar/slip), short lane markers, and lane markers with long gaps between. In at least one embodiment, the system 106 is configured to detect a general road width on roadways where no lane markers are detectable, such as, snow covered roadways and narrow roadways with no lane markers. At least one embodiment is configured to detect single lane markers only in the center of a roadway.

Figure 27:
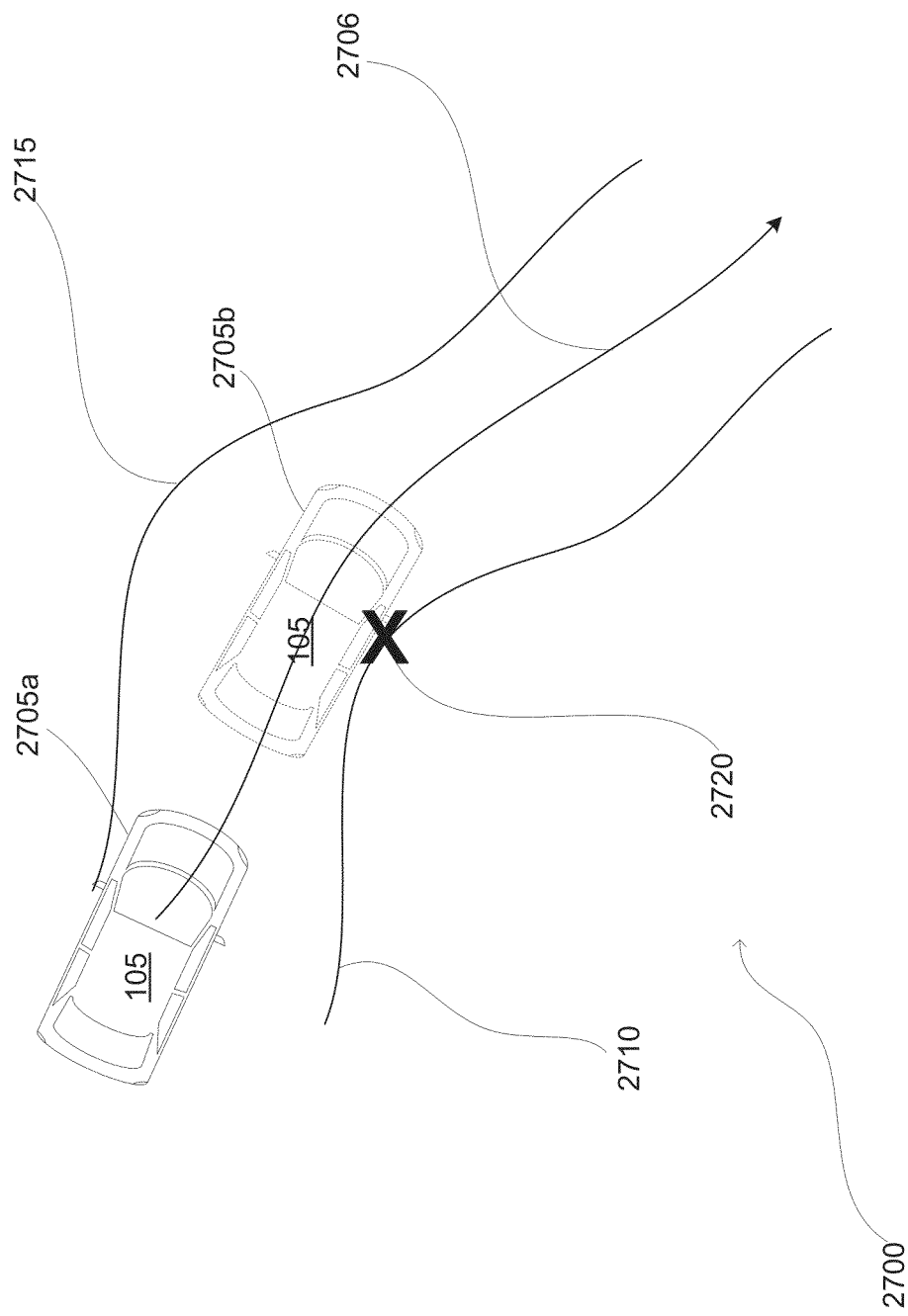
FIG. 27 is an environmental view of a controlled vehicle having an automatic vehicle equipment control system, in accordance with one embodiment of the present invention.

As depicted in FIG. 27, the controlled vehicle 105 is located on a roadway 2700 having curves, left lane markers 2715, and right lane markers 2710. At least one embodiment of the present invention is configured to not generate a false-alert at 2720 when the controlled vehicle 105 is driven from position 2705a to 2705b along path 2706.

Figure 28:
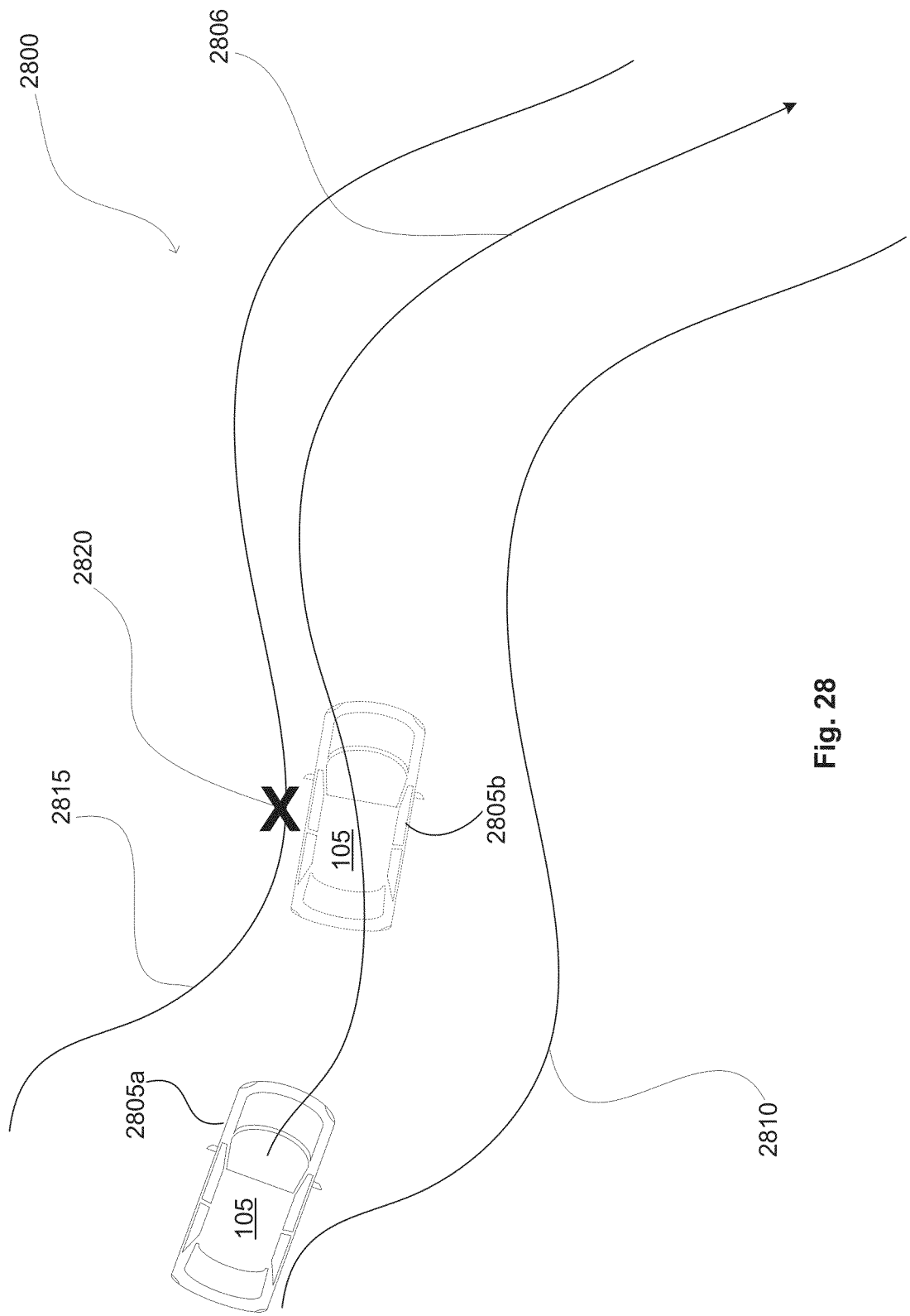
FIG. 28 is an environmental view of a controlled vehicle having an automatic vehicle equipment control system, in accordance with one embodiment of the present invention.

As depicted in FIG. 28, the controlled vehicle 105 is located on a roadway 2800 having curves, left lane markers 2815, and right lane markers 2810. At least one embodiment of the present invention is configured to not generate false-alert at 2820 when the controlled vehicle 105 is driven from position 2805a to 2805b along path 2806.

Figure 29:
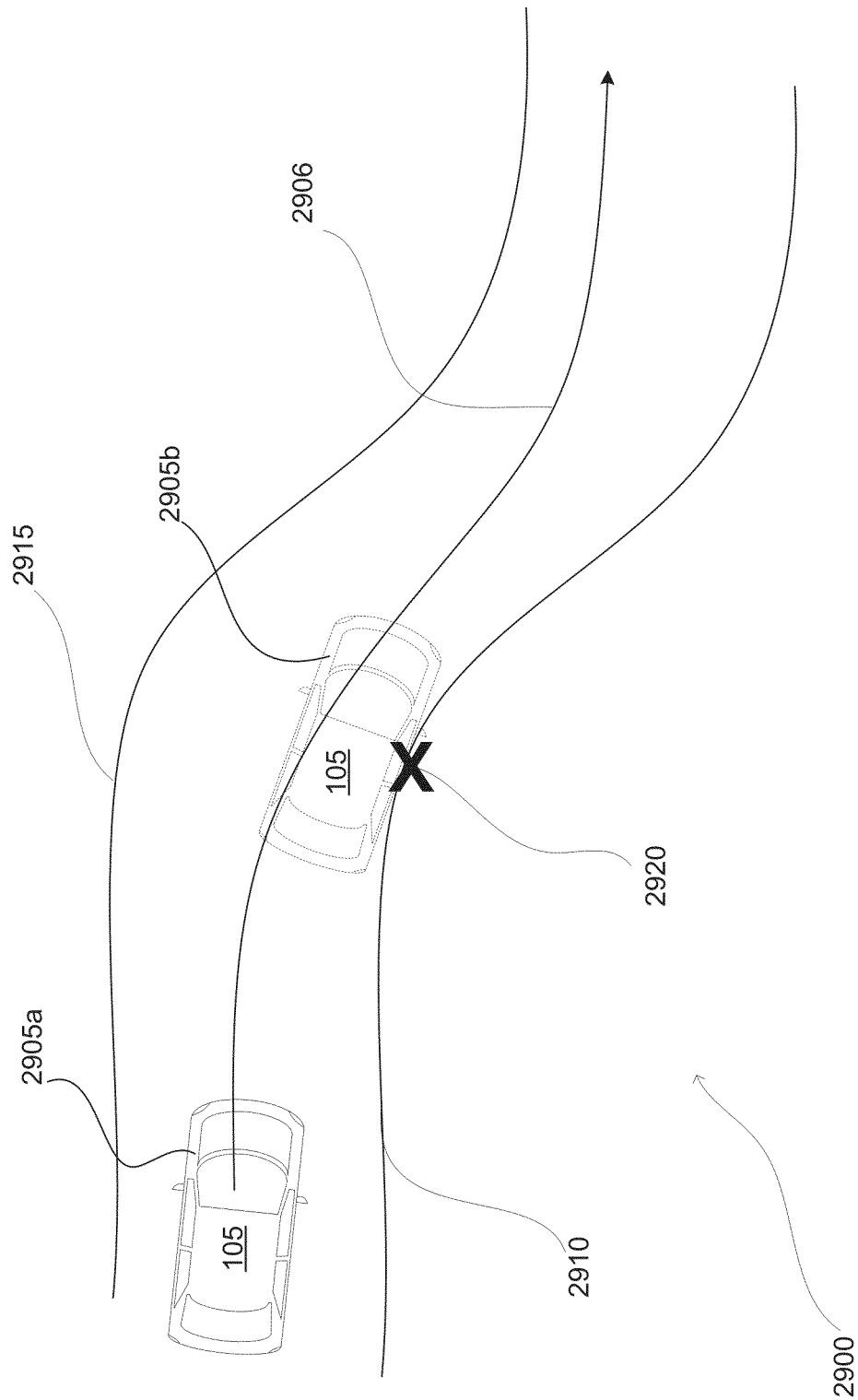
FIG. 29 is an environmental view of a controlled vehicle having an automatic vehicle equipment control system, in accordance with one embodiment of the present invention.

As depicted in FIG. 29, the controlled vehicle 105 is located on a roadway 2900 having curves, left lane markers 2915, and right lane markers 2910. At least one embodiment of the present invention is configured to not generate a false-alert at 2720 when the controlled vehicle 105 is driven from position 2905a to 2905b along path 2906.

It should be understood that the right curve has more chance of a false-alert in countries where cars drive on a right side of the roadway, therefore, a preferred system is configured to detect whether the controlled vehicle 105 is being driven in a right hand or left hand drive country and to automatically compensate. In at least one embodiment, the system 106 is configured to have a low false-alert rate with "Out-In-Out" of the lane marker driving which drivers intentionally do at curve sections.

Figure 30:
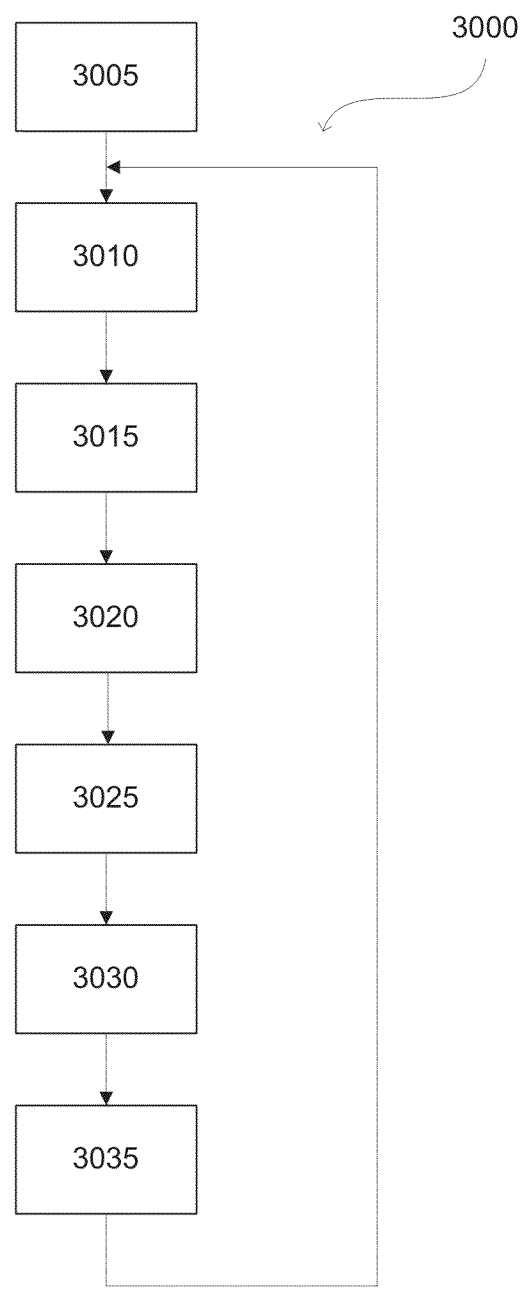
FIG. 30 is a flow chart of detecting a lane departure, in accordance with one embodiment of the present invention.

Turning to FIG. 30, a vehicle lane departure warning (LDW) algorithm block diagram 3000 is depicted that can be included in the system 106. Preferably, the lane departure warning initiation block 3005 runs once per power cycle. During initiation, a lookup table is created. This lookup table expedites the process of translating an image coordinate system to a world coordinate system as described in commonly assigned U.S. Pat. No. 7,881,839, the entire disclosure of which is incorporated by reference herein. This translation converts images from a generally forward facing imaging device to a plan view.

In the beginning of each image processing cycle block 3010, the LDW application populates a world coordinate sample grid from incoming pixel data. In at least one embodiment, the algorithm uses luminance information only obtained from the imaging device. A bilinear interpolation is performed in cases where sample grid points translate to fractional coordinates in the image plane. In at least one embodiment, incoming imaging device data is presented in 24 bit luminance+8 bit chrominance format, the 8 bits of chrominance data is reset to zero.

In block 3015 marker points (e.g., detected lane markers) are "scored." The LDW application calculates a cross correlation error for a series of grid sample points. By fitting a template to the translated image data, one can calculate a score indicating the likelihood that a series of grid sample points represent a lane marker. The output of this step results in a set of index/row pairs, pertaining to centers of potential lane markers, and a corresponding score for indicating the probability that they are actual lane marker points. In at least one embodiment, the current state of the LDW application only scores points that fall within specific regions of interest.

In block 3020, the points scored in block 3015 are processed. This step classifies the lines into eight possible line types: unknown, single, single-dashed, single-unknown, double, double-dashed-left, double-dashed-right, or double-unknown. This classification is mostly based upon the number of points found along the edge of a lane marking and the displacement of points along the lane edges.

In block 3025, lane lines are determined based on the type of line (Double/Solid/Dashed) and the side of the vehicle 105 of which the lane lines are detected. This step in the LDW application calculates which line to fit on each side of the vehicle 105. For a given line, the algorithm tries every combination of line angle, curvature radius, and curvature rate, starting with the most likely candidates, and moving out to extreme cases. For each set of possible values for those three parameters, a lateral offset is computed yielding the best possible line fit. The best line fit is defined as the sum of the absolute difference between the computed line and the actual points. The process of determining the best line fit is halted once it falls within acceptable limits (i.e., it is not an exhaustive search). There is also some bookkeeping performed at the end. Based on the line, initial gates for the next frame can be set based on the line, which can make the line fitting process more efficient in successive frames. This is also done to ensure some level of confidence or consistency in the lane lines. In at least one embodiment, a level of consistency is required prior to any potential warning.

In block 3030, vehicle departure from lane lines is computed. If the LDW application has been tracking a line for a certain period of time, and the vehicle 105 is crossing over that line, a warning is flagged to be issued. The potential for crossing a line is calculated using a 1-D Kalman filter. Kalman filtering is based upon the model history and current rate of approach. Output from the Kalman filter determines time to lane crossing (TLC). If the vehicle 105 is on a rapid approach toward a lane edge, a warning condition is passed up to the decision logic. Once the vehicle 105 has completely crossed a line (for example, when changing into the next lane), the LDW application copies all of the history of the left side into the right side (for example) in order to maintain all relevant history.

The decision logic block 3035 handles the output from the LDW application. This step determines whether or not a warning should be given. The decision to warn is based upon at least one of the following inputs: 1) Speed, 2) Turn signal switch position, 3) Yaw, and 4) Output from the LDW application (to warn or not to warn). Timing data can be inputted for hysteresis purposes. Typically, if the system 106 has indicated a warning, the system 106 will not warn again inside of a 5 second time limit.

Figure 31A:
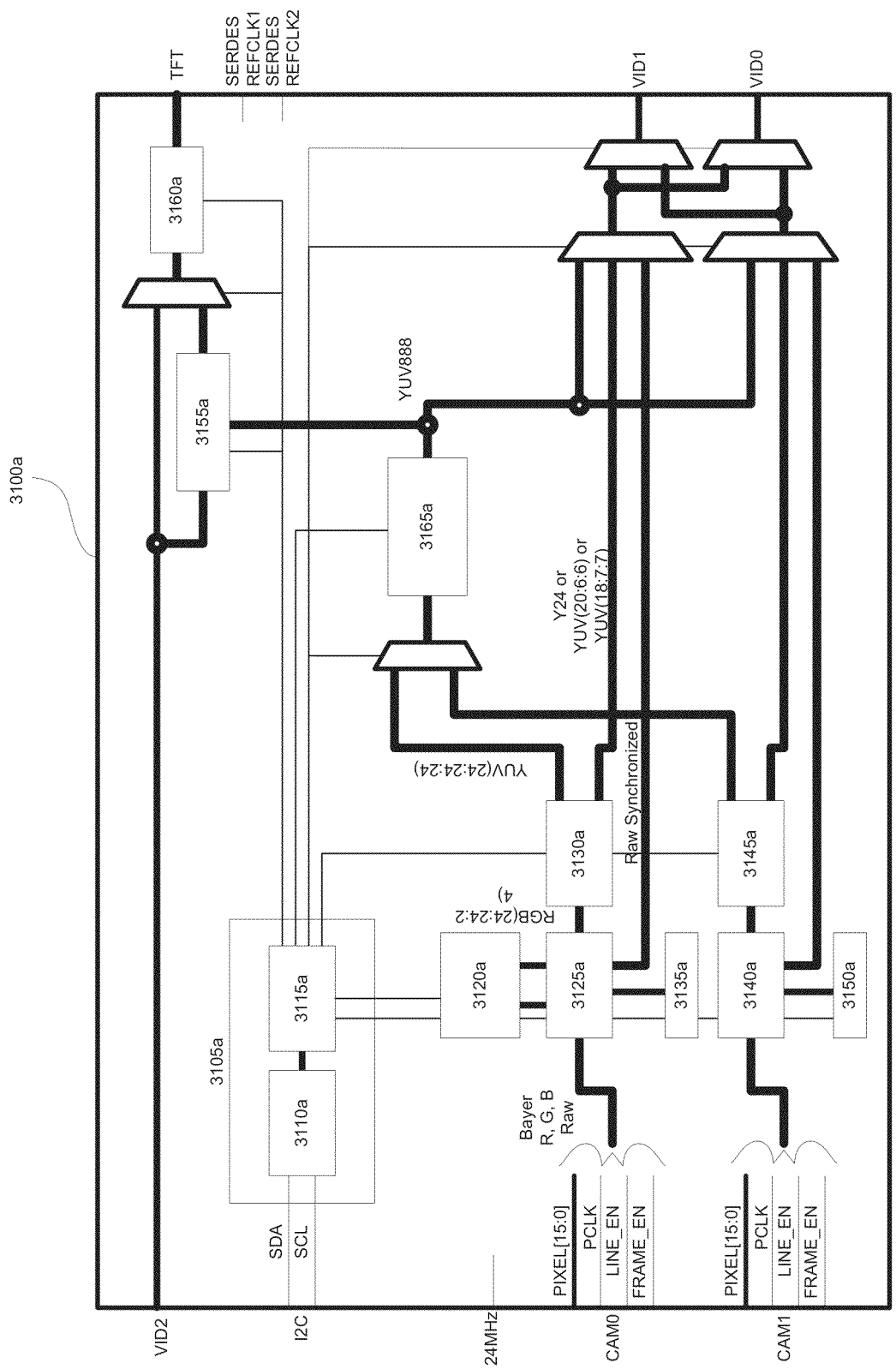
FIG. 31a is a schematic diagram of an image pre-processor, in accordance with one embodiment of the present invention.

Turning to FIG. 31*a* an image pre-processor 3100*a* is depicted; as discussed elsewhere herein, preferably a field programmable gate array (FPGA) is employed to facilitate the image pre-processor. In at least one embodiment, two imaging devices, CAM0 and CAM1, provide sources of images to the image pre-processor. In at least one embodiment, an inter-integrated circuit ($I^2C$) 3105*a* is incorporated that comprises a slave 3110*a* and registers 3115*a*, and provides a multi-master serial single-ended computer bus having a serial data line (SDA) and a serial clock (SCL) connecting the $I^2C$ to external processor(s). A third video input, V1D2, is accommodated for input of an at least partially pre-processed image stream. In at least one embodiment, a peak detect algorithm block 3120*a* is provided to extract possible points of interest (POPI) as described herein. In at least one embodiment, demosaicing blocks 3125*a*, 3140*a* are provided to impart missing color data to each pixel of the incoming imaging device data as described in commonly assigned U.S. Patent Application Publication No. 2010/0195908, as well as herein. In at least one embodiment dark pixel adjust blocks 3135*a*, 3150*a* are provided to compensate raw pixel data for dark current noise. In at least one embodiment, color conversion blocks 3130*a*, 3145*a* are provided for conversion of image data from a Red, Green, Blue (RGB) format to a YUV format; suitable algorithms are described herein. In at least one embodiment, a tone mapping block 3165*a* is incorporated for converting high dynamic range image data to lower range data as described in commonly assigned U.S. Patent Application Publication No. 2010/0195901. In at least one embodiment, a resizer/alphablender block 3155*a* and a thin-film transistor (TFT) conversion block 3160*a* are provided to interface the V1D2 video input to a TFT display.

The system 106 can include one or more executable software routines that are executed by one or more processors to process the captured images and generate a control signal, according to one embodiment. Typically, the one or more executable software routines can be configured to reduce an amount of processor required by the processor. Options exist for high dynamic range pixel data formats for high dynamic range images include LogLuv TIFF which encodes high dynamic range image data in a format that provides a luminance component and two relatively compact color components that are essentially independent of luminance. The format is based on perceptually uniform color encoding from the CIE 1976 Standard. An earlier CIE 1931 standard introduced an xyY color space where Y represents luminance and x and y represent luminance independent color coordinates. For its many advantages, the LogLuv encoding is computationally difficult to implement in a digital device such as an FPGA and conversions to and from the color space both require divide operations that are difficult to implement efficiently. The xyY color space is a little easier to implement but still requires divides and other computations to convert to or from the xyY color space.

Conversion of color images to black and white, machine vision, and many tone mapping algorithms perform extensive computations based on luminance. Black and white pictures, including those shown on black and white television, use pixel values based on luminance and NTSC utilizes YUV and variants such as YIQ are utilized in color television standards to provide compatibility between color and black and white sets, and to provide commonality of the luminance channel and computationally simple conversions between YUV and RGB. YUV separates the luminance component Y from the U and V components intended primarily to convey color information, but because the U and V are linearly related to color components that scale directly with intensity, they also scale directly with changes in intensity or luminance Y. Even for image data in a limited normal dynamic range, the scaling of the color components with luminance limits color resolution at lower luminance levels. For high dynamic range images, the situation is exacerbated and all three of the color components, not just the luminance, need to be expanded in size to provide the desired dynamic range. The pixel encoding that is part of the present invention, unlike the CIE formats, may be economically implemented in an FPGA and, unlike RGB or YUV, requires expanded bit size of only the luminance component to encode high dynamic range pixel data. By dividing U and V each by Y or by a value closely related to Y such as (Y+1), color components that are dimensionally independent of luminance are created. The division can include dividing by Y+1 or optionally by Y modified in another way so that it is nonzero and positive to avoid division by zero. Then instead of needing about the same number of bits for luminance and for each color component as is the case with RGB or YUV, the number of bits needed for the two color components is reduced to the number needed to adequately convey the color information for display or for image processing, and only the luminance value needs to convey the high dynamic range information. Since many tone mapping algorithms such as described in commonly assigned U.S. Patent Application Publication No. 2010/0195901, a scale luminance can be used to compress the image and then re-apply the color, wherein the ratios of U/(Y+1) and V/(Y+1) are substantially unchanged by the tone mapping operation. This saves computational steps and greatly reduces the memory needed to store pixel color data while tone mapping is in progress.

In a further improvement, the components Y, U, and V, or similar components from another color space having a luminance component, and two or more color related components whose values scale with luminance, are each converted to a logarithmic form (with provision for separate handling of negative values), and the division operation is replaced by a subtraction of the log of the luminance (or of the luminance+1) from the log of each of the color components in the logarithmic domain. Since the number of bits that contain useful information, even in a high dynamic range image, is limited by the precision of the A/D conversion, logarithmic conversion of pixel values that preserve most of the accuracy present in the readings does not require as much computation time or use as many FPGA resource as a relatively high speed divide operation, which makes this a desirable alternative.

A preferred alternative pixel representation of the value of a high dynamic range pixel that is performed on pixel data that contains a luminance component and two color components that scale with luminance is illustrated here starting with conversion to a variant of YUV with coefficients to transform from the RGB color space selected for the application. The first stage of the transformation from RGB resembles transformation from RGB to YUV in that pixel data for a pixel is transformed to color coordinate values that are preferably linearly related to the RGB, wherein the transformed pixel data includes one value that is primarily related to the luminance of the pixel and two other components that are primarily related to the color of the pixel. To calculate the luminance (value of Y), 52.3% of the red value, 47.3% of the green value, and 0.4% of the blue value are added together. More typical luminance values would be based roughly on 30% red, 60% green, and 10% blue. The example is based on values for lane departure warning and a specific camera configuration, and are not intended to limit the scope of the invention.

The U and V color components are now converted to forms that convey the color information in a form that preserves the high dynamic range capability and that are dimensionally independent of light energy. The form chosen restricts the large number of bits needed to encode high dynamic range pixel data to the luminance channel allowing a more compact encoding of the pixel information for U and V in their alternately encoded forms. In the example, 20 bits of the original 24 bit luminance resolution is retained so using only 6 bits each for the U and V color information encoded in the new format along with 20 bits of luminance data to provide pixel data with reasonable color fidelity over a 20 bit range in a (20:6:6) data format requires only 32 bits of data. This would require 60 bits in a more conventional RGB encoding and perhaps 62 bits to include negative signs possible for U and V in a YUV format.

As detailed in the example, the values of Y, U, and V are calculated as indicated, and U and V are each separated into a one bit sign variable (Us and Vs, respectively, with Us and Vs equal to the sign of U and the sign of V, respectively, preferably using 0 for a plus and 1 for a minus) and an absolute value variable (Uabs and Vabs, respectively, with Uabs and Vabs equal to the absolute value of U and the absolute value of V, respectively). Then, Ylog, Ulog, and Vlog, logarithms, preferably to the base 2, are calculated for Y, Uabs, and Vabs, respectively. Denote the logs to the base 2 of the ratios of (Uabs+1)/(Y+1) and (Vabs+1)/(Y+1) by Ualr and Valr, respectively, to denote the logarithm of the ratio of the absolute value of U to luminance and of the absolute value of V to luminance, respectively. Use Ycl to denote the value of Y modified by clamping values of Y that exceed a specified maximum value to the maximum value. Packed forms Ualrp and Valrp of Ualr and Valr are formed by rounding or truncating lower order bits of Ualr and Valr and higher order bits of Ualr and Valr are clamped. The resulting values are encoded using a selected format such as twos complement that is preferably formulated to preserve properties of ordering and equality. The results including Ycl, Us, Ualrp, Vs, and Valrp are packed in a prescribed order into a binary representation of the colored pixel value. In the preceding operations, by calculating the color components based on Y rather than on Ycl, correct color components are maintained for the full original dynamic range so that proper colors are retained even in many of the areas where luminance is clipped whereas, color information is typically lost when pixel values are saturated.

Here is an example implemented in an FPGA using a variant of Y:U:V with the new pixel representation utilizing 20 bits for luminance and 6 bits for each of the two color components in a (20:6:6) pixel value layout.

1. Take the linearized RGB (24:24:24) through a color conversion to YUV (24:25:25), where U and V are signed, linear results (hence the 25th sign bit).

2. Color conversion is performed by applying the formulas:

$$Y=0.523*R+0.473*G+0.004*B$$

$$U=0.340*R-0.336*G-0.004*B$$

$$V=-0.297*R-0.266*G+0.563*B$$

3. For Y, compute a log base 2 of Y (Ylog), and clamp the linear Y value to 20 bits (Ycl).

4. For the U and V (25 bit, signed inputs) set Us and Vs equal to the signs of U and V, respectively.

5. Take the absolute value of U and of V to create variables Uabs and Vabs.

6. Calculate the log to the base 2 of Uabs and of Vabs to create Ulog and Vlog (format is 18-bits with 5 integer bits and 13 fractional bits).

7. Set Ulog=$\log_2$(Uabs+1) and Vlog=$\log_2$(Vabs+1) and Ylog=$\log_2$(Yabs+1). The 1's are added to prevent taking the log of zero.

8. Set Ualr=Ulog−Ylog and Valr=Vlog−Ylog

9. To pack Ualr forming Ualrp, truncate the fractional part Ualr and clamp the integral portion to five bits. Express the signed integer portion in a 5 bit 2's complement format (+15 to −16 is the range). Call this Ualrp.

10. Do the same for Valr to create Valrp.

11. For transmission, send Ycl for the 20 bit luminance portion. For the U portion send 6 bits as the original sign of U and the packed logarithmic value of the ratio of (Uabs+1)/(Vabs+1). This result is arranged as a one bit sign followed by a five bit packed logarithmic value as (Us:Ualrp). For the V portion, send 6 bits assembled in the same way as just described for the U portion as (Vs:Valrp). Note we have 2 sign bits in each of the U and V components. Also note, the U and V are normalized to Y.

12. In the compact 6 bit formats, multiplication by luminance may be performed by adding the logarithm of luminance or a simple lookup table may be used to convert each of the 6 bit logarithmically encoded color components to linear forms that may be multiplied by the luminance value as needed.

Figure 31B:
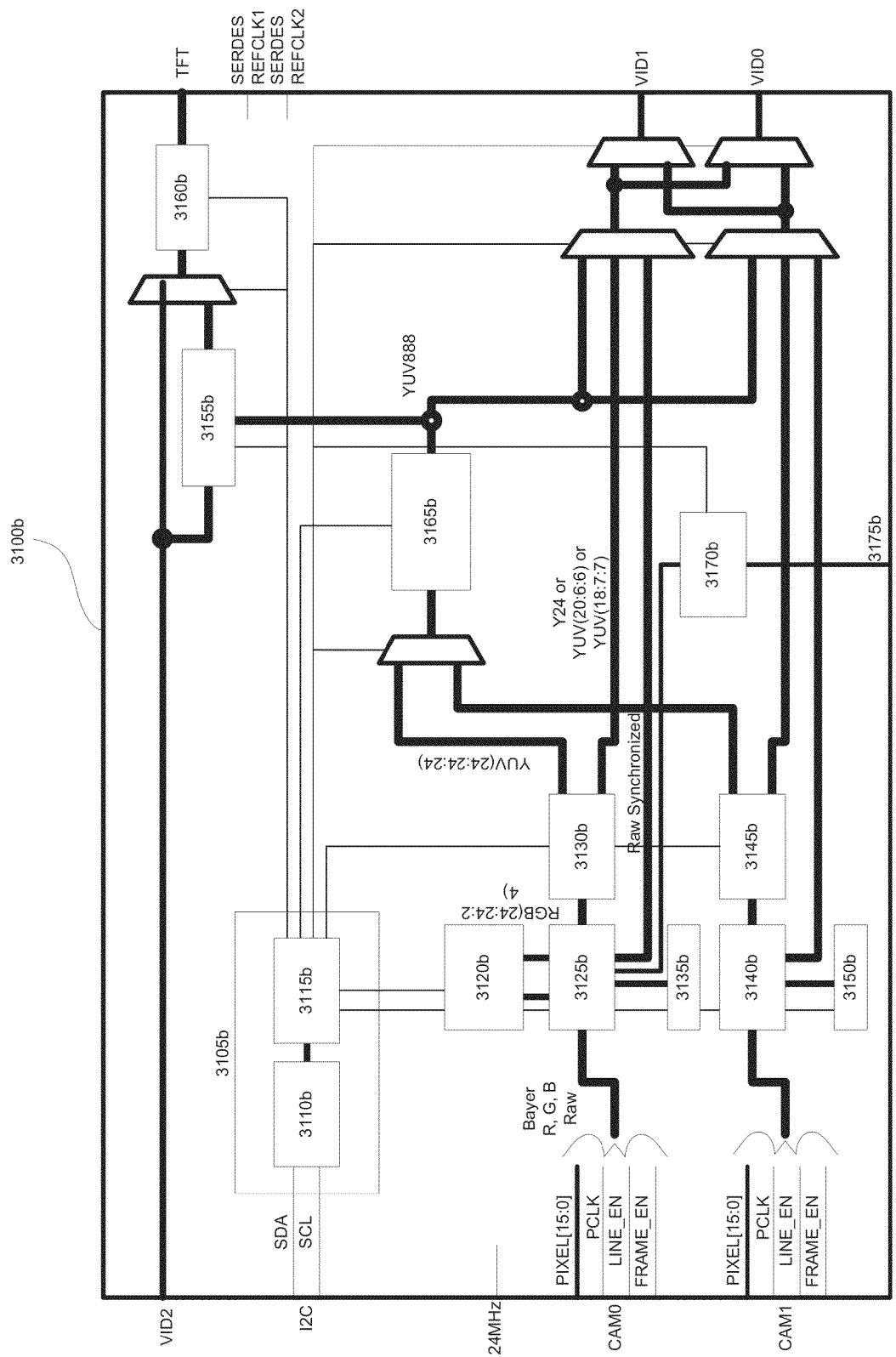
FIG. 31b is a schematic diagram of an image pre-processor, in accordance with one embodiment of the present invention.

Turning to FIG. 31b an image pre-processor 3100b is depicted, according to one embodiment; as discussed elsewhere herein, preferably a field programmable gate array (FPGA) is employed to facilitate the image pre-processor. In at least one embodiment, two imaging devices, CAM0 and CAM1, provide sources of images to the image pre-processor. In at least one embodiment, an optical flow block 3170b is incorporated; commonly assigned U.S. Patent Application Publication No. 2010/0073480, describes optical flow algorithms for use with the present invention, the entire disclosure of which is incorporated by reference herein. In at least one embodiment, an inter-integrated circuit ($I^2C$) 3105b is incorporated that comprises a slave 3110b and registers 3115b provides a multi-master serial single-ended computer bus having a serial data line (SDA) and a serial clock (SDL) connecting the $I^2C$ to external processor(s). A third video input, V1D2, is accommodated for input of an at least partially pre-processed image stream. In at least one embodiment, a peak detect algorithm block 3120b is provided to extract possible points of interest (POPI) as described herein. In at least one embodiment, demosaicing blocks 3125b, 3140b are provided to impart missing color data to each pixel of the incoming imaging device data as described in commonly assigned U.S. Patent Application Publication No. 2010/0195908, as well as herein. In at least one embodiment, dark pixel adjust blocks 3135b, 3150b are provided to compensate raw pixel data for dark current noise. In at least one embodiment, color conversion blocks 3130b, 3145b are provided for conversion of image data from a RGB format to a YUV format; suitable algorithms are described herein. In at least one embodiment, a tone mapping block 3165b is incorporated for converting high dynamic range image data to lower range data as described in commonly assigned U.S. Patent Application Publication No. 2010/0195901. In at least one embodiment, a resizer/alphablender block 3155b and a thin-film transistor (TFT) conversion block 3160b are provided to interface the V1D2 video input to a TFT display.

Figure 31C:
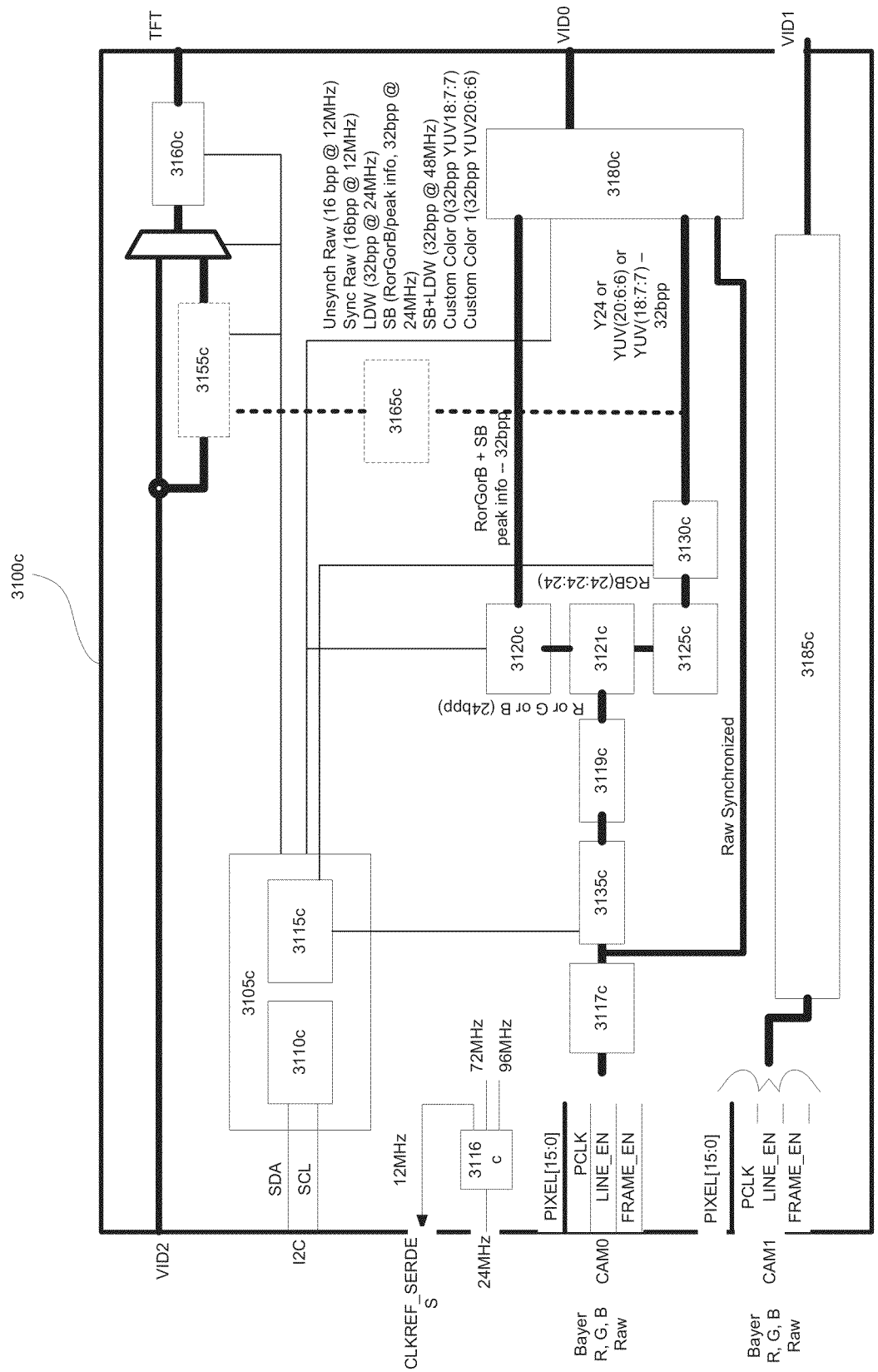
FIG. 31c is a schematic diagram of an image pre-processor, in accordance with one embodiment of the present invention.

Turning to FIG. 31c an image pre-processor 3100c is depicted, according to one embodiment; as discussed elsewhere herein, preferably a field programmable gate array (FPGA) is employed to facilitate the image pre-processor. In at least one embodiment, two imaging devices, CAM0 and CAM1, provide sources of images to the image pre-processor. In at least one embodiment, an inter-integrated circuit ($I^2C$) 3105c is incorporated that comprises a slave 3110c and registers 3115c provides a multi-master serial single-ended computer bus having a serial data line (SDA) and a serial clock (SDL) connecting the $I^2C$ to external processor(s). In at least one embodiment, a phase lock loop control block 3116c is provided for synchronization of at least one device external to the image pre-processor 3100c. In at least one embodiment, a line buffer 3117c is provided for buffering incoming imaging device data. In at least one embodiment, an integer conversion block 3119c is provided for conversion of logarithmic represented image data to a linerized format. A third video input, V1D2, is accommodated for input of an at least partially pre-processed image stream. In at least one embodiment, a peak detect algorithm block 3120c is provided to extract possible points of interest (POPI) as described herein. In at least one embodiment, a 5×5 kernel block 3121c is incorporated to analyze sub-arrays of pixels as described herein and as in commonly assigned U.S. Patent Application Publication Nos. 2010/0195901 and 2010/0195908. In at least one embodiment, demosaicing block 3125c are provided to impart missing color data to each pixel of the incoming imaging device data as described in commonly assigned U.S. patent application publication 20100195908, the disclosure of which is incorporated in its entirety herein by reference, as well as herein. In at least one embodiment dark pixel adjust block 3135c are provided to compensate raw pixel data for dark current noise. In at least one embodiment, color conversion block 3130c are provided for conversion of image data from a RGB format to a YUV format; suitable algorithms are described herein. In at least one embodiment, a tone mapping block 3165c is incorporated for converting high dynamic range image data to lower range data as described in commonly assigned U.S. Patent Application Publication No. 2010/0195901. In at least one embodiment, a resizer/alphablender block 3155c and a thin-film transistor (TFT) conversion block 3160c are provided to interface the V1D2 video input to a TFT display. In at least one embodiment, an output format block 3180c is provided for formatting the associated pre-processed image data into a Y24, YUV (20:6:6) or YUV (18:7:7) format. In at least one embodiment, a duplicate imaging device data path 3185c identical to that associated with CAM0 is provided for a CAM1 input minus the peak detect algorithm block 3120c for a connection to an imaging device facing generally rearward of a controlled vehicle 105. The imaging device connected to CAM0 input is generally forward facing of the controlled vehicle 105.

It should be understood that in at least one embodiment of the present invention, a field programmable gate array (similar to the FPGA depicted in FIG. 31c) is configured such that automatic selection of a given color ("RGB-to-YUV") conversion algorithm (block 3130c, split into 3130c1, 3130c2, . . . ) is based upon an external bit of information; such as, 1) whether it is day (high ambient light environment), or 2) night (low ambient light environment). In related embodiments, color conversion block 3130c is configured with two or more color conversion algorithms (i.e.: first color conversion algorithm, second color conversion algorithm, etc.); automatic selection of a given color conversion algorithm may be based upon whether it image data is desired for display purposes, automatic vehicle exterior light control purposes, lane detection purposes, lane tracking purposes, lane keeping purposes, blind spot warning purposes, any subcombination thereof or combination thereof; a given external device influences the FPGA to perform a desired color conversion algorithm.

Figure 31D:
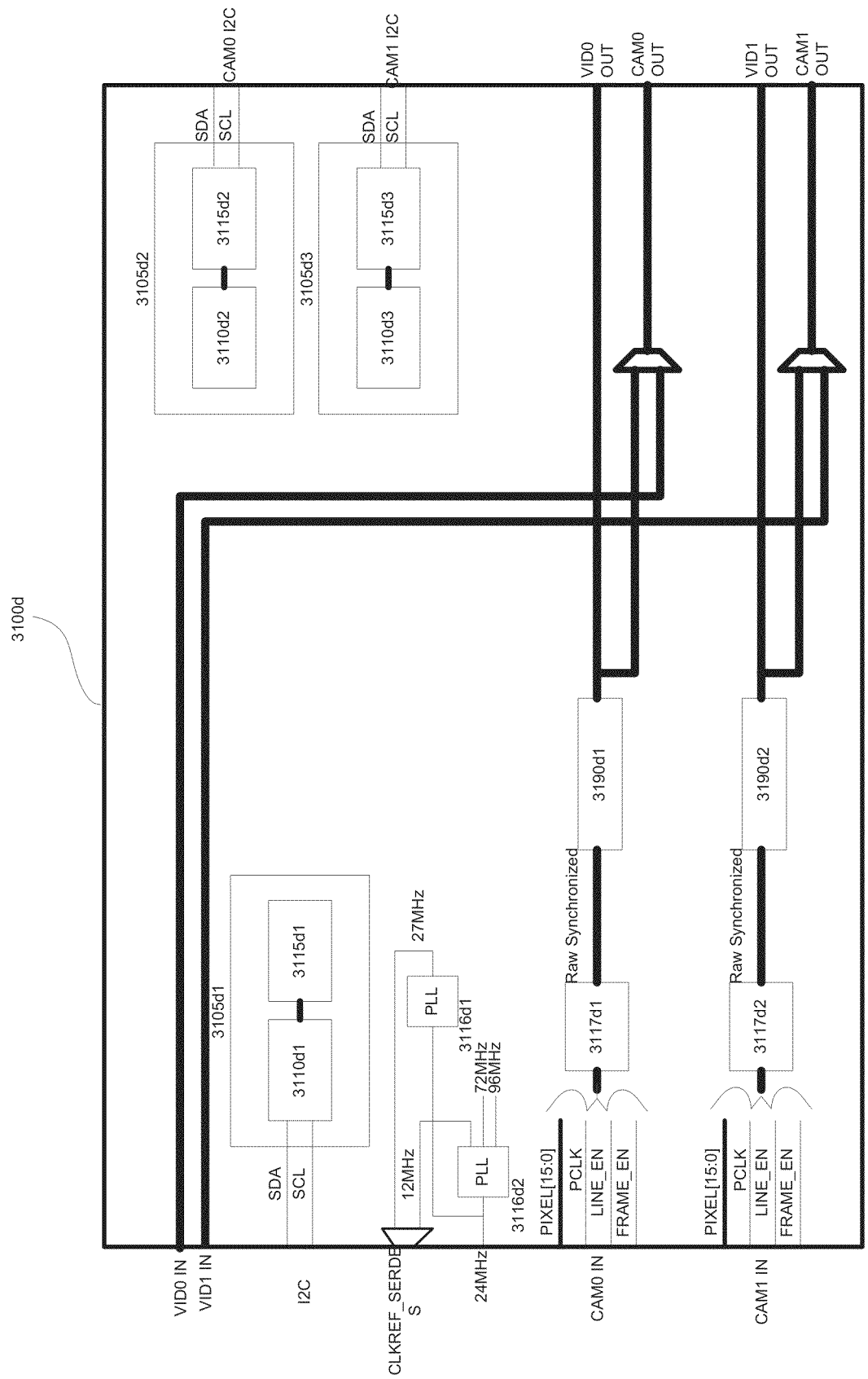
FIG. 31d is a schematic diagram of an image pre-processor, in accordance with one embodiment of the present invention.

Turning now to an embodiment illustrated in FIG. 31d, a frame grabber 3100d is depicted having a first inter-integrated circuit ($I^2C$) 3105d1 is incorporated that comprises a slave 3110d1 and registers 3115d1; a second inter-integrated circuit ($I^2C$) 3105d2 is incorporated that comprises a slave 3110d2 and registers 3115d2; and a third inter-integrated circuit ($I^2C$) 3105d3 is incorporated that comprises a slave 3110d3 and registers 3115d3 providing a plurality of multi-master serial single-ended computer buses having individual serial data lines (SDA) and individual serial clocks (SDL) connecting the given $I^2C$ to an external device; digital signal processor (DSP), CAM0, and CAM1, respectively. In at least one embodiment, a first phase lock loop control block 3116d1 is provided for synchronization of at least a first device external to the frame grabber 3100d and a second phase lock loop control block 3116d2 is provided for synchronization of at least one second device external to the frame grabber 3100d. In at least one embodiment, a first line buffer 3117d1 is provided for buffering incoming imaging device data from a first imaging device. In at least one embodiment, a second line buffer 3117d2 is provided for buffering incoming imaging device data from a second imaging device. In at least one embodiment, a first integer conversion block 3119d1 is provided for conversion of logarithmic represented image data received from a first imaging device to a linerized format. In at least one embodiment, a second integer conversion block 3119d2 is provided for conversion of logarithmic represented image data received from a second imaging device to a linerized format.

An application programming interface (API) is an interface implemented by a software program which enables it to interact with other software. It facilitates interaction between different software programs similar to the way the user interface facilitates interaction between humans and computers. An API is implemented by applications, libraries, and operating systems to determine their vocabularies and calling conventions, and is used to access their services. It may include specifications for routines, data structures, object classes, and protocols used to communicate between the consumer and the implementer of the API.

Figure 32:
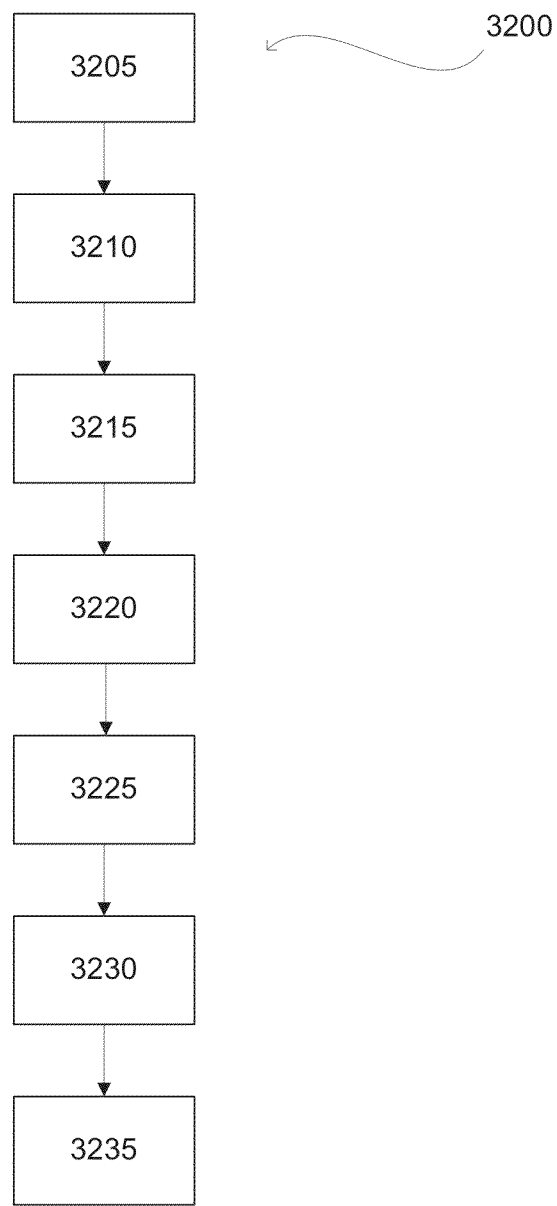
FIG. 32 is a flow chart of controlling at least one exterior light of a vehicle, in accordance with one embodiment of the present invention.

With reference to FIG. 32, a vehicle exterior light control algorithm block diagram 3200 for embedded systems is depicted. The preferred processing is one of a configurable "black box" library. Each major area of computation uses a standardized functional interface into which any variety of processing can be plugged. The resulting external algorithm API is a compact and intuitive 2-function interface: 1) initialize an exterior light state structure and configure each of the computational areas of the related algorithm, and 2) process one frame of image data, and outputting the configuration-defined exterior light state based on the current frame of image data as well as any historic data which has been saved in the headlamp control state variable.

The preferred embedded system on which this algorithm runs may vary in computational power and configuration. Image data pre-processing block 3205 is preferably performed in a field programmable gate array (FPGA) or other such device. The algorithm accepts a pre-defined input which includes 32-bit linearized pixel data and some book keeping performed in the FPGA which indicates points of potential interest (POPI).

The algorithm 3200 has been partitioned into six areas of related computation. Each area of computation has a functional interface which facilitates both compile time determined computing, or runtime pluggable computing. Each area of related computation takes as its input, the data calculated by all preceding areas of computation, and then generates output either on a per-light or a per scene basis.

The POPI refinement algorithm block 3210 converts all of the POPIs generated by a pre-processor into a list of light objects. It is broken up into two distinct steps: 1) POPI Harvest, and 2) POPI Blossom Refinement. The POPI harvester parses the pre-processed encoded output from block 3205, and creates a list of POPI blossom objects. The POPI refinement process passes this list of POPI blossoms to each of the registered refining factories. At the end of refinement, the factories should allocate light source objects and populate the "single peak" light list which is a list of light sources that contain only a single pre-processed image located peak.

The first step of POPI refinement is to harvest all the POPIs, which the pre-processing step has found and encoded into the incoming pre-processed image data. The interface between the image data pre-processor and the POPI harvester is as follows: 1) Peaks (POPIs) within a row are indicated in a bitfield which follows each row of image data. Each bit represents a column in the row, and if the bit is set to 1 then that pixel was marked as a point-of-possible-interest by the pre-processing block 3205, and 2) For each POPI in a row, the FPGA will also pack 8-bits of informational "meta" data into the top 8-bits of image data. This is only done for pixels marked by a 1 in the POPI bitfield. The "meta" data format is as follows: 1) Pixel[31:30] Direction of the pixel underneath Bayer filter colorA which is the highest in a 3×3 neighborhood of the peak (POPI), 2) Pixel[29:28] Direction of the pixel underneath Bayer filter colorB which is the highest in a 3×3 neighborhood of the peak (POPI), and 3) Pixel[27:24] Priority (0-15) calculated to weight peaks which are bright, red and in the center of the image frame most heavily.

Bayer spectral filter colorA and colorB are the two colors which are not the same as the color of the peak pixel, and the direction is an encoding of either North-East-South-West (0,1,2,3), or NorthEast-SouthEast-SouthWest-NorthWest (0,1,2,3) depending on the color of the peak pixel. If the peak pixel is red (or blue) then colorA will be the green pixel to the North, East, South, or West of the peak pixel, and colorB will be the blue, (or red respectively) to the NorthEast, SouthEast, SouthWest or NorthWest of the peak pixel. If the peak is a green pixel then colorA will be the red or blue pixel to the North or South, and colorB will be the blue or red pixel to the East or West.

At least one POPI refining factory is responsible for iterating through the list of POPI source blossom objects created by the harvester and allocating/initializing a light source object structure for blossoms which it deems appropriate for further consideration. If the refiner decides that a blossom should be converted into a light source object, it is responsible to calculate some basic properties of the light source, such as; red/white ratio, peak pixel within the light source, slope within a 5×5 array of pixels surrounding and including the peak pixel within the light source, total grey scale value, past frame light source position, present frame light source position, motion, width, height, area, age, and growth the like, or a combination thereof.

The process of aggregating multiple lights together is a computational burden which becomes necessary when the peak detection algorithm can generate multiple peaks within a single light source or reflector. For example, the peak detection algorithm may find 3 or 4 peaks within a single sign object along the side of the road. While it may be something which subsequent processing can handle, it is most often advisable to determine the actual extents of a light object before passing it on to the tracking and attribute calculating computational areas.

A light source aggregator block 3215 implements the light source aggregator function interface and is responsible for populating the final list of light source objects which will be tracked over time and over which all light source attribute calculations will be run. In a preferred embodiment, a light source aggregator combines single-peak light sources into possibly larger (multi-peak) light sources. As input, the aggregator function 3215 receives the list of "single peak" light sources from the POPI refinement stage 3210. These light sources have already been pre-filtered by the refinement process, and have had some basic characteristics calculated by the refining factories, such as; red/white ratio, peak pixel within the light source, slope within a 5×5 array of pixels surrounding and including the peak pixel within the light source, total grey scale value, past frame light source position, present frame light source position, motion, width, height, area, age, growth, the like, or a combination thereof.

Light history tracking block 3220 is responsible to connect current lights to previous generations of lights. In a preferred embodiment, the history tracking block tracks light source objects from one frame to the next. A genealogical tree analogy has been chosen to describe the various facets of this process. Each frame is considered as a generation in the genealogical tree, and each generation has an ID which is a monotonically increasing counter. A light source which is found to be similar enough (based on some similarity metric, such as; red/white ratio, peak pixel value within the light source, slope within a 5×5 array of pixels surrounding and including the peak pixel within the light source, total grey scale value, past frame light source position, present frame light source position, motion, width, height, area, age and/or growth) to a light source in a previous frame (or generation) adopts that light source as its parent. Simultaneously, the light source from the previous generation adopts the light source from the current frame as its child. A light source may have many children, but only one parent. A light source may adopt a parent from a non-adjacent generation (i.e. not its direct parent, but rather a grandparent or great-grandparent), but the generational gap may not be larger than the number of generations that a light may sit in the previous light list without being adopted. A light source's age is the difference between the generation ID of the oldest light source in its history and the generation ID of the light source.

Calculations in light source attribute block 3225 are made using image data and possibly other, previously calculated light attributes, such as; red/white ratio, peak pixel within the light source, slope within a 5×5 array of pixels surrounding and including the peak pixel within the light source, total grey scale value, past frame light source position, present frame light source position, motion, width, height, area, age, growth, the like, or a combination thereof. Each attribute calculation can preferably be performed on every light source in the list of light sources passed to it (i.e. every light source object can preferably have the same member variables updated by each calculation). Each light source attribute calculation preferably conforms to the attribute calculation function protocol, and should be registered using the light source attribute add calculation function.

Scene attribute block 3230 calculations are made on a per-frame scope using all previously calculated light source attributes and light history. In a preferred embodiment, the each scene attribute calculation is passed an effectively read-only list of light sources found and characterized within the current frame, and should then perform some higher-level or macroscopic determination/calculation regarding the scene or collection of light sources as a whole. All calculated scene attributes are kept in a structure separate from the light source list. Examples of scene attributes are village detection, motorway detection, and vehicle (or vehicle collection) identification.

Vehicle exterior light control decision logic block 3235 takes as it input all previous calculation output including (but not limited to) all scene (or macroscopic) attributes, the entire list of characterized, classified light sources present in the current frame, and a complete history of each light source in the frame. The decision logic determines an appropriate state for the vehicle exterior lights based on the data input. The decision logic is free to keep its own state within the structure for timers and state hysteresis. The actual output structure used and updated by the decision logic is defined by the configuration system. This flexibility allows the developer to tailor the decision logic to a particular vehicle. The ability to customize output format and decision logic on a per-vehicle basis allows the developer to adjust the decision logic for optimal performance in a focused and efficient manner.

According to one embodiment, an automatic vehicle equipment control system comprises: at least one imager configured to acquire a continuous sequence of high dynamic range single frame images, and said at least one imager comprising a pixel array; a processor in communication with said at least one imager, and configured to process said continuous sequence of said high dynamic range images; a color spectral filter array in optical communication with said at least one imager, said color spectral filter array comprising a plurality of color filters, at least a portion of which are different colors, and pixels of said pixel array being in optical communication with substantially one said spectral color filter; and a lens in optical communication with said at least one imager and said color spectral filter array; wherein said imager is configured to capture a non-saturated image of nearby oncoming headlamps and at least one of a diffuse lane marking and a distant tail lamp in one image frame of said continuous sequence of high dynamic range single frame images, and the automatic vehicle equipment control system configured to detect at least one of said highway markings and said tail lamps, and quantify light from said oncoming headlamp from data in said one image frame.

The automatic vehicle equipment control system as described above, wherein said oncoming headlamp and at least one said diffuse lane marking and said distant tail lamp are directly viewed by said imager.

The automatic vehicle equipment control system as described above, wherein said imager has an acquisition sequence for acquiring said continuous sequence of high dynamic range single frame images, and said acquisition sequence remains unchanged for an extended period of time when multiple different types of light sources are detected.

The automatic vehicle equipment control system as described above, wherein said lens is configured so said at least one imager has a reduced sensitivity to said light sources having a large area and low luminance, and said lens is further configured such that a majority of a light from a small light area light source is substantially focused onto one pixel of said pixel array.

The automatic vehicle equipment control system as described above, wherein said processor is further configured to process a mosaiced color image by interpolating at least one color component for each pixel that is missing said color data, and generate a grayscale image as a weighted average of said color components at each pixel location.

The automatic vehicle equipment control system as described above, wherein said processor is further configured to enhance a detection of yellow in said image, such that yellow lane markers in said image are detected.

The automatic vehicle equipment control system as described above, wherein an interpolation equation is based upon at least one of a position of a pixel relative to a mosaiced color filter array pattern, a color of a missing component that is being calculated, and an edge pattern detected for said pixel location where said interpolation is being performed.

The automatic vehicle equipment control system as described above, wherein said processor is further configured to use an edge pattern detection with a larger pixel base to select an interpolation equation based upon pixel values from a smaller pixel base.

The automatic vehicle equipment control system as described above further configured to select interpolation equations that calculate an interpolated value based primarily on values of pixels that are adjacent to the interpolation site.

The automatic vehicle equipment control system as described above, wherein said processor is further configured to modify grayscale values for at least one pixel associated with a selected said color spectral filter by increasing their values relative to a non-yellow pixel.

The automatic vehicle equipment control system as described above, wherein said processor is further configured to locate a position of imaged light sources in successive image, statistically calculate light levels for each said spectral filter array colors, and compare said statistically calculated values for each of said color components to differentiate types of lamps.

The automatic vehicle equipment control system as described above, wherein said processor is further configured to take readings over time as the position of the projected image changes over time.

The automatic vehicle equipment control system as described above, wherein said processor is further configured, such that said image data from successive frames for a given light source is further utilized to provide classifications for position and trajectory of said light source.

The automatic vehicle equipment control system as described above further comprising a memory device in communication with said processor, said memory device configured to store data obtained from captured said images, wherein said data comprises at least one of locations of bright pixels in said pixel array and of each said spectral color filter that covers each said pixel.

The automatic vehicle equipment control system as described above, wherein said processor is further configured to locate and track an imaged light source over a plurality of images, such that said data is analyzed to determine a plurality of properties of said light source.

The automatic vehicle equipment control system as described above, wherein said plurality of properties comprise at least one of color, intensity, a profile of intensity with respect to time, a position, a trajectory, and a velocity.

The automatic vehicle equipment control system as described above, wherein said color spectral filter array is arranged in a pattern, wherein a plurality of first colored filters are approximately twice the amount of a plurality of second colored filters and said plurality of first colored filters are approximately twice the amount of a plurality of third colored filters, and said processor is further configured to separately accumulate and compare a sum of first colored pixel values in a row with second colored pixel values and a sum of said first colored pixel values in a row with third colored pixel values to provide an estimate of a statistical quantity of measurements based on a time averaged response of said pixels with said spectral filters of a given color to a given light source adjusted for density of said pixels in said pixel array.

The automatic vehicle equipment control system as described above, wherein said processor is further configured to scan said image to locate local said pixels with a brightness peak reading value that exceeds a brightness peak threshold value set for a given spectral color filter.

The automatic vehicle equipment control system as described above, wherein said brightness peak threshold value is determined for each given said spectral color filter based upon a density of bright spots in an adjoining area of said image.

The automatic vehicle equipment control system as described above wherein said processor is further configured to perform edge preserving color interpolation to provide pixel color and luminance information for objects that are large enough to span several contiguous said pixels in said image.

The automatic vehicle equipment control system as described above, wherein said processor is further configured to acquire pixel data for said pixels in a neighborhood of a targeted pixel location and to share such data to perform separate color interpolation and brightness peak detection functions.

The automatic vehicle equipment control system as described above, wherein said processor is further configured to detect at least one brightness peak in said image.

The automatic vehicle equipment control system as described above, wherein at least two different spectral filter colored pixels are in communication with at least a portion of the same compare circuits, said compare circuits configured for compare operations in two different pixel array configurations.

The automatic vehicle equipment control system as described above, wherein said processor is further configured to screen out at least a portion of said brightness peaks based upon said brightness peaks being an imaged reflection of a light source.

The automatic vehicle equipment control system as described above, wherein said processor is further configured to indicate at least a portion of said brightness peaks to be further processed based upon said bright spot being a local peak or plateau in intensity.

The automatic vehicle equipment control system as described above, wherein said brightness peak is where a pixel value of a given said colored pixel is greater than or equal to pixel values of proximate like colored pixels in assigned directions.

The automatic vehicle equipment control system as described above, wherein said proximate like colored pixels comprises approximately eight neighboring like colored pixels in at least one of vertical, horizontal, and diagonal directions.

The automatic vehicle equipment control system as described above, wherein a brightness peak threshold value used to screen brightness peaks is variable.

The automatic vehicle equipment control system as described above, wherein said variable brightness peak threshold value is increased based upon increased density of bright spots proximate a bright spot being screened.

The automatic vehicle equipment control system as described above, wherein said processor is further configured to group a plurality of brightness peaks.

The automatic vehicle equipment control system as described above, wherein said brightness peaks are grouped based upon a determination that said brightness peaks are members of a connected set of pixels in said pixel array that exceed said brightness peak threshold value.

The automatic vehicle equipment control system as described above, wherein said processor is further configured to map at least a portion of said pixels to reshape an image by spatial transformation.

The automatic vehicle equipment control system of as described above, wherein said reshaping of said image is utilized to at least one of provide a top-down view, correcting lens distortion, and stitching multiple images obtained from a plurality of imagers.

The automatic vehicle equipment control system as described above, wherein said processor is further configured to detect and screen red brightness peaks according to a variable threshold value that is adjusted according to a position of said red brightness peak in said image and a frequency of occurrence of said red brightness peak in zones of said image.

The automatic vehicle equipment control system as described above, wherein said processor is further configured to detect and prioritize brightness peaks in said image, such that at least a portion of said brightness peaks having a higher prioritization are processed prior to at least a portion of said brightness peaks having a lower prioritization.

The automatic vehicle equipment control system as described above, wherein said processor is further configured, for each brightness peak that is detected, a direction of a brightest adjacent pixel of each of the other said colored pixels is determined.

The automatic vehicle equipment control system as described above, wherein said processor is further configured to generate an importance weighting of pixels having peak readings that are reported based upon a sum of individual weighting factors that include at least one of weightings factors for a row position of a peak in an image array, a column position of said peak in said image array, an approximate logarithm of a brightness of said peak, and a magnitude of said peak relative to that of adjacent red and blue pixels.

The automatic vehicle equipment control system as described above, wherein said frame rate of said imager is selectable.

The automatic vehicle equipment control system as described above, wherein said imager is configured to have said frame rate of approximately 20 to 25 frames per second.

The automatic vehicle equipment control system as described above, wherein said frame rate is such that an alternating current (AC) light source operating at both approximately 60 Hz and 50 Hz is detectable.

The automatic vehicle equipment control system as described above, wherein said imager is configured to have a non-harmonic frequency frame rate with respect to an alternating current (AC) light source.

The automatic vehicle equipment control system as described above, wherein said non-harmonic frequency frame rate is a beat pattern in which a signal for a sub-sampled flicker frequency oscillates at a rate approximately equal to one half of said frame rate and a phase of said signal is inverted during each beat frequency half cycle phase reversal period.

The automatic vehicle equipment control system as described above, wherein said imager is configured to have a beat frequency frame rate with respect to an alternating current (AC) light source, such that a repetition rate of image acquisition for said beat frequency is approximately half a cycle period that is approximately two image acquisition periods so that during said beat frequency half cycle period, a phase of an alternating acquisition pattern shifts by approximately 180 degrees relative to a flicker cycle.

The automatic vehicle equipment control system as described above, wherein said processor is further configured to locate brightness peaks in said image, grouping peaks to said light source, tracking a history of said light source over a plurality of frames, calculating an intensity based on a sum of intensities of brighter pixels related to said light source in each said image, classifying said light source, and generating a control signal based upon said classified light source.

The automatic vehicle equipment control system as described above further comprising at least one light sensor having a different field of view from said at least one imager, wherein said imager has an integration period that is at least partly a function of light detected by said light sensor.

The automatic vehicle equipment control system as described above, wherein said at least one imager comprises a first imager having a field of view approximately forward of a controlled vehicle and a second imager having a field of view approximately rearward of said controlled vehicle.

The automatic vehicle equipment control system as described above, wherein said at least one imager is configured for use in at least one system comprising lane departure warning, adaptive cruise control, collision avoidance, traffic sign recognition, automatic headlamp control, pedestrian detection, occupant identification, drowsiness detection, smart airbag deployment, vehicle theft identification, drive-by wire, and blind spot detection.

The automatic vehicle equipment control system as described above, wherein said processor is further configured to detect a plurality of lane markers in said image, and determine a change ratio of lane marker curvature to detect additional lane markers.

The automatic vehicle equipment control system as described above, wherein said processor is further configured to detect lane markers, such that said colored spectral filter array comprising at least one blue filter, at least one green filter, and at least one red filter, wherein a low blue pixel value relative to a green pixel value and a red pixel value indicates a detection of a yellow lane marker.

The automatic vehicle equipment control system as described above, wherein said processor is further configured to perform color interpolation that is based upon an analysis of said image data to detect edge patterns, wherein interpolated values are a function of said detected edge patterns.

The automatic vehicle equipment control system as described above, wherein said processor is further configured to perform an interpolation equation to calculate a missing color component based upon an edge pattern detection using pixel values from a neighborhood of an interpolation site that extends beyond a three by three neighborhood of said interpolation site, and said interpolation equation further based upon values of pixels with said three by three neighborhood of a pixel for which a missing color component is being calculated.

The automatic vehicle equipment control system as described above, wherein said processor is further configured to calculate color component values for at least a portion of said pixels in said pixel array.

The automatic vehicle equipment control system as described above, wherein said processor is further configured to calculate grayscale values related to a luminance for at least a portion of said pixels in said pixel array.

The automatic vehicle equipment control system as described above, wherein said processor is further configured to modify grayscale values for at least a portion of pixels of a selected color by increasing their values relative to non-yellow pixels in order to facilitate their detection as lane markings.

The automatic vehicle equipment control system as described above, wherein said processor is further configured to double a grayscale value of at least a portion of yellow pixels in said image that are analyzed to detect lane markers.

The automatic vehicle equipment control system as described above, wherein said processor is further configured to adjust a color detection criteria based upon light conditions.

The automatic vehicle equipment control system as described above, wherein said processor is further configured to determine that a selected pixel is yellow when color ratios of various color component values for said pixel with respect to other selected color component values for the same said pixel are within a predetermined range.

The automatic vehicle equipment control system as described above, wherein said light conditions comprises one of direct sunlight, shaded area, and a headlamp.

The automatic vehicle equipment control system as described above, wherein said processor is further configured to detect a cloud type based upon said image of the sky as a function of at least one of color, pixel intensity, and spatial variation in pixel intensity.

The automatic vehicle equipment control system as described above, wherein said processor is further configured to utilize color of pixels from images of lane markings to adjust color detection thresholds to increase inclusion of such colors.

The automatic vehicle equipment control system as described above, wherein said processor is further configured to replace a denominator term that requires a repetitious division by a calculated adjustment to an exponent that is part of a calculation to provide an approximation to an original equation in order to eliminate said repetitious division.

The automatic vehicle equipment control system as described above, wherein said processor is further configured to utilize a scaling factor that reduces the number of pixel values that are saturated after tone mapping.

The automatic vehicle equipment control system as described above, wherein said processor is further configured to format pixel data to provide a luminance component and two compact color components that are substantially independent of luminance.

The automatic vehicle equipment control system as described above, wherein said processor is further configured to automatically select a color conversion algorithm based upon an external bit of information that comprises an amount of detected ambient light.

The automatic vehicle equipment control system as described above, wherein said processor is further configured to automatically select a color conversion algorithm based upon at least one of whether image data is being displayed, automatic vehicle exterior light control, lane detection, lane tracking, lane keeping, and blind spot warning.

The automatic vehicle equipment control system as described above, wherein said processor is further configured to alter a level of image enhancement applied as a result of a detected color based upon at least one of an assessment of a quality of color detection and a benefit of applying a color enhancement.

According to one embodiment, an automatic vehicle equipment control system comprises: at least one imager configured to acquire a continuous sequence of high dynamic range single frame images, and said at least one imager comprising a pixel array; a color spectral filter array in optical communication with said at least one imager, said color spectral filter array comprising a plurality of color filters, at least a portion of which are different colors, and pixels of said pixel array being in optical communication with substantially one said spectral color filter; a lens in optical communication with said at least one imager and said color spectral filter array; and a processor in communication with said at least one imager, and configured to process said continuous sequence of high dynamic range images, wherein said processor is further configured to use color information from pixels of said pixel array to enhance yellow colored features in said high dynamic range images to detect yellow lane markers.

According to one embodiment, an automatic vehicle equipment control system comprises: at least one imager configured to acquire a continuous sequence of high dynamic range single frame images, and said at least one imager comprising a pixel array; a color spectral filter array in optical communication with said at least one imager, said color spectral filter array comprising a plurality of color filters, at least a portion of which are different colors, and pixels of said pixel array being in optical communication with substantially one said spectral color filter; a lens in optical communication with said at least one imager and said color spectral filter array; and a processor in communication with said at least one imager, wherein said processor is further configured to aggregate a plurality of bright pixels into a single light source object in at least one image of said continuous sequence of high dynamic range images.

According to one embodiment an automatic vehicle equipment control system comprises: at least one imager configured to acquire a continuous sequence of high dynamic range single frame images, and said at least one imager comprising a pixel array; a color spectral filter array in optical communication with said at least one imager, said color spectral filter array comprising a plurality of color filters, at least a portion of which are different colors, and each said pixel being in optical communication with substantially one said spectral color filter; a lens in optical communication with said at least one imager and said color spectral filter array; and a processor in communication with said at least one imager, said processor being configured to detect an alternating current (AC) light source in said continuous sequence of high dynamic range images, wherein said at least one imager is configured to have a sampling image repetition period that is longer than that of a flicker cycle period of said AC light source.

According to one embodiment, a method of generating a lane departure warning comprises the steps of: populating a world coordinate system grid for incoming pixel data; scoring marker points; processing said scored marker points; determining a type of lane lines based upon said processed and scored marker points; computing a vehicle departure from said lane lines; and determining if a warning should be emitted.

The method as described above, wherein said step of populating a world coordinate system for incoming pixel data further comprises utilizing luminance information.

The method as described above, wherein said step of populating a world coordinate system for incoming pixel data further comprises bilinear interpolating when sample grid points translate to fractional coordinates in an image plane.

The method as described above, wherein said step of scoring marker points comprises calculating a cross correlation error for a series of grid sample points.

The method as described above, wherein said step of processing said scored marker points comprises classifying each lane line as one of an unknown type, a single type, a single-dashed type, a single-unknown type, a double type, a double-dashed-left type, a double-dashed-right type, and a double-unknown type.

The method as described above, wherein said step of processing said scored marker points comprises classifying each line based upon a number of points found along an edge of a lane marking and a displacement of points along said edge of said lane markings.

The method as described above, wherein said step of determining a type of lane line further comprises determining if said lane line is one of a double line, a solid line, and a dashed line.

The method as described above further comprising the step of coping a history of said line detection from a left side into a right side when a controlled vehicle approximately completely crosses said line from right to left, and coping a history of said line detection from said right side into said left side when said controlled vehicle approximately completely crosses said line from left to right.

The method as described above, wherein said step of determining if a warning should be emitted further comprises evaluating at least one of a controlled vehicle's speed, a turn signal switch position, a yaw rate of said controlled vehicle, and an output a lane departure warning application.

The method as described above further comprising the step of creating a lookup table utilized to translate an image coordinate system to a world coordinate system;

According to one embodiment, a method for generating a control signal for vehicle comprises the steps of: extracting a list of light objects; combining single-peak light sources into multi-peak light objects; connecting current light sources to light sources contained in previous images; calculating at least one light source attribute; and determining an appropriate state of a vehicle's headlamp.

The method as described above, wherein said step of extracting a list of light objects further comprises a possible points of interest (POPI) harvest and a POPI blossom refinement.

The method as described above, wherein said POPI harvest comprises parsing said pre-processed encoded output, and creating a list of POPI blossom objects.

The method as described above, wherein said POPI blossom refinement comprises passing said list of POPI blossom objects to at least one registered refining factory.

The method as described above, wherein said at least one refining factory allocates light source objects, and populates a single peak light list that contains only a single pre-processed image located peak.

The method as described above, wherein said at least one registered refining factory determines at least one property of said light source, said at least one property comprising at least one of a red/white ratio, a peak pixel within said light source, a slope within a 5×5 array of pixels surrounding and including said peak pixel with said light source, a total grey scale value, past frame light source position, present frame light source position, motion, width, height, area, age, and growth.

The method as described above further comprising the step of calculating at least one scene attribute for an image frame based upon at least one of said light source attribute and light source history.

Advantageously, the system 106 can capture high dynamic range images, efficiently process the high dynamic range images, and generate a control signal that can be utilized to alter an operation of the controlled vehicle 105. The system 106 can also be configured to process the captured high dynamic range images in various ways, which can be dependent upon what control signal is to be generated (e.g., headlamp control, LDW, etc.). It should be appreciated by those skilled in the art that the system 106 and method(s) thereof can have additional or alternative advantages. It should further be appreciated by those skilled in the art that the components and steps described above can be combined in various alternative, including alternatives not explicitly described herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An automatic vehicle equipment control system comprising:
    at least one imager configured to acquire a continuous sequence of high dynamic range single frame images, and said at least one imager comprising a pixel array;
    a color spectral filter array in optical communication with said at least one imager, said color spectral filter array comprising a plurality of color filters, at least a portion of which are different colors, and each said pixel being in optical communication with substantially one said spectral color filter;
    a lens in optical communication with said at least one imager and said color spectral filter array; and
    a processor in communication with said at least one imager, said processor being configured to analyze said continuous sequence of high dynamic range single frame images to detect any AC light sources and any DC light sources in said continuous sequence of high dynamic range single frame images, wherein said processor generates a control signal that is used to control vehicle equipment in response to analysis of said continuous sequence of high dynamic range single frame images, and wherein said processor is configured to respond differently to detection of an AC light source than to the detection of a DC light source,
    wherein said at least one imager is configured to have a sampling image repetition period that is longer than that of a flicker cycle period of said AC light source.

2. The automatic vehicle equipment control system of claim 1, wherein said processor is further configured to enhance a detection of yellow in said image, such that yellow lane markers in said image are detected.

3. The automatic vehicle equipment control system of claim 1, wherein said imager is configured to capture a non-saturated image of nearby oncoming headlamps and at least one of a diffuse lane marking and a distant tail lamp in one image frame of said continuous sequence of high dynamic range single frame images.

4. The automatic vehicle equipment control system of claim 1, wherein said imager is configured to have a frame rate of approximately 20 to 25 frames per second.

5. The automatic vehicle equipment control system of claim 4, wherein said frame rate is such that an AC light source operating at both approximately 60 Hz and 50 Hz is detectable.

6. The automatic vehicle equipment control system of claim 1, wherein said imager is configured to have a non-harmonic frequency frame rate with respect to an AC light source.

7. A automatic vehicle equipment control system comprising:
    at least one imager configured to acquire a continuous sequence of high dynamic range single frame images, and said at least one imager comprising a pixel array;
    a color spectral filter array in optical communication with said at least one imager, said color spectral filter array comprising a plurality of color filters, at least portion of which are different colors, and each said pixel being in a optical communication with substantially one said spectral color filter;
    a lens in optical communication with said at least one imager and said color spectral filter array; and
    a processor in communication with said at least one imager, said processor being configured to detect an AC light source in said continuous sequence of high dynamic range single frame images,
    wherein said at least one imager is configured to have a sampling image repetition period that is longer than that of a flicker cycle period of said AC light source,
    wherein said imager is configured to have a non-harmonic frequency frame rate with respect to an AC light source, and
    wherein said non-harmonic frequency frame rate is a beat pattern in which a signal for a sub-sampled flicker frequency oscillates at a rate approximately equal to one half of said frame rate and a phase of said signal is inverted during each beat frequency half cycle phase reversal period.

8. An automatic vehicle equipment control system comprising:

at least one imager configured to acquire a continuous sequence of high dynamic range single frame images, and said at least one imager comprising a pixel array;

a color spectral filter array in optical communication with said at least one imager, said color spectral filter array comprising a plurality of color filters, at least a portion of which are different colors, and each said pixel being in optical communication with substantially one said spectral color filter;

a lens in optical communication with said at least one imager and said color spectral filter array; and a processor in communication with said at least one imager, said processor being configured to detect an AC light source in said continuous sequence of high dynamic range single frame images, wherein said at least one imager is configured to have a sampling image repetition period that is longer than that of a flicker cycle period of said AC light source, and wherein said imager is configured to have a beat frequency frame rate with respect to an AC light source, such that a repetition rate of image acquisition for said beat frequency is approximately half a cycle period that is approximately two image acquisition periods so that during said beat frequency half cycle period, a phase of an alternating acquisition pattern shifts by approximately 180 degrees relative to a flicker cycle.

9. The automatic vehicle equipment control system of claim 1, wherein said at least one imager is configured for use in at least one system comprising lane departure warning, adaptive cruise control, collision avoidance, traffic sign recognition, automatic headlamp control, pedestrian detection, occupant identification, drowsiness detection, smart airbag deployment, vehicle theft identification, drive-by wire, and blind spot detection.

10. An automatic vehicle equipment control system comprising:

at least one imager configured to acquire a continuous sequence of high dynamic range single frame images, and said at least one imager comprising a pixel array;

a color spectral filter array in optical communication with said at least one imager, said color spectral filter array comprising a plurality of color filters, at least a portion of which are different colors, and each said pixel being in optical communication with substantially one said spectral color filter;

a lens in optical communication with said at least one imager and said color spectral filter array; and a processor in communication with said at least one imager, said processor being configured to detect an AC light source in said continuous sequence of high dynamic range single frame images, wherein said at least one imager is configured to have a sampling image repetition period that is longer than that of a flicker cycle period of said AC light source, and wherein said processor is further configured to detect a plurality of lane markers in said image, and determine a change ratio of lane marker curvature to detect additional lane markers.

11. The automatic vehicle equipment control system of claim 1, wherein said processor is further configured to detect lane markers, such that said colored spectral filter array comprising at least one blue filter, at least one green filter, and at least one red filter, wherein a low blue pixel value relative to a green pixel value and a red pixel value indicates a detection of a yellow lane marker.

12. The automatic vehicle equipment control system of claim 1, wherein said processor is further configured to adjust a color detection criteria based upon light conditions.

13. The automatic vehicle equipment control system of claim 12, wherein said processor is further configured to determine that a selected pixel is yellow when color ratios of various color component values for said pixel with respect to other selected color component values for the same said pixel are within a predetermined range.

14. The automatic vehicle equipment control system of claim 12, wherein said light conditions comprise one of direct sunlight, shaded area, and a headlamp.

15. The automatic vehicle equipment control system of claim 12, wherein said processor is further configured to detect a cloud type based upon said image of the sky as a function of at least one of color, pixel intensity, and spatial variation in pixel intensity.

16. The automatic vehicle equipment control system of claim 12, wherein said processor is further configured to utilize colors of pixels from images of lane markings to adjust color detection thresholds to increase inclusion of such colors.

17. The automatic vehicle equipment control system of claim 1, wherein said processor is further configured to automatically select a color conversion algorithm based upon at least one of whether image data is being displayed, automatic vehicle exterior light control, lane detection, lane tracking, lane keeping, and blind spot warning.

18. The automatic vehicle equipment control system of claim 1, wherein said processor is further configured to process said continuous sequence of high dynamic range single frame images and to use color information from pixels of said pixel array to enhance yellow colored features in said high dynamic range images to detect yellow lane markers.

19. The automatic vehicle equipment control system of claim 1, wherein the control signal generated by said processor is an external light control signal that is used to control external lights of the vehicle.

* * * * *

UNITED STATES PATENT AND TRADEMARK OFFICE
CERTIFICATE OF CORRECTION

| | |
|---|---|
| PATENT NO. | : 9,230,183 B2 |
| APPLICATION NO. | : 13/897662 |
| DATED | : January 5, 2016 |
| INVENTOR(S) | : Bechtel et al. |

It is certified that error appears in the above-identified patent and that said Letters Patent is hereby corrected as shown below:

Claims

Col. 62, claim 7, line 44;

After "least" insert --a--.

Signed and Sealed this
Twenty-sixth Day of July, 2016

Michelle K. Lee
*Director of the United States Patent and Trademark Office*